United States Patent [19]

McKee et al.

[11] Patent Number: 4,740,898
[45] Date of Patent: Apr. 26, 1988

[54] AUTOMATIC ENGINE/TRANSMISSION CONTROL SYSTEM

[75] Inventors: Kevin D. McKee; Brian A. Ahlschwede; David E. Brandon, all of Waterloo, Iowa

[73] Assignee: Deere & Company, Moline, Ill.

[21] Appl. No.: 756,003

[22] Filed: Jul. 17, 1986

[51] Int. Cl.⁴ .................... G05D 13/66; B60K 31/00
[52] U.S. Cl. .................... 364/426; 180/306; 364/431.01; 364/424.1
[58] Field of Search ............. 364/424.1, 426, 442, 364/431.01, 431.07; 74/866; 123/352, 357, 358, 478; 180/306

[56] References Cited

U.S. PATENT DOCUMENTS

| | | | |
|---|---|---|---|
| 3,943,799 | 3/1976 | Sakai et al. | 74/866 |
| 4,208,925 | 6/1980 | Miller et al. | 74/866 |
| 4,208,929 | 6/1980 | Heino et al. | 74/866 |
| 4,223,654 | 9/1980 | Wessel et al. | 123/358 |
| 4,314,340 | 2/1982 | Miki et al. | 364/424.1 |
| 4,338,666 | 7/1982 | Suzuki et al. | 364/424.1 |
| 4,338,832 | 7/1982 | Pelligrino | 74/866 |
| 4,357,920 | 11/1982 | Stumpp et al. | 123/358 |
| 4,359,991 | 11/1982 | Stumpp et al. | 123/478 |
| 4,401,075 | 8/1983 | O'Keefe, Jr. et al. | 123/352 |
| 4,408,293 | 10/1983 | Avins | 364/424.1 |
| 4,417,307 | 11/1983 | Kubo et al. | 364/424.1 |
| 4,425,620 | 1/1984 | Batcheller et al. | 364/424.1 |
| 4,425,889 | 1/1984 | Hachitani et al. | 123/357 |
| 4,463,427 | 7/1984 | Bonnetain et al. | 364/424.1 |
| 4,476,530 | 10/1984 | Pannier et al. | 364/424.1 |
| 4,490,790 | 12/1984 | Shinoda | 364/424.1 |
| 4,539,642 | 9/1985 | Mizuno et al. | 364/426 |
| 4,539,643 | 9/1985 | Suzuki et al. | 364/424.1 X |
| 4,541,052 | 9/1985 | McCulloch | 364/424.1 X |
| 4,542,802 | 9/1985 | Garvey et al. | 180/306 |

FOREIGN PATENT DOCUMENTS 0076679 4/1983 European Pat. Off. .

OTHER PUBLICATIONS

Chancellor et al., "Automatic Control of Engine Speed and Transmission Ratio", Jun. 1983, ASAE Paper No. 83-1061.
Automotive Engineering, vol. 92, No. 1, pp. 67-74, Jan. 1984.
Morris, H. C., "Electronic/Hydraulic Transmission Control for Off-Highway Hauling Vehicles", Apr. 1985, ASAE Paper No. 850783.
Boyer, R. C., "Digital Electronic Controls for Detroit Diesel Allison Off-Highway Transmissions, Apr. 1985, SAE Paper No. 850782.

Primary Examiner—Felix D. Gruber

[57] ABSTRACT

A vehicle control system automatically controls both the engine and transmission of the vehicle in response to operator inputs and in response to sensed parameters. The control system has separate selectable operational modes—a constant ground speed mode and a constant engine speed mode.

25 Claims, 70 Drawing Sheets

Microfiche Appendix Included
(2 Microfiche, 111 Pages)

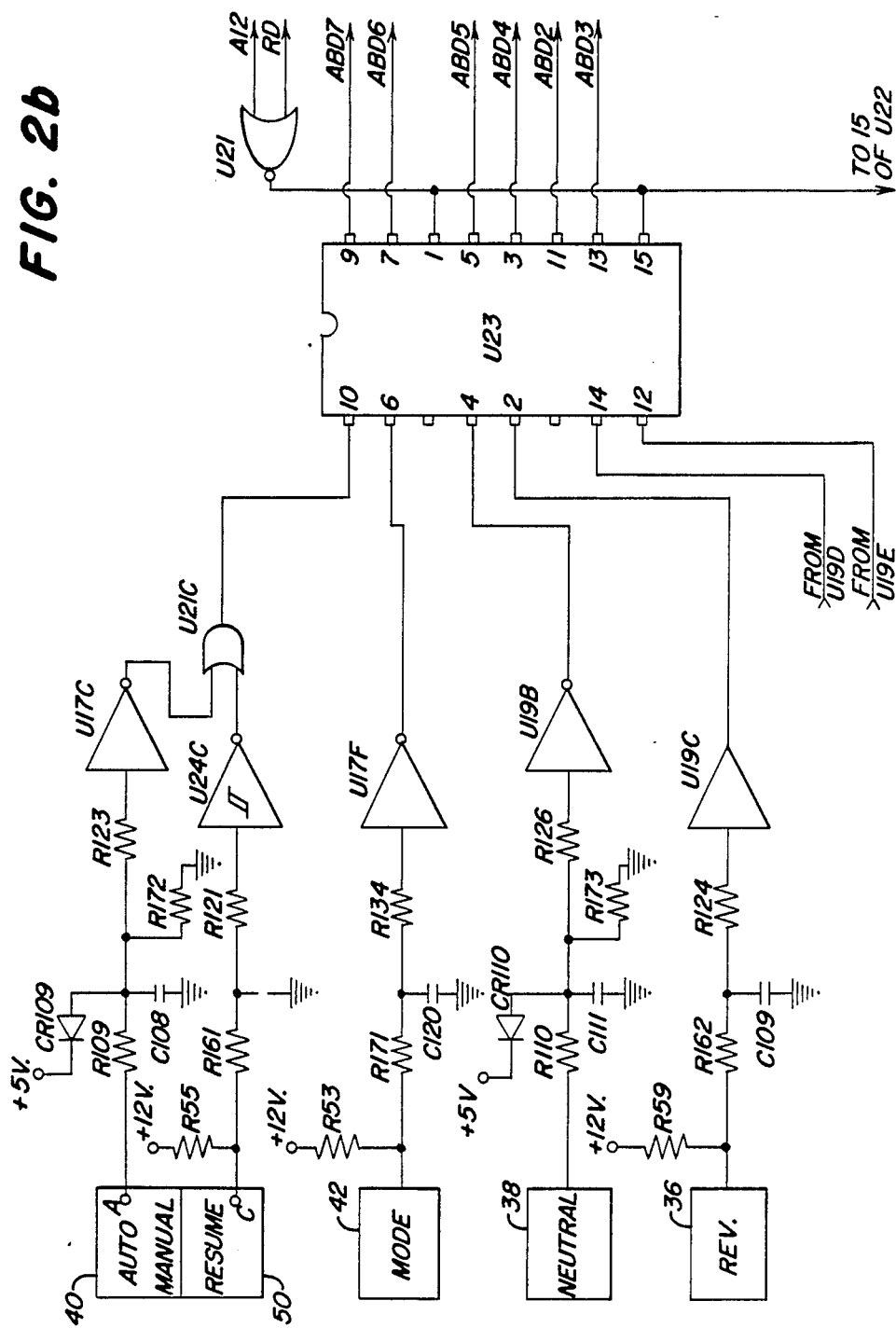

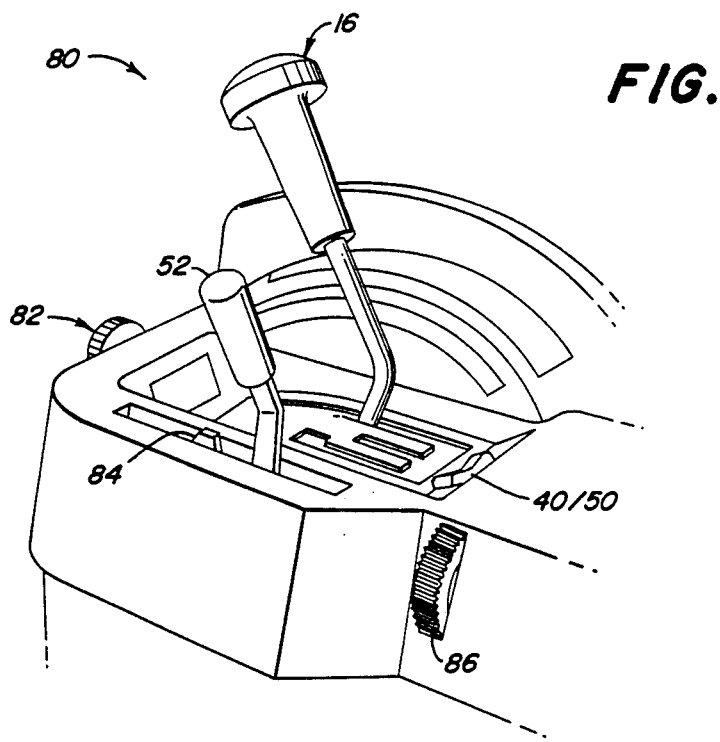
FIG. 4a
  FIG. 4b (Manual)
  FIG. 4c (Auto)
  FIG. 4d (Resume)

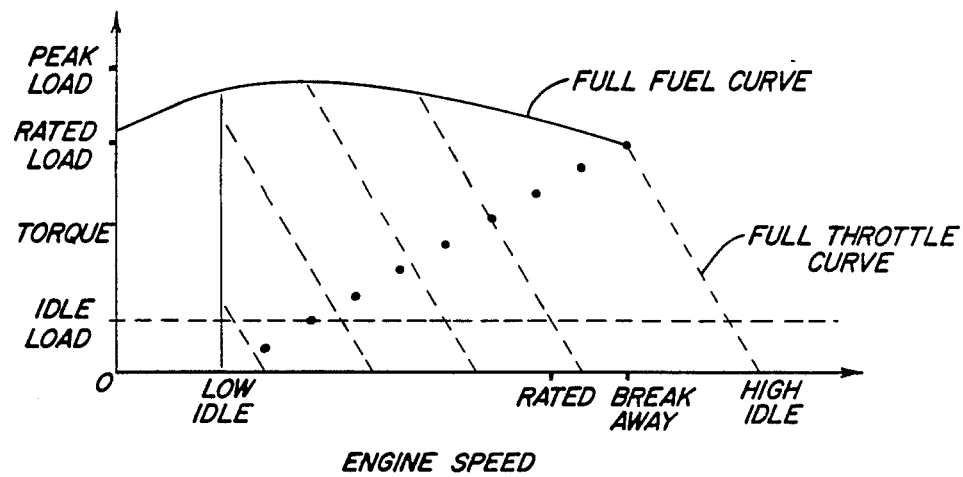
FIG. 5
FIG. 6
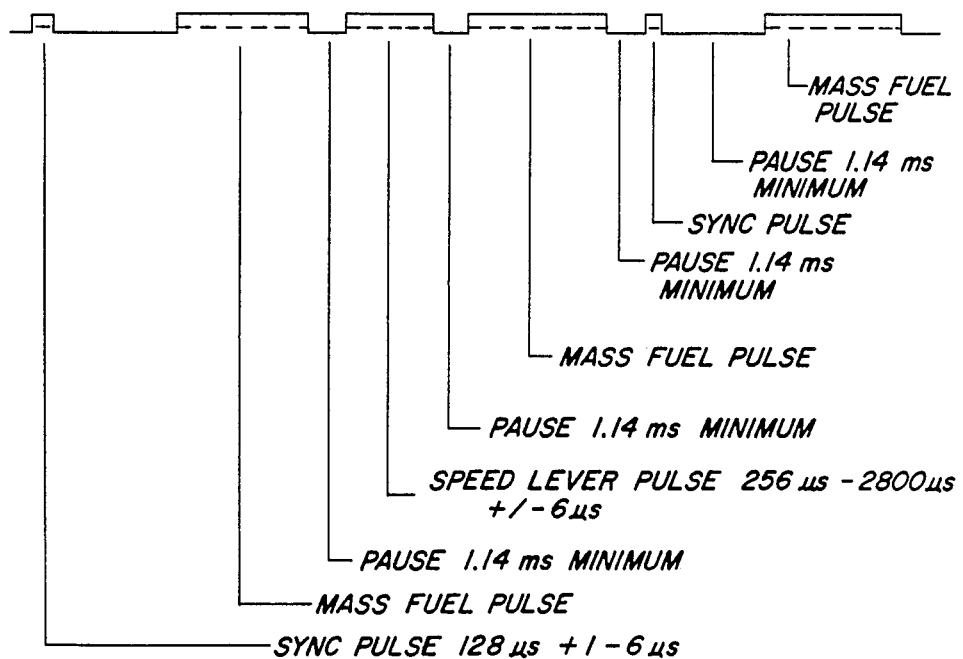

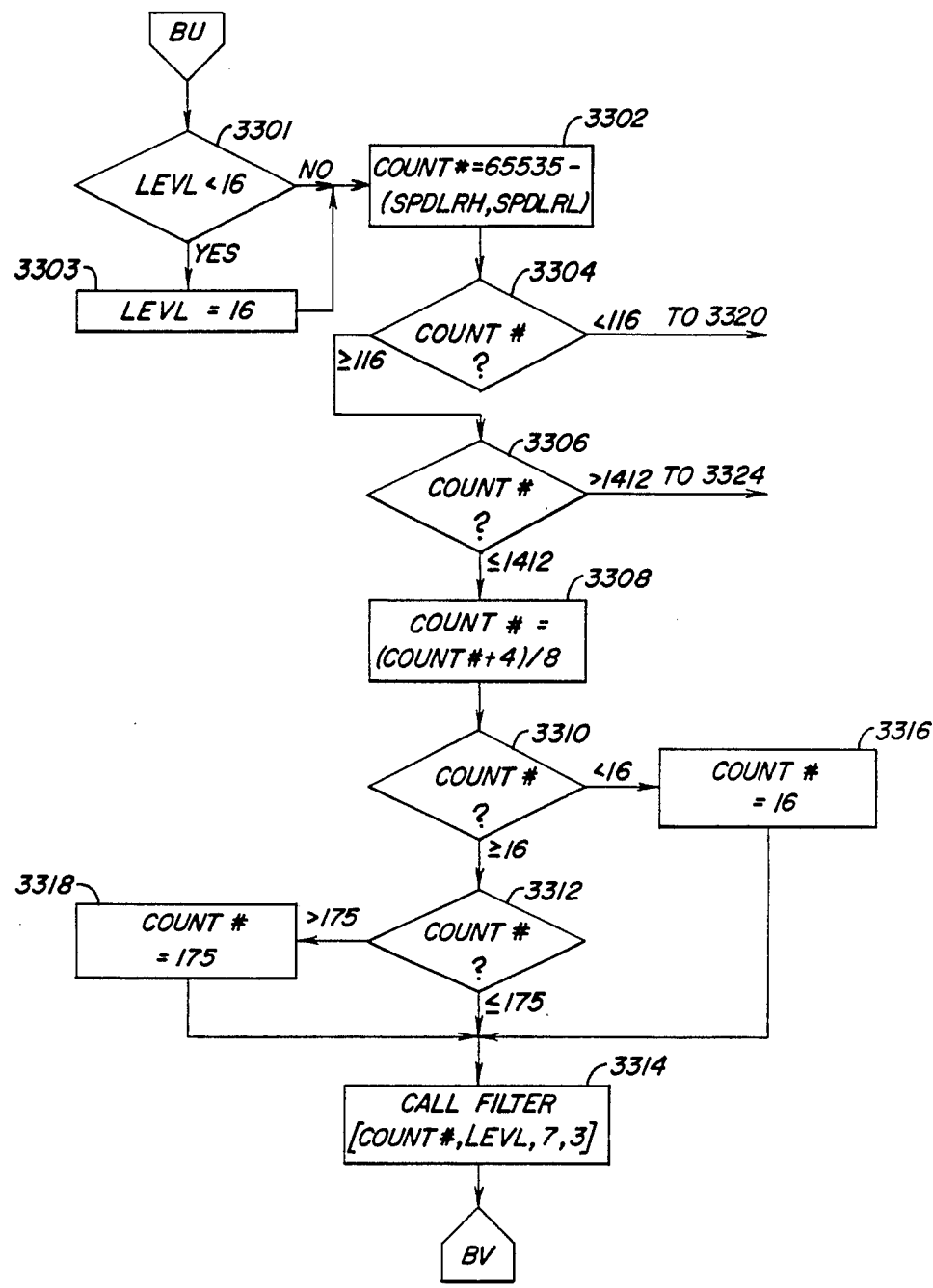
FIG. 10d(1)

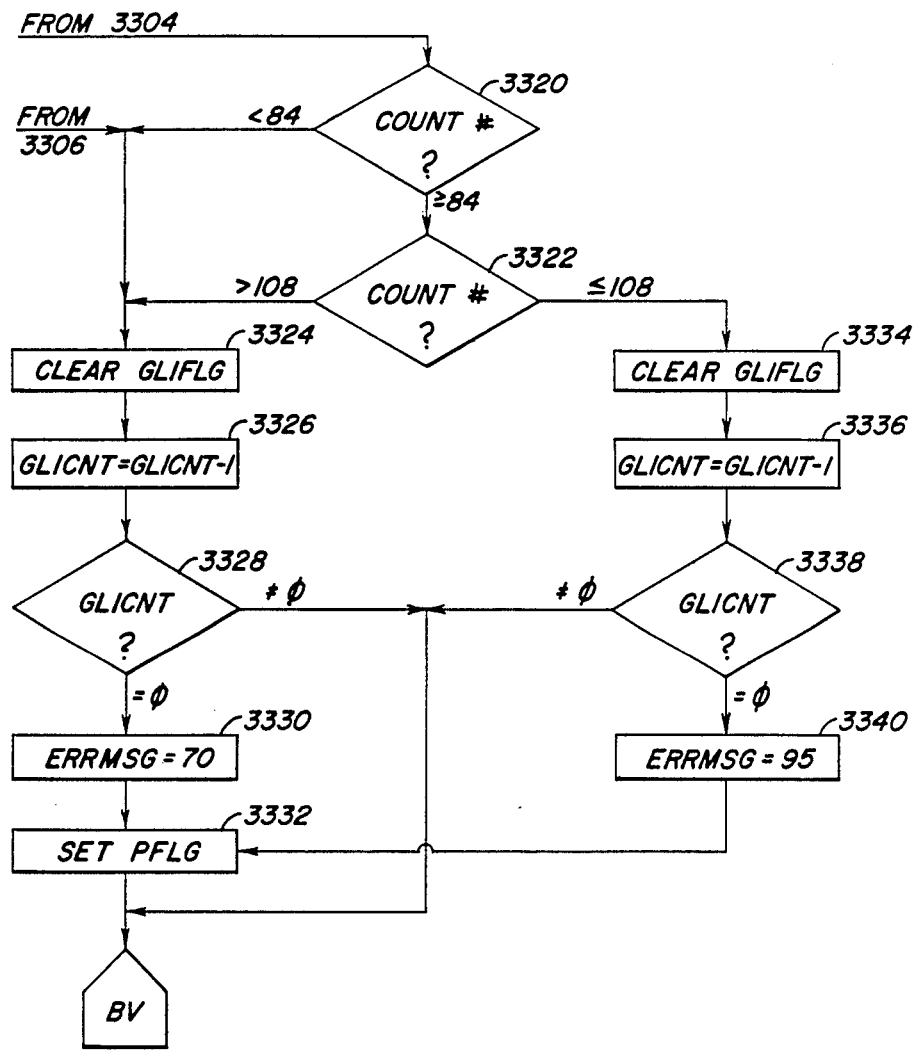
FIG. 10d(2)

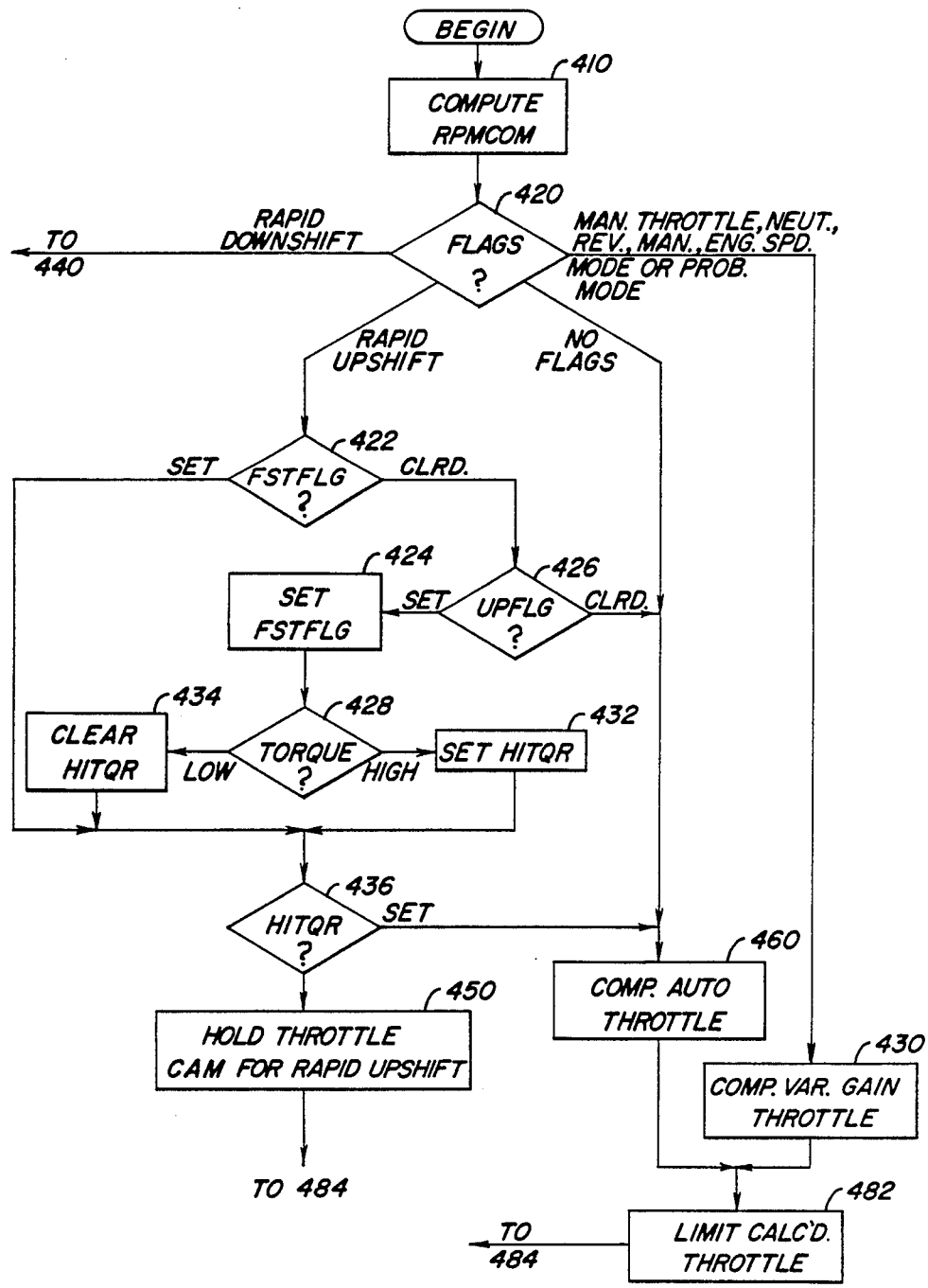
FIG. IIa (I)

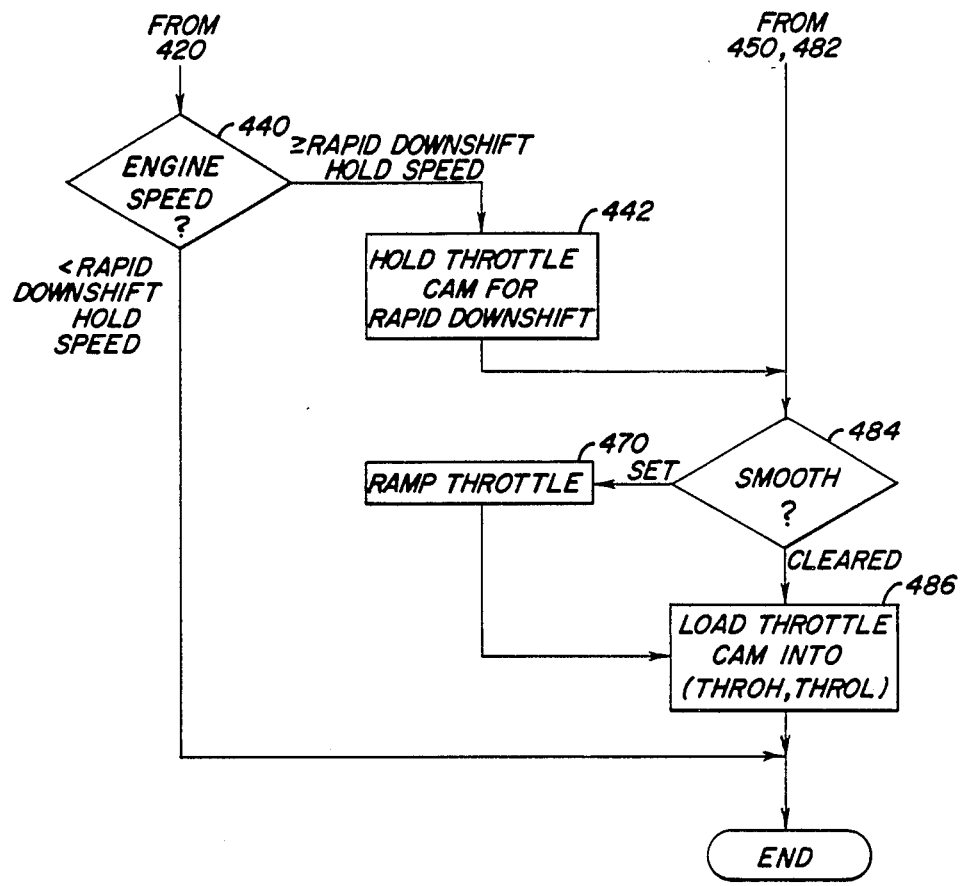
FIG. 11a(2)

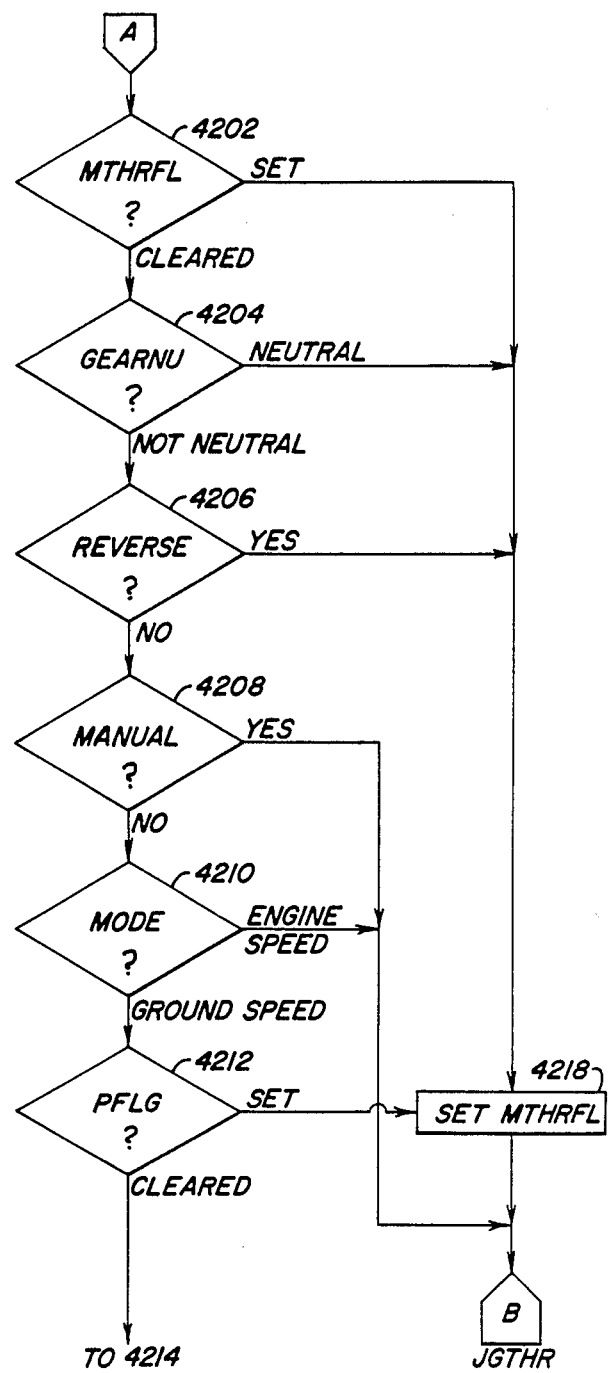
FIG. 11c (1)

FIG. 11c(2)

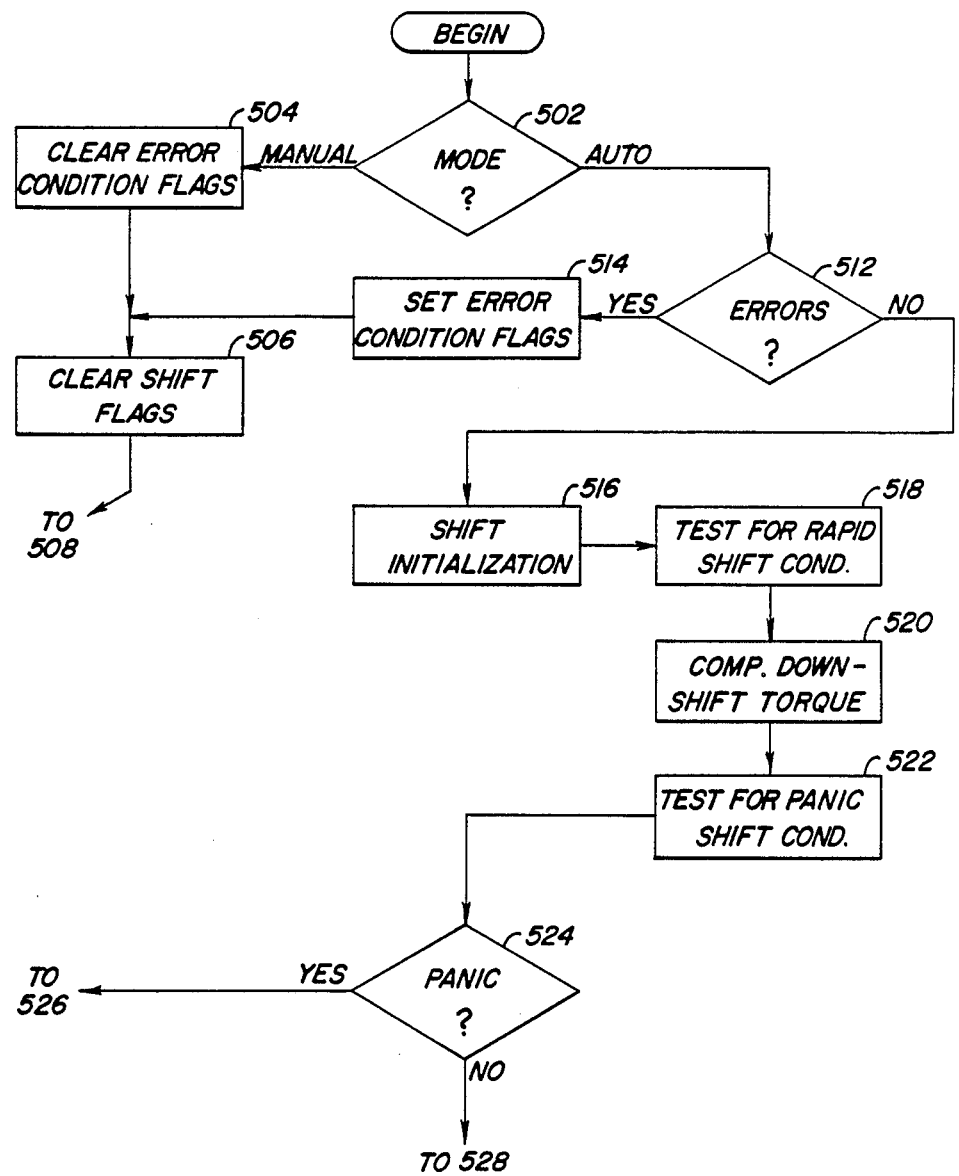
FIG. 12a(1)

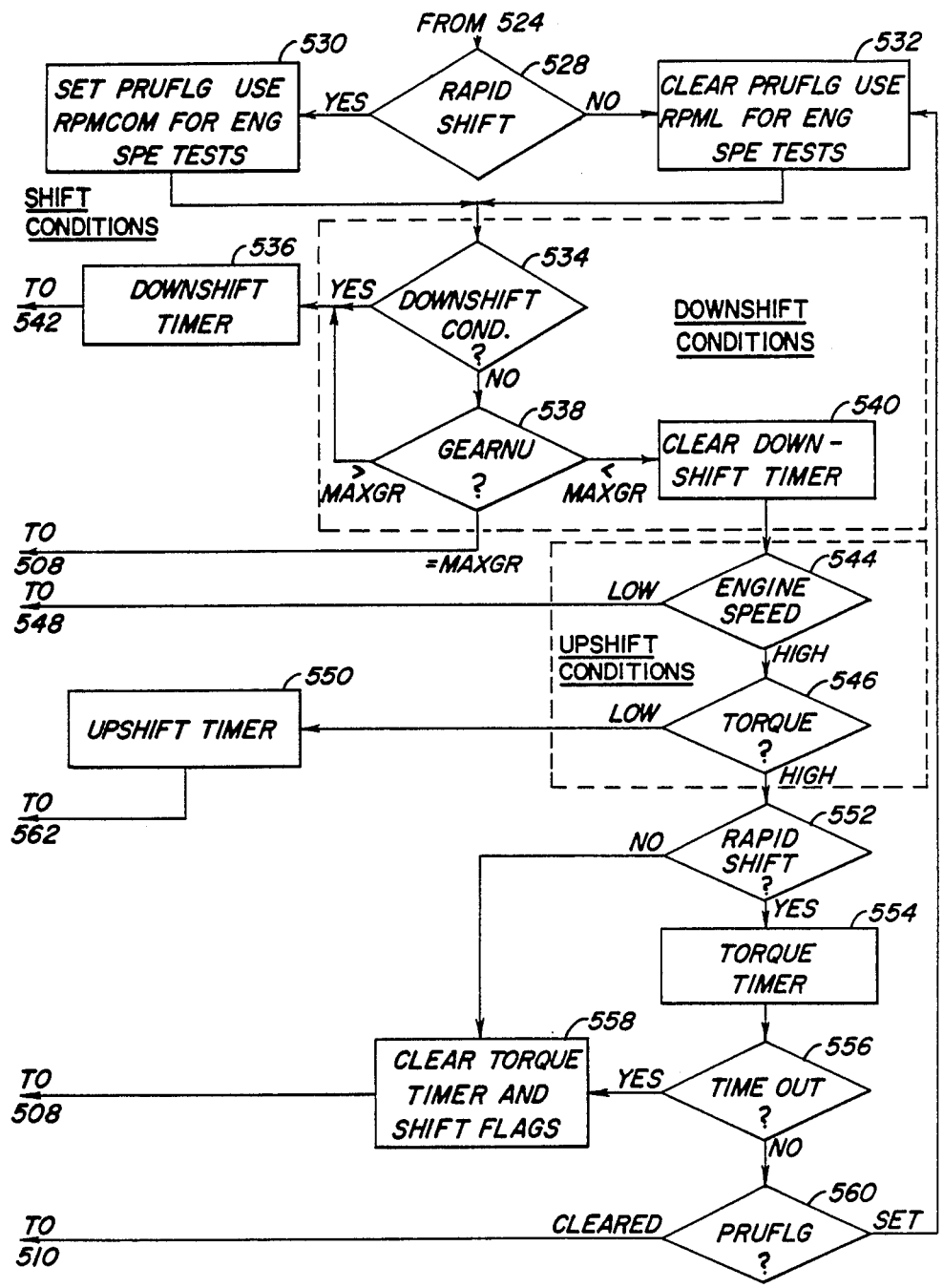
FIG. 12a(2)

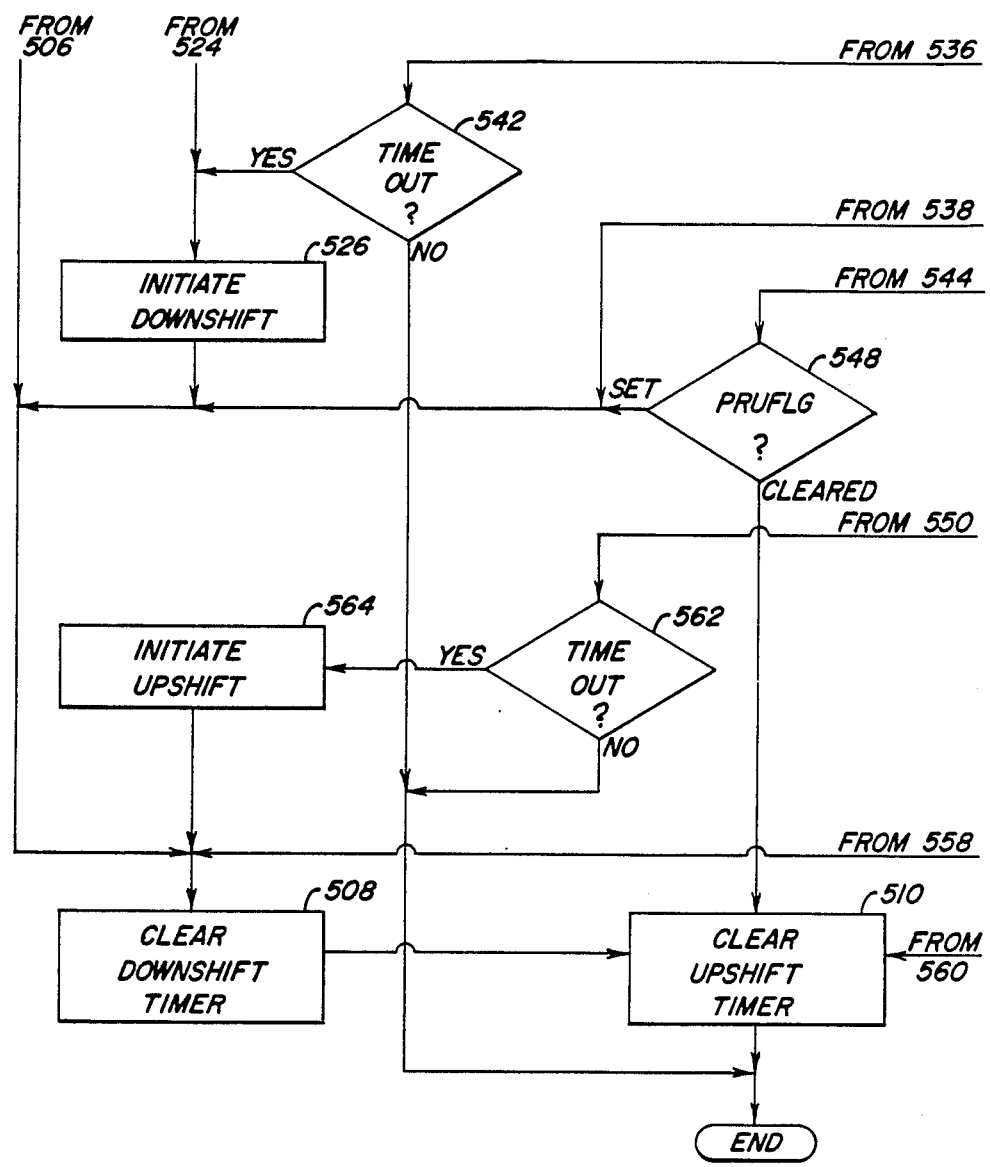
FIG. 12a (3)

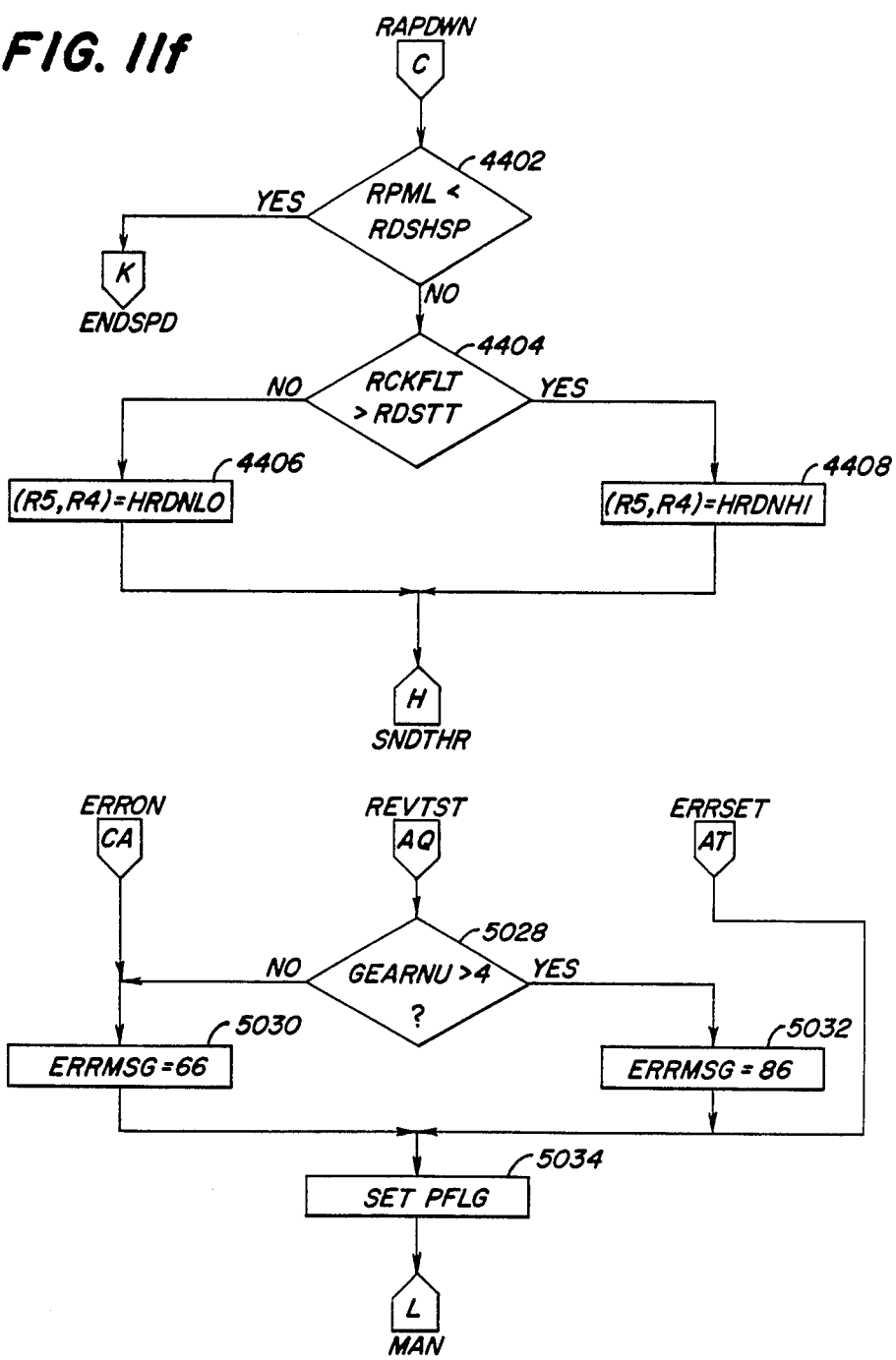

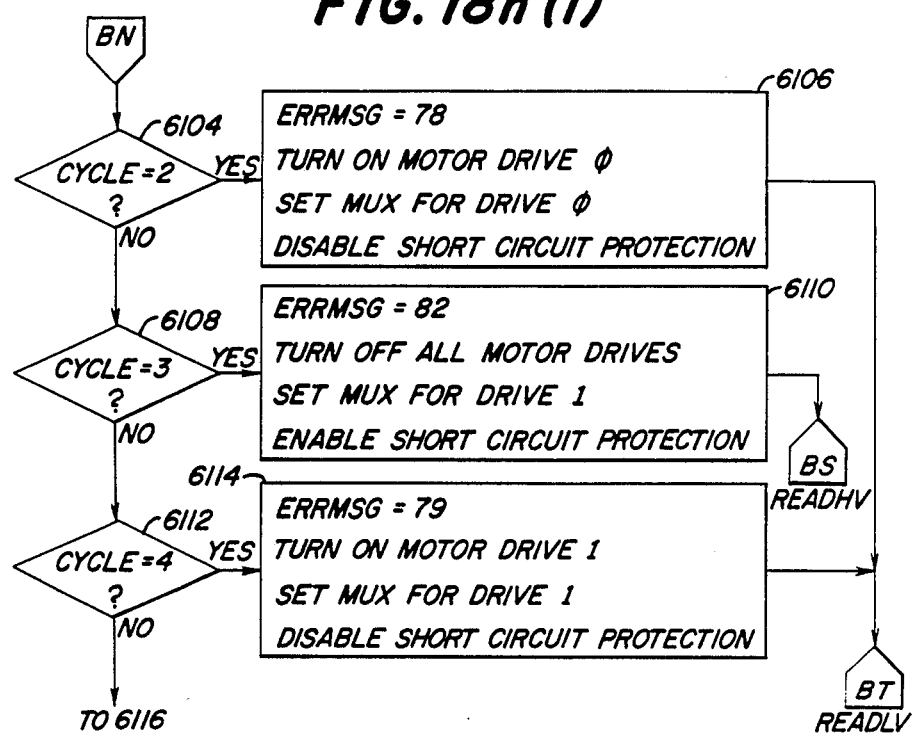
FIG. 18h (1)
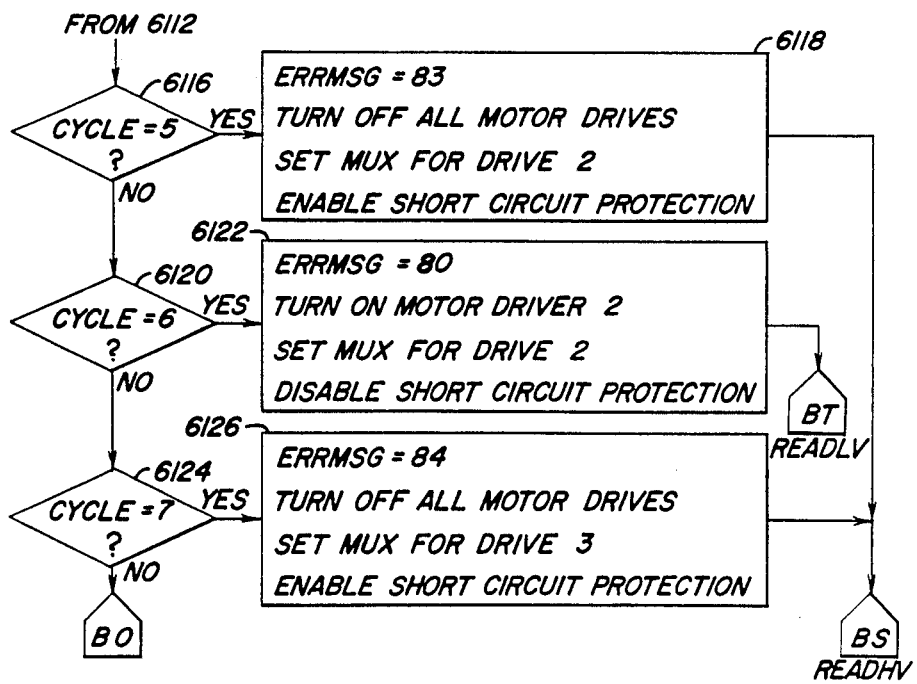
FIG. 18h (2)

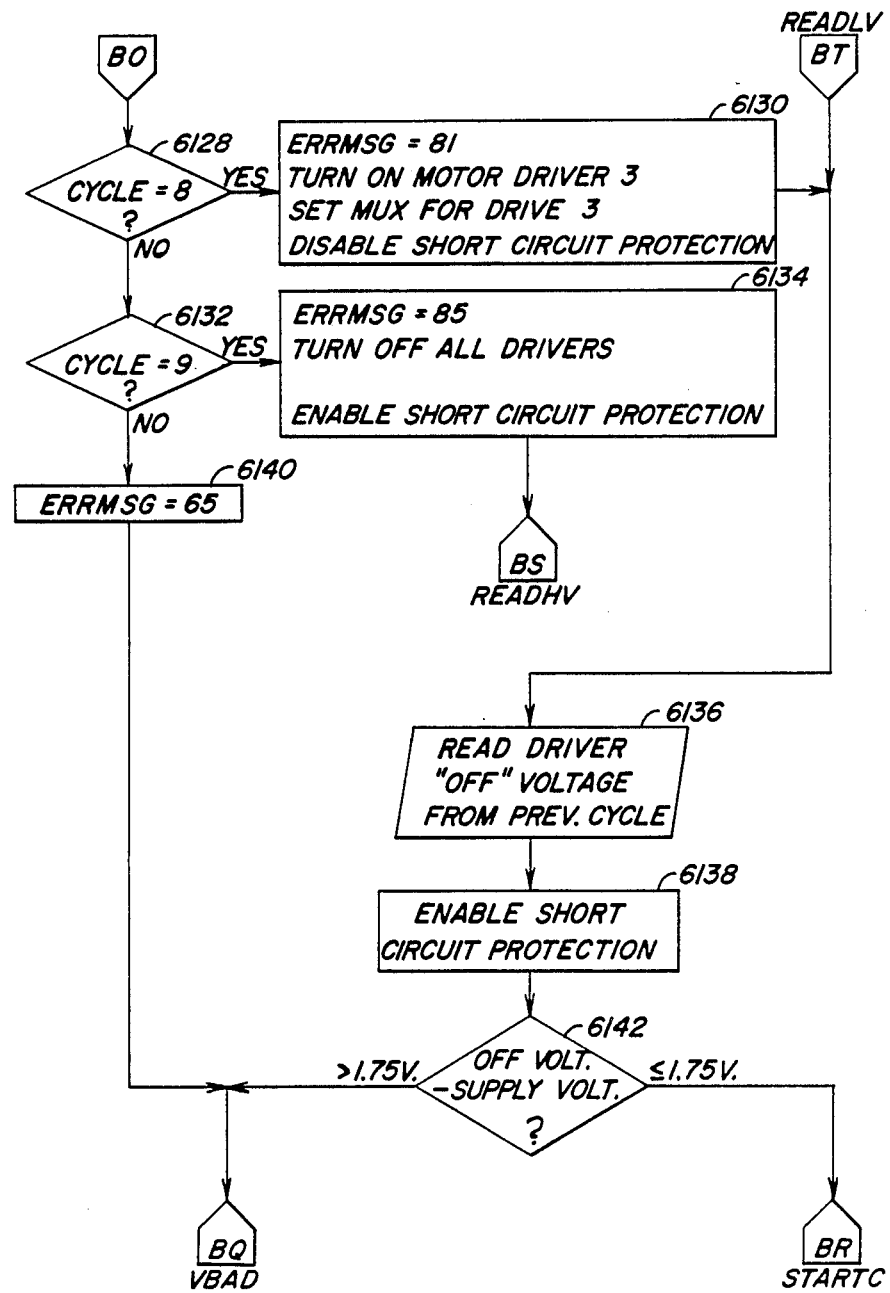
FIG. 18i(1)

FIG. 18i(2)

AUTOMATIC ENGINE/TRANSMISSION CONTROL SYSTEM

BACKGROUND OF THE INVENTION

This application includes a microfiche appendix including two microfiche and 131 frames.

A portion of the disclosure of this patent document contains material to which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

This invention relates to a control system for controlling engine speed and transmission ratio of a vehicle, such as an agricultural tractor.

CROSS REFERENCES

Various automatic transmission control systems have been utilized in production vehicles. For example, a scraper transmission controller is described in U.S. Pat. No. 4,208,929. This system cannot automatically maintain a constant vehicle ground speed. A tractor automatic transmission control system is produced by Steiger Tractor, Inc. An automatic transmission control system is described in U.S. Pat. No. 4,425,620, assigned to Steiger Tractor, Inc. This system also cannot automatically maintain a constant vehicle ground speed. Furthermore, this system can tend to rapidly upshift the transmission and surprise the operator with a rapid increase in vehicle ground speed when vehicle loading is reduced, such as when an implement is raised from the ground at the end of a field row. Another automatic tractor transmission control system is described in U.S. Pat. No. 4,561,055, and assigned to the assignee of this application. This system, too, cannot automatically maintain a constant vehicle ground speed.

A system for controlling tractor engine speed and transmission ratio is outlined in ASAE Paper No. 83-1061 entitled "Automatic Control of Tractor Engine Speed and Transmission Ratio", by W. J. Chancellor and N. C. Thai, June 26-29, 1983. However, this system does not have separate selectable ground speed and engine speed control modes.

A performance advisory system is described in U.S. application Ser. No. 412,746, filed 30 Aug. 1982, assigned to the assignee of this application and now abandoned. However, this system can only generate instructions for an operator to follow. It cannot automatically control the vehicle engine and transmission.

SUMMARY OF THE INVENTION

An object of the present invention is to provide a control system which can automatically maintain constant vehicle ground speed through control of engine speed and transmission gear ratio.

Another object of this invention is to provide a transmission controller wherein the frequency of shifts depends upon whether the shifts are in response to an operator command or in response to some other sensed parameter.

Another object of the present invention is to provide a control system with a constant ground speed control mode wherein the transmission is shifted to precisely matched load variations and wherein the most fuel efficient combination of engine speed and transmission gear is selected.

A further object of this invention is to provide a control system with separate selectable control modes, such as a constant ground speed mode, a constant engine speed and a manual control mode.

A further object is to provide such a control system wherein the position of a single lever represents desired ground speed in one mode, and represents desired engine speed in the other modes.

Another object of this invention is to provide such a control system which can automatically or manually change from one control mode to another without causing abrupt changes in engine speed.

These and other objects are achieved by the present control system which includes an engine speed sensor and a gear ratio sensor. Operator controls include an auto/manual mode selector, a ground speed/engine speed mode selector, a gear selector, a top gear limit switch and a speed lever for setting desired ground speed or desired engine speed. A control unit executes a control algorithm and generates control signals which are applied to a gear shift interface mechanism and to an electronic engine speed governor.

The automatic power train control system has two automatic operational modes (constant ground speed and constant engine speed) and a manual mode.

The constant ground speed mode extends the operator's capabilities by shifting to precisely match load variations and by consistently selecting the most fuel efficient combination of engine speed and transmission gear for the travel speed commanded.

This is accomplished by having the operator input to the controller the desired ground speed. Based on this ground speed command, the controller will automatically select the proper transmission gear and engine speed to maintain that ground speed at minimum fuel consumption. When the vehicle becomes power limited, the commanded ground speed will no longer be maintained, but the transmission will continue to be shifted in response to load changes to keep the engine from stalling and to maintain the maximum possible productivity.

When in the ground speed mode, the controller regulates both engine speed and transmission gear. This mode uses the full capabilities of the system. The ground speed command from the operator is multiplied by the current sensed gear ratio to form the engine speed command. The engine is maintained at the commanded speed by the electronic governor. The transmission controller shifts transmission gears to control engine load via an electrically actuated step motor connected to a rotary shift valve.

In the constant engine speed mode, the engine speed is held constant and the transmission is shifted to regulate the load on the engine without regard to ground speed. The operator is responsible for selecting the proper engine speed and top gear limit.

In the manual mode, the operator has direct control over the engine speed and transmission gear. The controller is disconnected from the transmission by the auto/manual switch.

BRIEF DESCRIPTION OF THE DRAWINGS

FIG. 4a is a view of a control panel for use with the present invention.

FIGS. 4b-4d are diagrams of the possible positions of the auto/manual and resume switches of FIG. 1.

FIG. 5 is a graphical representation of the torque-speed characteristic of the engine 10.

FIG. 6 is a timing diagram of the multiplexed MFF/SLP signal from the signal converting and mulitplexing circuit of FIG. 1.

FIGS. 18a-18g, 18h(1), 18h(2), 18i(1), 18i(2) form a flow chart of a TIMER 1 interrupt routine.

DETAILED DESCRIPTION

Figure 1:
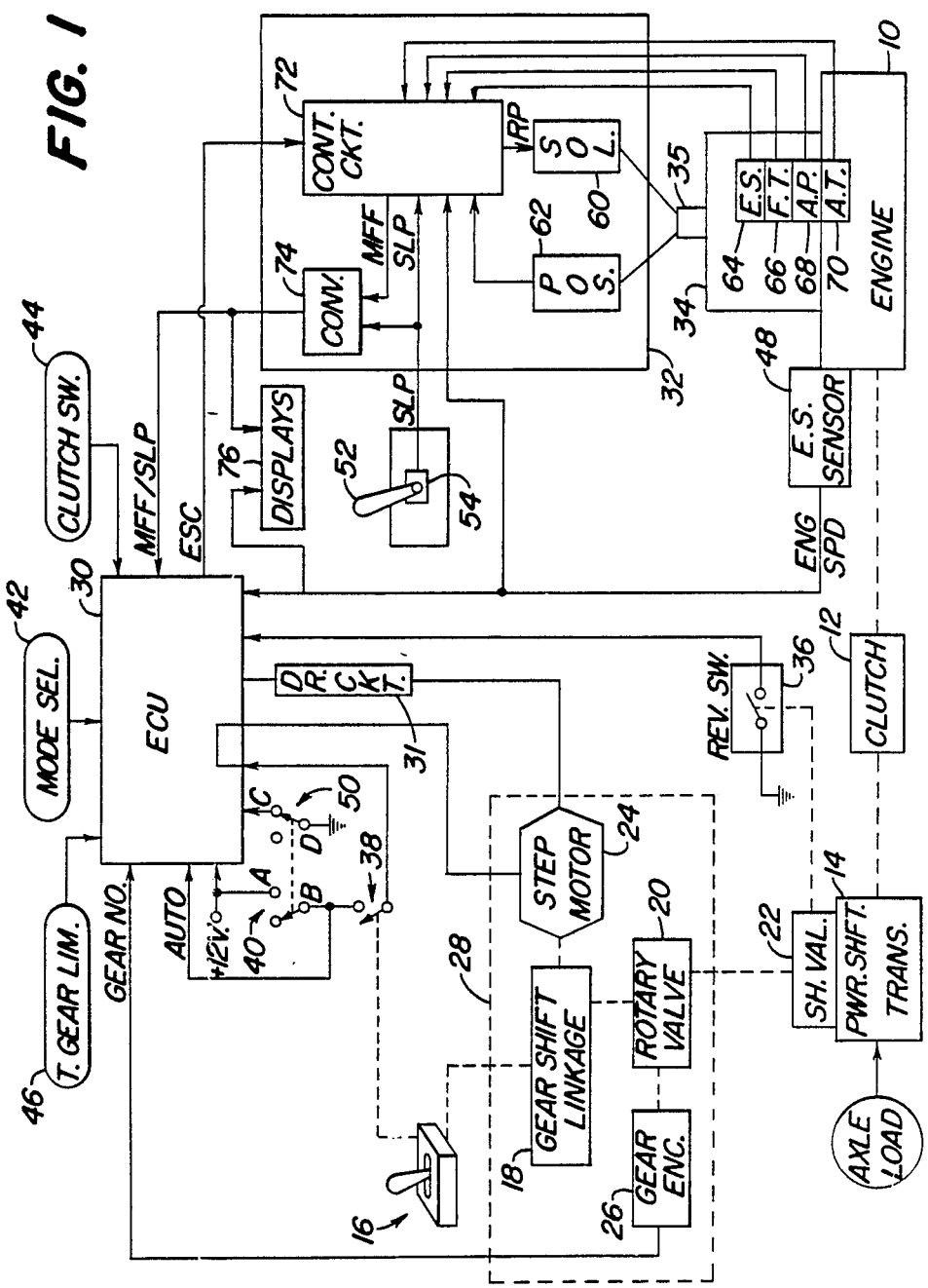
FIG. 1 is a simplified schematic block diagram of an automatic power train control system constructed according to the present invention.
Figure 2A:
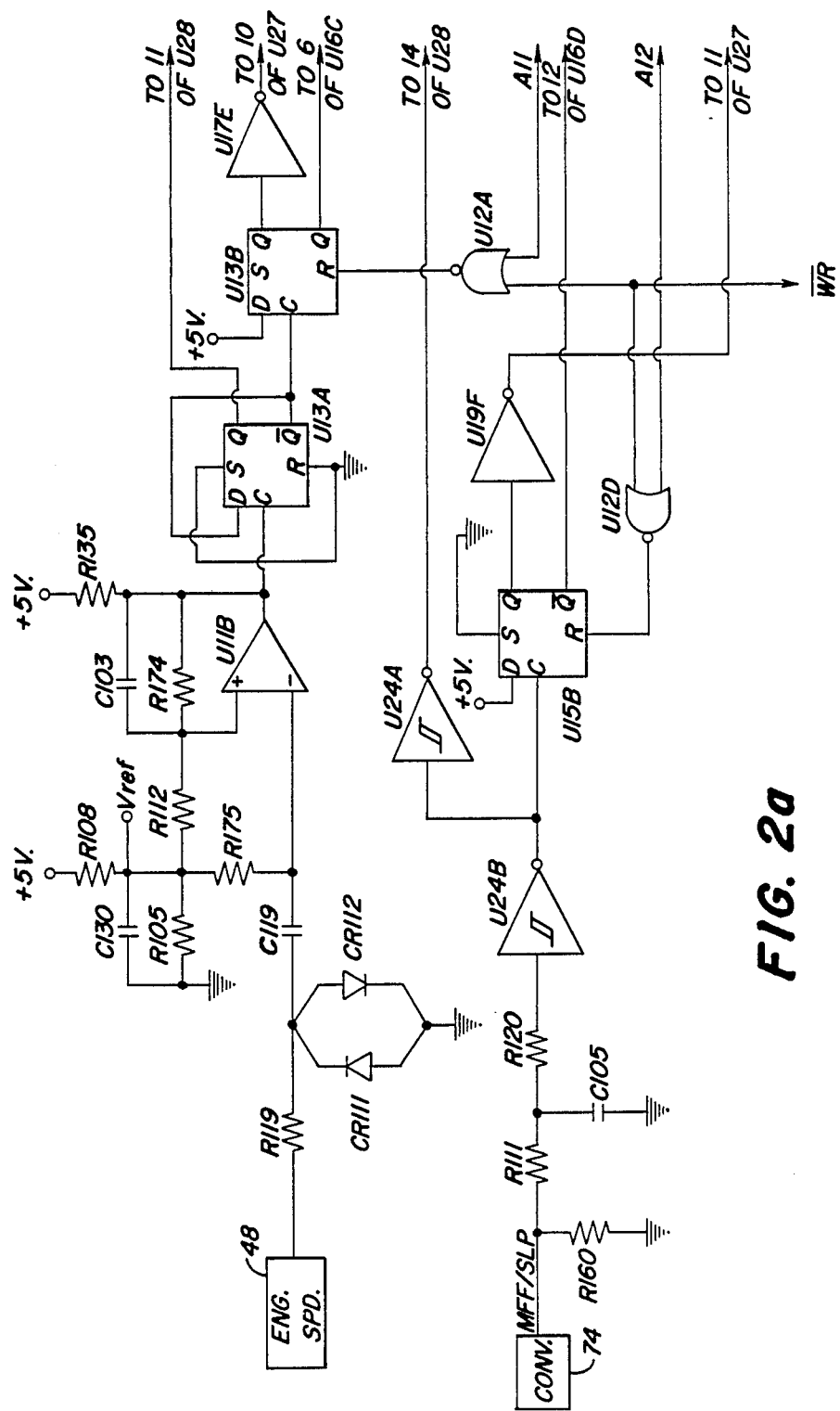
FIGS. 2a-2a are detailed circuit diagrams of the ECU of FIG. 1.
Figure 2C:
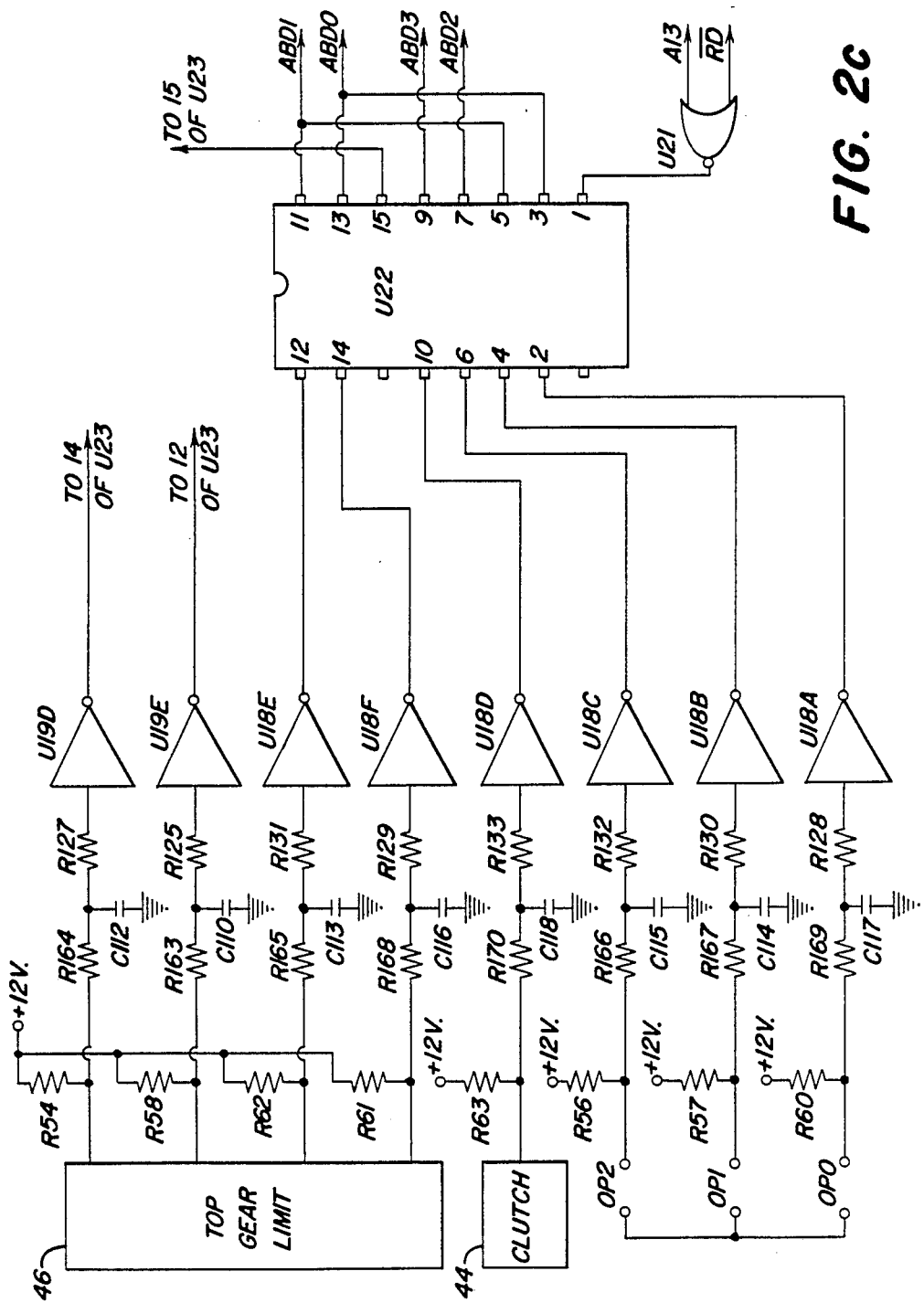
Figure 2D:
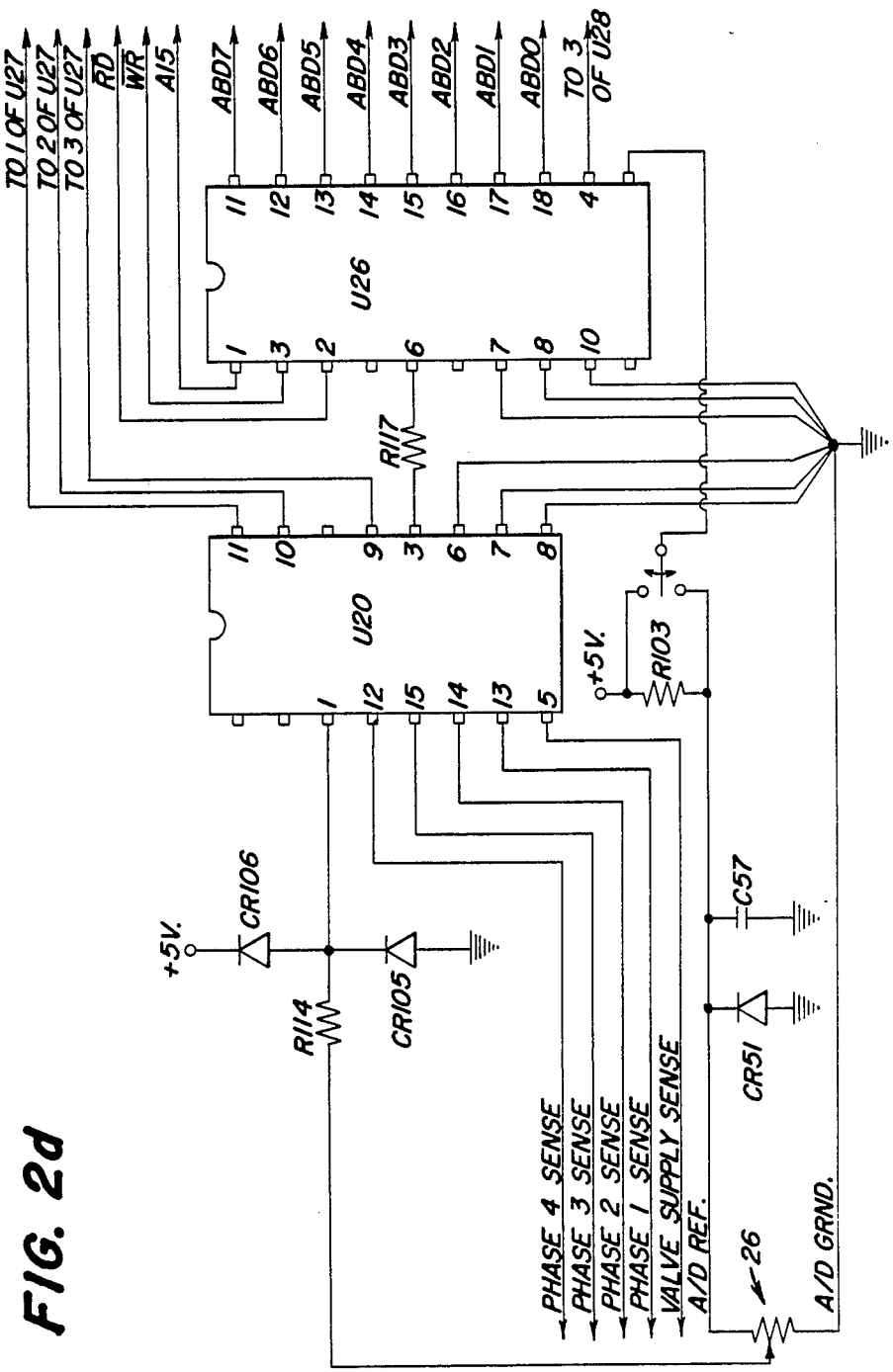
Figure 2E:
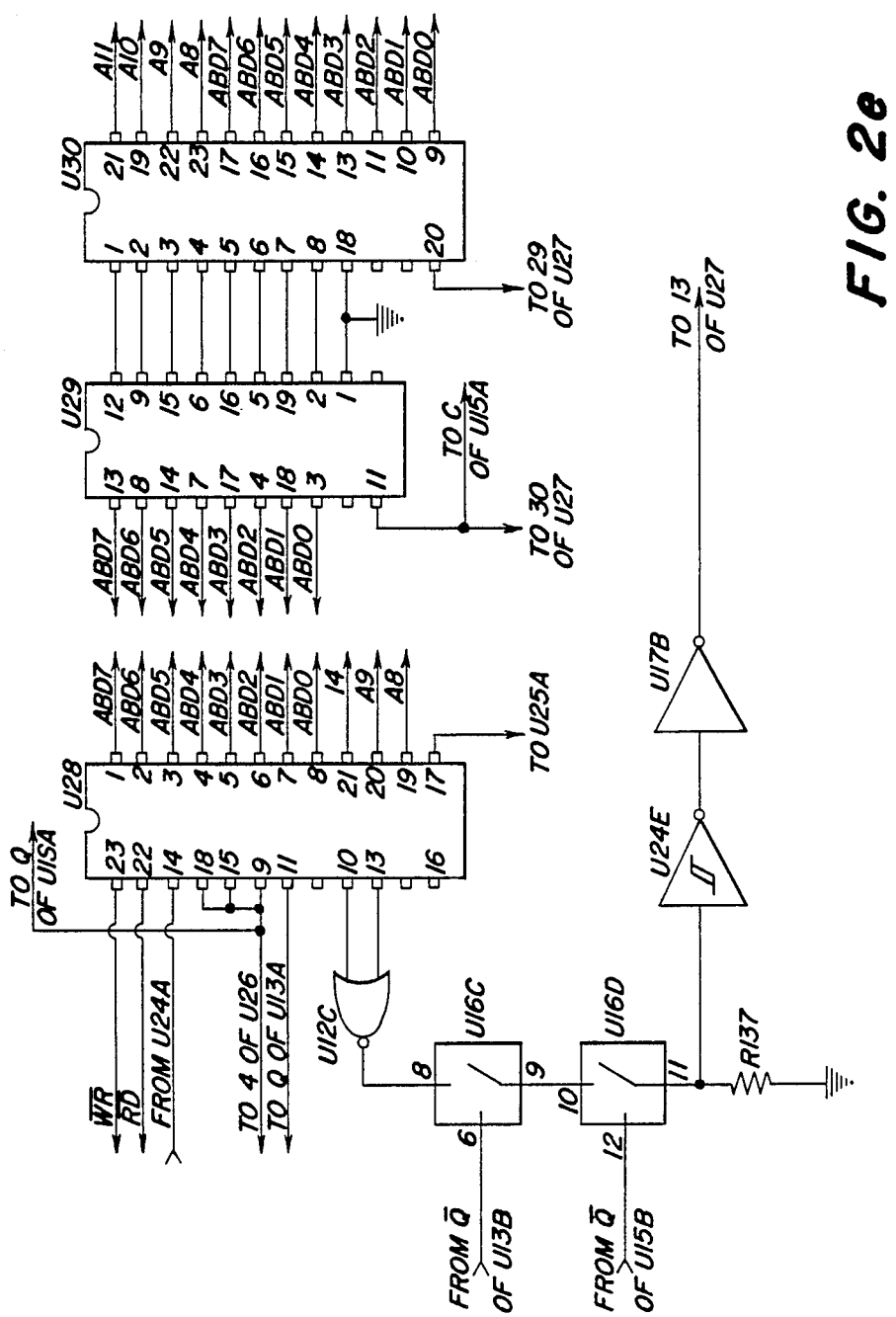
Figure 2F:
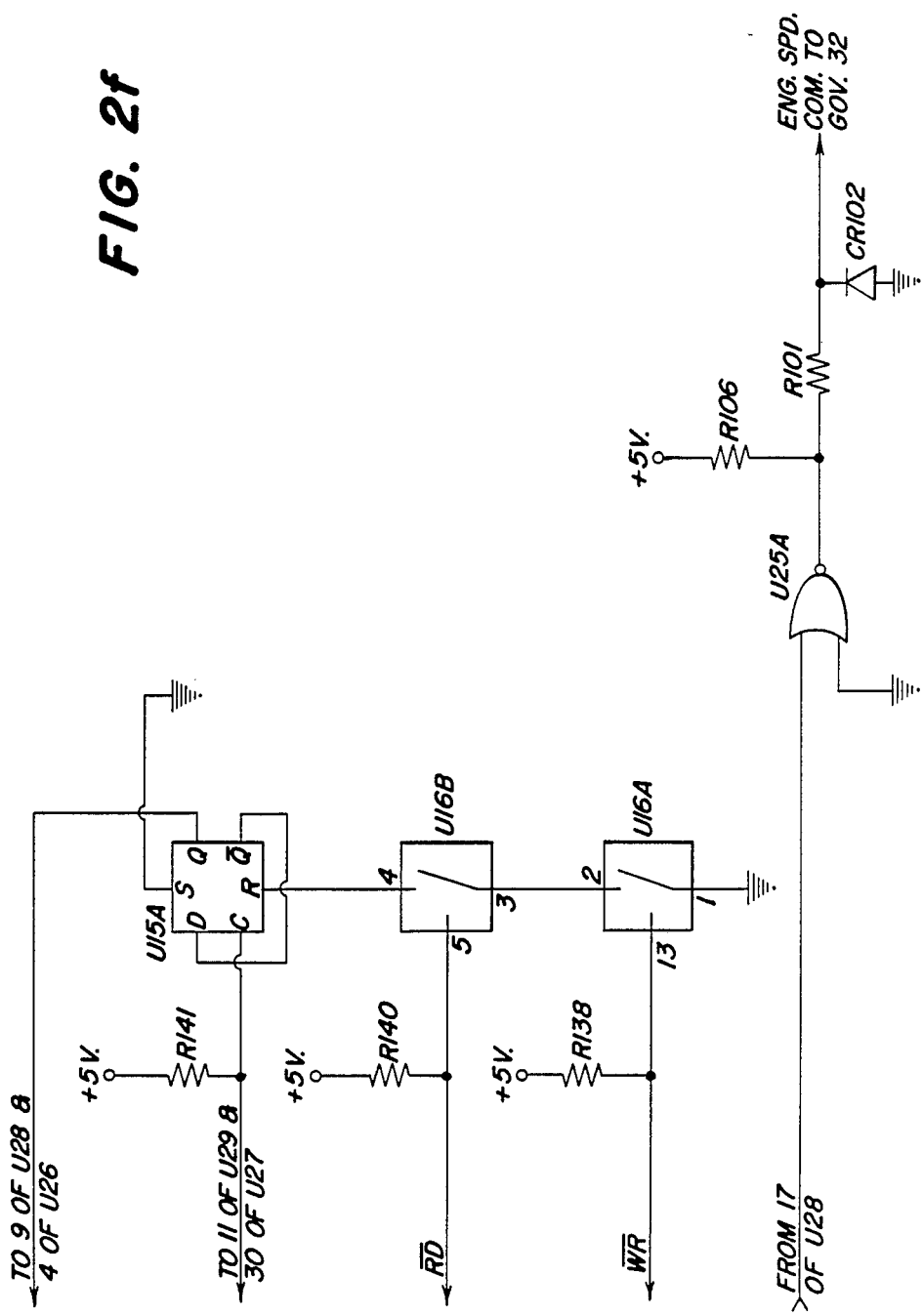
Figure 2G:
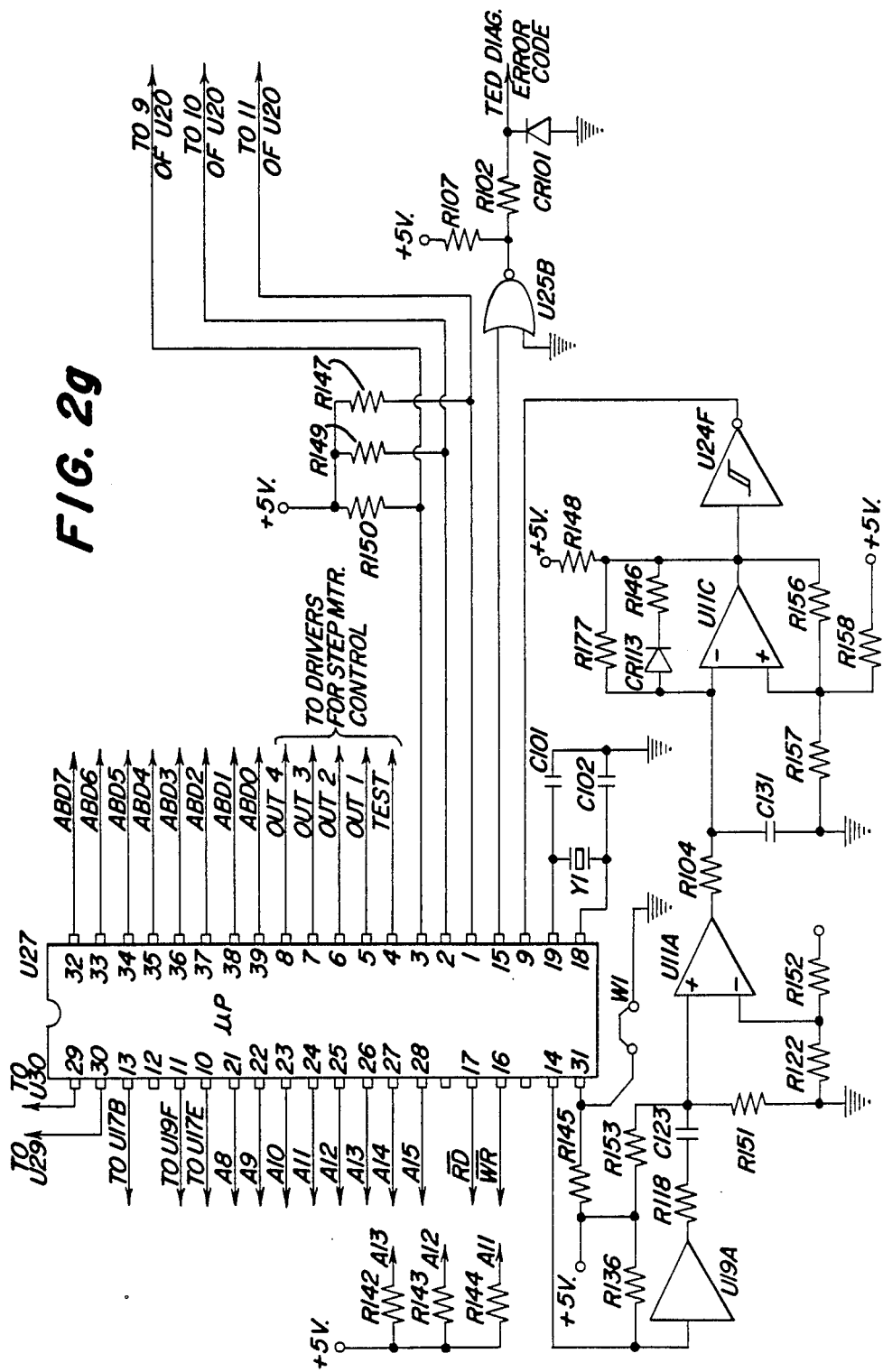
Figure 3A:
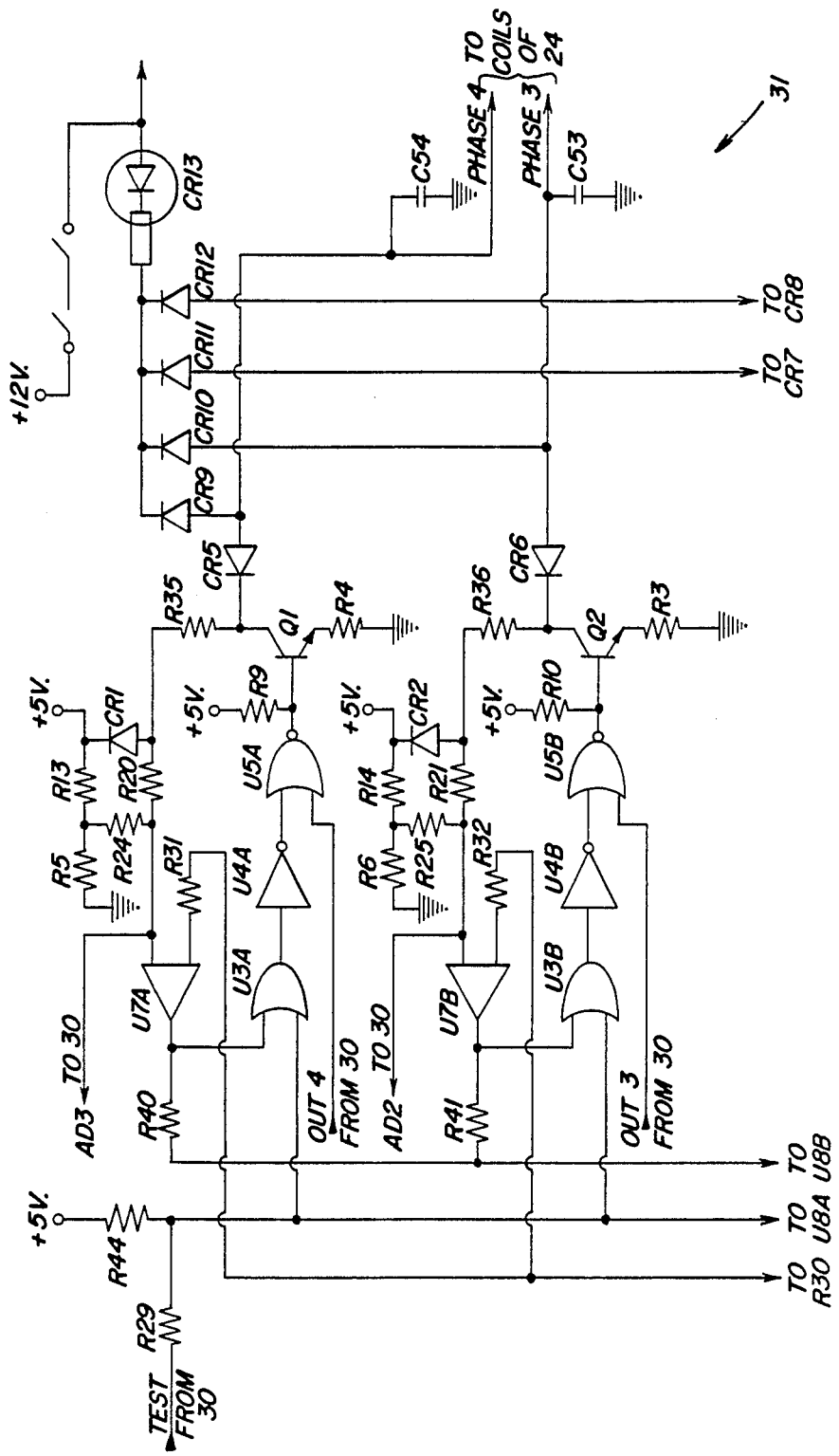
FIGS. 3a-3c are detailed circuit diagrams of the driver circuit of FIG. 1.
Figure 3B:
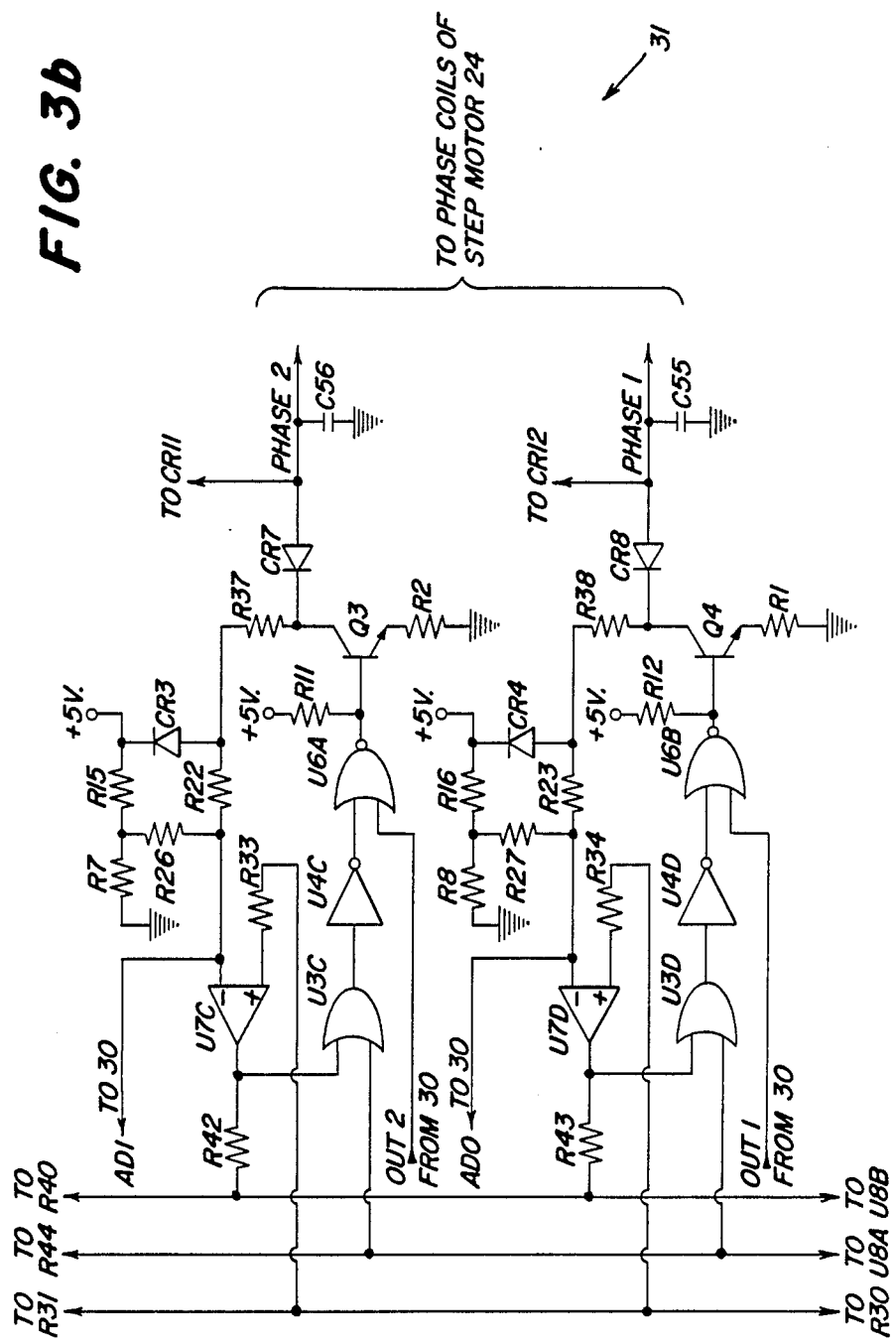
Figure 3C:
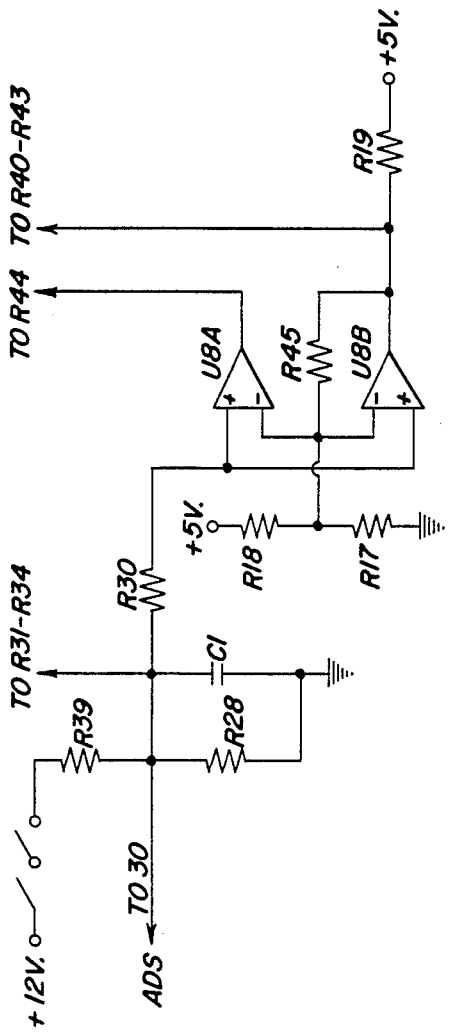
Figure 3D:
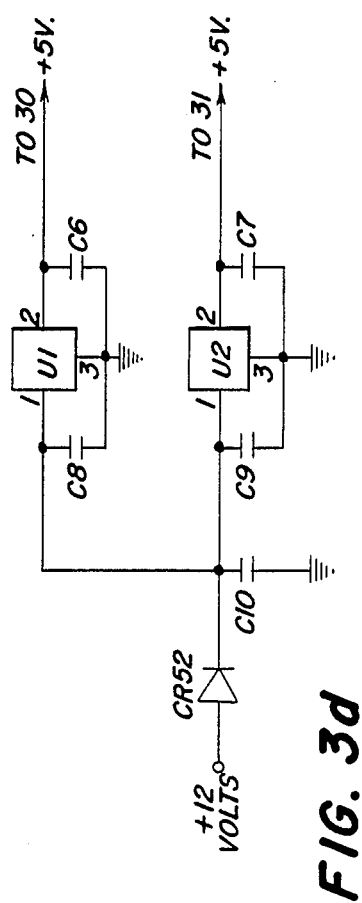
FIG. 3d is a circuit diagram of a power supply circuit for the circuits of FIGS. 2a-g and FIGS. 3a-c.

Referring to FIG. 1, a conventional diesel engine 10 drives a conventional, manually operated clutch 12 which, in turn, drives a conventional transmission 14, preferably a 15-speed power shift transmission, such as described in U.S. Pat. No. 4,345,490 and as available on production John Deere Series 50 Row Crop Tractors. The transmission 14 may be manually operated by a known production shift lever assembly 16 via a production gear shift linkage 18, a production rotary valve 20 and production shift valves 22. The gear shift linkage 18 may also be operated by a known stepper motor 24, such as a Model No. 072-006-RA from Warner Electric Brake and Clutch, or equivalent. A gear encoder 26 (rotary potentiometer) is coupled to the gear shift linkage 18 to provide a signal which represents the position of lever 16 and the position of the gear ratio of the transmission 14. Elements 18, 20, 24 and 26 are parts of an interface mechanism 28. This interface mechanism may be such as described in detail in U.S. Pat. No. 4,463,628, which is incorporated by reference herein. Of course, other interface mechanisms would suffice. For example, a worm gear connection (not shown) could be substituted for the bevel gear connection (not shown) of the '628 patent.

An electronic control unit 30 (ECU) generates and supplies shift control signals to the stepper motor 24 via step motor driver circuit 31 to shift the transmission 14 and generates and supplies an engine speed command signal (ESC) to an electronic governor 32 which governs engine speed via a conventional production fuel pump 34, such as an in-line fuel pump controlled by the position of a rack 35.

The step motor 24 may be a commercially available stepper motor such as Model No. 072-0060-RA from Warner Brake and Clutch, or equivalent.

The control system includes a normally open reverse switch 36 coupled to ECU 30 which is closed when the reverse valve (not shown, but part of the known shift valves 22) is operated to shift the transmission into reverse.

A neutral switch 38 is electrically connected to ECU 30 and to the lever of shift lever assembly 16 so that it is normally closed, and opened only when the lever and the transmission 14 is in neutral.

An auto manual switch 40 is electrically connected to ECU 30 and is in series with neutral switch 38 so that +12 volts is communicated to the coils of stepper motor 24 via switches 38 and 40. Switch 40 is manually operated and may be closed and opened to cause ECU to operate in its automatic and manual modes, respectively. Power for the stepper motor 24 passes through switches 38 and 40, thus preventing the motor 24 from operating when the transmission 14 is in neutral or when the operator has commanded manual.

A mode select switch 42 is coupled to ECU 30 and is opened and closed to cause ECU 30 to operate in its ground speed and engine speed control modes, respectively.

A clutch switch 44 is activated by the clutch pedal (not shown) and is closed and opened to indicate to the ECU 30 that the clutch pedal is released and depressed, respectively.

A top gear limit switch 46 is set by the operator to indicate the highest gear beyond which it is desired that the transmission 14 not be shifted. Preferably, switch 46 is a binary encoded rotary switch with 4-bit positive logic so that the 15 forward gears plus neutral of transmission 14 can be represented by the positions of switch 46. Switch 46 provides four parallel binary encoded bits. Logic zero is a short to ground and logic 1 is open.

A mag pick-up type engine speed sensor 48 senses engine speed from the gear teeth on the engine timing gear (not shown) and provides ECU 30 with a frequency signal proportional to engine speed as 2.609 engine rpm per Hz. This frequency is converted to a digital number representing the period of pulses from sensor 48 by a counter under the control of ECU 30 in a well known manner, as will be described later with respect to FIG. 19 c. This period is, of course, inversely related to the engine speed.

The ECU 30 also receives an analog signal representing the actual gear ratio of the transmission 14 from gear encoder 26. The ECU 30, as described later, derives the actual wheel speed of the vehicle from the signals provided by engine speed sensor 48 and from gear ratio encoder 26. Except for wheel slip, this wheel speed is essentially the vehicle ground speed.

A resume switch 50 is associated with the auto manual switch 40 and is used to return the control system to its automatic mode after the controller has placed itself in the manual operational mode. When the resume switch 50 is pressed, it pulls the resume line to the ECU to ground; otherwise, it is logic 1 or open.

With respect to each of switches 36, 42, 44 and 50, one side is grounded and the other side is connected to +12 volts via a pull-up resistor (not shown) and to the ECU 30.

An operator-controlled speed lever 52 is mounted in the operator's compartment. The lever is connected to a rotary potentiometer 54 which generates an analog voltage (SLP) representing the position of lever 52.

The ECU 30 may also include an input (not shown) for a radar ground speed sensor (not shown) such as described in U.S. Pat. No. 4,489,321, issued 18 Dec. 1984. In that case, ground speed information could be obtained directly from the ground speed sensor rather than from sensed engine speed and gear ratio.

Referring now to FIG. 4a, we see a console 80 which may be located at a convenient location in the operator's compartment (not shown). Mounted in the console 80 are the shift control lever assembly 16, a knob 82 for operating the top gear limit switch 46, the speed control lever 52 and the auto/manua/l-resume switches 40, 50. Also mounted in the console 80 is a mechanical adjustable stop 84 controlled by rotary knob 86.

The auto/manual switch 40 and the resume switch 50 may be implemented by a known 3-position rocker switch, such as No. 8555K915X33V from Cutler-Hammer, Inc. This rocker switch may be detent-held in a manual position, detent-held in an auto position, or momentarily placed in a resume position, as illustrated schematically in FIGS. 4b, c and d, respectively. In the manual position, the power to the step motor is disconnected, and manual mode is signaled to the controller. In the detented middle or automatic position, power is applied to the step motor, the engine speed command from the controller to the governor is enabled, and auto mode is signaled to the controller. The extreme right or resume position is momentary. In the resume position, the power is applied to the step motor, the engine speed command from the controller to the governor is enabled, and manual mode is signaled to the controller.

The electronic governor 32 may include an actuator 60, such as a linear solenoid-type electromagnetic actuator connected to the rack 35 and a rack position sensor 62, such as are shown in U.S. Pat. No. 4,425, 889. The system may also include additional sensors ... for example, a primary engine speed sensor 64 (as a back-up if engine speed sensor 48 fails), a fuel temperature sensor 66, an intake air pressure sensor 68, and an intake air temperature sensor 70. The electronic governor 32 also includes a control circuit 72 which generates a basic target fuel injection amount or mass fuel flow (MFF) and a final target fuel injection amount or rack position signal (RP), (including fuel temperature compensation) as a function of the signals from sensors 54 and 62–70. An example of such a control circuit is described in the aforementioned U.S. Pat. No. 4,425,889, which is incorporated by reference herein. Other exemplary governor systems are described in U.S. Pat. Nos. 4,223,654, 4,357,920 and 4,359,991 which are incorporated by reference herein. The rack position signal, RP, is applied to the actuator 60.

In addition, the electronic governor 32 preferably includes a signal converting and multiplexing circuit 74 which receives the MFF signal and the SLP signal from potentiometer 54 and combines and converts them into a time multiplexed pulse-width modulated signal for communication to an input of the ECU 30.

Control circuit 72 also will normally respond to the speed lever position signal, SLP, from potentiometer 54, except when the ECU 30 generates the engine signal command signal, ESC, then the SLP signal is ignored by control circuit 73, which then responds to the ESC signal instead.

Although it is not necessary to the present invention, it may be desirable to have conventional display devices 76 placed in the vehicle dashboard (not shown) to display operational information, such as the operational mode and the selected gear, to the vehicle operator. It may also be desirable for the display devices 76 to include a dual display device (not shown) to display the commanded or desired ground speed and the actual ground speed. Also, a diagnostic display (not shown) may be included to display various diagnositc messages which could be generated by the ECU 30. This aspect also forms no part of the present invention and is not needed for the system to operate as an automatic control system.

For further details concerning the ECU 30 and the driver circuit 31, the reader is referred to FIGS. 2a–2g, 3a–3c and 4, and to the Component List which appears later in this detailed description.

Briefly, it should be pointed out that the ECU 30 may be based on an Intel 3051 microprocessor U27 and includes a watchdog timer which will reset the microprocessor U27 if the watchdog timer is not reset every 35.6 miliseconds (for example) by the microprocessor U27. The watchdog timer is a resistor-capacitor network which includes integrated circuits (ICs), U19A, U11A, U11C and U24F.

Also included in ECU 30 are three separate external counters which are hereinafter designated as External Counter 0, External Counter 1 and External Counter 2. These external counters are all contained in the programmable interval timer IC U28 shown in FIG. 2e.

External Counter 0 times the period of the pulse train from engine speed sensor 48. External Counter 1 times the pulse widths of the MFF/SLP signal from governor 32. External Counter 2 generates the ESC signal pulse width which is communicated to governor 32. Overflow flags from External Counters 0 and 1, in addition to the engine speed and MFF,/SLP pulses, drive an external interrupt 1 (Pin 13) on the Microprocessor U27. An internal counter 1 (in the microprocessor U27) is used for timing the control of the phase coils of step motor 24 and for timing the main control loop period. All these counters, both internal and external, are driven by a 500 MHz clock.

The analog voltage from gear encoder pot 26 is converted to a digital signal and communicated to microprocessor U27 by an analog-to-digital converter U26.

The +5 volt and ground connections are bypassed by 0.01 micromicrofarad capacitors (not shown) for ICs U18, U29, U30, U27, U25, U11 and Y1. Similar bypass capacitors (not shown) are connected near ICs U7, U4 and U8 and between ICs U3 and U4. ECU 30 may also include inputs to which option jumpers or switches OP0, OP1 and OP2 (see FIG. 2c), may be connected. Such jumpers may be coded to communicate information concerning vehicle model (for example) to the ECU 30. With no jumpers connected, the ECU 30 can transmit the binary number representing gear encoder voltage to a display for use in alignment of the encoder 26.

The ECU executes the algorithms illustrated by the flow charts of FIGS. 8-19 and represented by the computer program listings contained in the attached microfiche appendix. These algorithms provide the control system with two separate, selectable automatic operational modes, a constant ground speed mode and a constant engine speed mode. The control system also provides a manual control mode.

In the constant ground speed mode, the control system automatically shifts the transmission 14 to precisely match load variations and by selecting the most fuel efficient combination of engine speed and gear ratio for the desired ground speed.

This is accomplished by having the operator input to the controller the desired ground speed via the speed lever 52. Based on this ground speed command, the controller will select the proper transmission gear and engine speed to maintain that ground speed at minimum fuel consumption. When the vehicle becomes power limited, the commanded ground speed will no longer be maintained, but the transmission 14 will continue to be shifted in response to load changes to keep the engine 10 from stalling and to maintain the maximum possible productivity.

In the constant ground speed mode, the control system regulates both engine speed and transmission gear. This mode uses the full capabilities of the system. The ground speed command from the lever 52 is multiplied by the current gear ratio to form the engine speed command. The engine 10 is maintained at the commanded speed by the electronic governor 32. The transmission controller shifts transmission gears to control engine load via the step motor 24 connected to the rotary shift valve 20. An engine torque value is derived from the mass fuel flow signal MFF from the electronic governor 32.

In the constant engine speed mode, the engine speed is held constant and the transmission 14 is shifted to regulate the load on the engine without regard to ground speed. The operator is responsible for selecting the proper engine speed via lever 52 and the top gear limit via switch 46.

In manual, the operator has direct control over the engine speed and transmission gear. The controller is disconnected from the transmission by the auto/manual switch.

The speed lever 52 is a dual function lever. Due to the operation of ECU 30 and governor 32, it operates as the normal hand throttle when the controller is in the manual or the engine speed control modes. This lever is recalibrated in ground speed when the controller is in ground speed mode. In all cases, the operator pushes forward to speed up and pulls back to slow down.

Automatic operation can be initiated in any forward gear by putting the auto/manual selection switch 40 in the AUTO position. Attempts to enter automatic in reverse, neutral, or park will not be allowed by the controller and will produce a diagnostic message.

If the gear shift lever 16 is manually moved while in automatic, the system will discontinue generating automatic shift signals so that the system will revert to controller commanded manual operation. Pressing the RESUME position on the auto/manual selection switch will cause the system to attempt to re-enter automatic. Cycling the auto,/manual switch 40 to the MANUAL position and then back to the AUTO position will also cause the system to attempt to re-enter automatic.

The selected mode may be changed at any time. With the mode switch 42 in the GROUND SPEED position, the operator selects the desired ground speed with the lever 52 and the system selects the correct engine speed and transmission gear to maintain that ground speed, using minimum fuel, subject to the maximum power limit of the engine and the top gear limit, as selected by the operator via switch 46.

With the mode switch 42 in the ENGINE SPEED position, the lever 52 functions as a manual throttle and the operator is responsible for selecting the proper engine speed. The system will automatically shift the transmission 14 to regulate engine load. A panic downshift, a derivative downshift, and proportional downshift functions are operational in both the ground speed mode and in the engine speed mode. Rapid downshift and upshift functions in response to movement of lever 52 are operational only in the ground speed mode. Upshifting is prevented when the engine speed is below 1500 rpm to avoid shifting to the higher gears at extremely low engine speeds. The top gear limit is used to limit the maximum ground speed.

The ground speed command may be changed at any time, although it only has effect in the automatic ground speed mode. By adjusting the speed lever 52, and observing gauges for ground and engine speed, the operator can set the vehicle operation for the desired trade-off between productivity and fuel efficiency.

The system always controls for maximum fuel efficiency for the level of productivity (ground speed) commanded by the operator. The operator determines the desired ground speed based on the field conditions and the type of job to be done.

The dual display 76 indicates the current operating condition of the vehicle. If the commanded ground speed matches the actual ground speed, then the vehicle is running at the level of productivity commanded by the operator. In this mode, the ground speed will remain constant (up to the point of maximum engine power) even if the load is removed from the vehicle. This mode is useful when constant ground speed and fuel economy is more important than productivity.

If the commanded ground speed is greater than the actual ground speed, the commanded level of productivity exceeds the power level of the vehicle. In this mode, the vehicle will speed up to the commanded ground speed when the load is removed and will slow down when the load is increased. The vehicle will never exceed the commanded ground speed under any condition. This mode is useful when maximum productivity is more important than constant ground speed or fuel economy. It is suggested that when operating in this manner, the commanded ground speed not be set higher than the maximum comfortable operating speed for the current conditions.

The ground speed of the vehicle may be changed at any time by adjusting the speed lever 52. The system then automatically selects the transmission gear and engine speed for the commanded ground speed.

The top gear limit selector switch 46 allows the operator to select the highest allowable gear to which the transmission 14 may be automatically shifted. This control may be adjusted at any time. If the top gear limit is set below the current transmission gear, the system will slowly automatically downshift the transmission to the new top gear. Setting the top gear limit above the current transmission gear will allow the system to automatically upshift to the new limit when conditions permit. The top gear limit control has no effect in manual operation.

Automatic operation may be terminated at any time by manually shifting the transmission via lever 16, by depressing the clutch pedal (not shown) or by placing the auto/manual switch 40 in the MANUAL position.

Shifting the transmission manually via lever 16 or depressing the clutch pedal (not shown) will cause the system to revert to controller commanded manual. In this mode, the system will no longer automatically shift the transmission. Automatic control of the engine speed is still retained by the system, but the speed lever 52 will command engine speed via a variable gain throttle algorithm. This algorithm performs a rescaling such that the lever 52 position commands the same engine speed as was commanded in the ground speed control mode. The system will continue with this reduced sensitivity to the position of lever 52 until the lever 52 is moved such that the engine 10 is at either high idle or low idle. If the lever 52 is pushed past the position which commands the engine speed to high idle (or pulled below the position which commands low idle), the engine speed remains at high idle (low idle) and the lever gain is adjusted to make that position of lever 52 the new high idle (low idle) position, thus increasing the lever sensitivity. Full manual lever sensitivity is restored when the lever 52 has reached either the full ahead or full back position. This feature prevents the engine speed from changing abruptly when the system terminates automatic operation.

Placing the auto/manual switch 40 in the MANUAL position will force the system into the manual mode. In manual, the connection between stepper motor 24 and the power supply for its coils is broken, thus preventing any automatic shifting by the system. The speed lever 52 then commands engine speed, not ground speed.

Preferably, the ESC signal generated by ECU 30 is a pulse-width-modulated signal representing a linear percentage of the fast idle speed of the engine 10. The signal is of 256 discrete widths of 16 micro-second steps above a zero value of 256 microseconds timed from the rising to falling edge so that low idle at zero load is represented by a pulsewidth of 256+/−6 microseconds (binary 0) and so that breakaway engine speed at rated load is represented by a pulsewidth of 43365+/−6 microseconds (binary 255). The ESC signal is updated about every 10 miliseconds. These figures are, of course, merely exemplary.

Referring to FIG. 5, the ESC signal will cause the electronic governor 32 to select a part-throttle curve along which it will operate. To graphically describe how the electronic governor selects a part-throttle curve, a line is drawn from low idle, zero load to breakaway speed, rated load. Move along this line a distance proportional to the ESC signal percentage. The part-throttle curve that intercepts this point is the partthrottle curve that is selected. Note that along this line between breakaway and low idle, the engine speed error due to governor droop is zero (i.e., the engine is running at exactly the speed commanded by the ESC signal). As changes in load cause the engine speed to move along the commanded part-throttle curve, the engine speed will vary from the commanded speed.

Referring back again to FIG. 1, the time-multiplexed MFF SLP signal contains three pulse types: a sync pulse, MFF pulse and a speed lever position pulse in a total period of 20 miliseconds.

The MFF pulse represents a percentage of rated mass fuel flow and has 256 discrete widths of 16 microsecond steps above a zero value so that MFF is represented by a pulsewidth of 256 microseconds (binary 0), so that MFF is represented by a pulsewidth of 2816 microseconds (binary 160) and so that MFF is represented by a pulsewidth of 4336 microseconds (binary 255). As best seen in FIG. 6, the mass fuel flow pulse is sent every 10 miliseconds +/−0.512 miliseconds.

The pulsewidth of the speed lever position pulse varies in accordance with the relation between the position of lever 52 and its full range of positions. Thus, the pulsewidth can have 160 discrete widths of 16 microsecond steps above a zero value so that a full back speed lever position is represented by a pulsewidth of a minimum 256 microseconds, (binary 0) and so that a full forward position is represented by a pulsewidth of a maximum 2800+/−6 microseconds (binary 159).

The speed lever pulse is sent every 20 miliseconds and follows the trailing edge of the first mass fuel flow pulse by 1472+/−96 microseconds. Of course, these time periods are merely exemplary.

Figure 7:
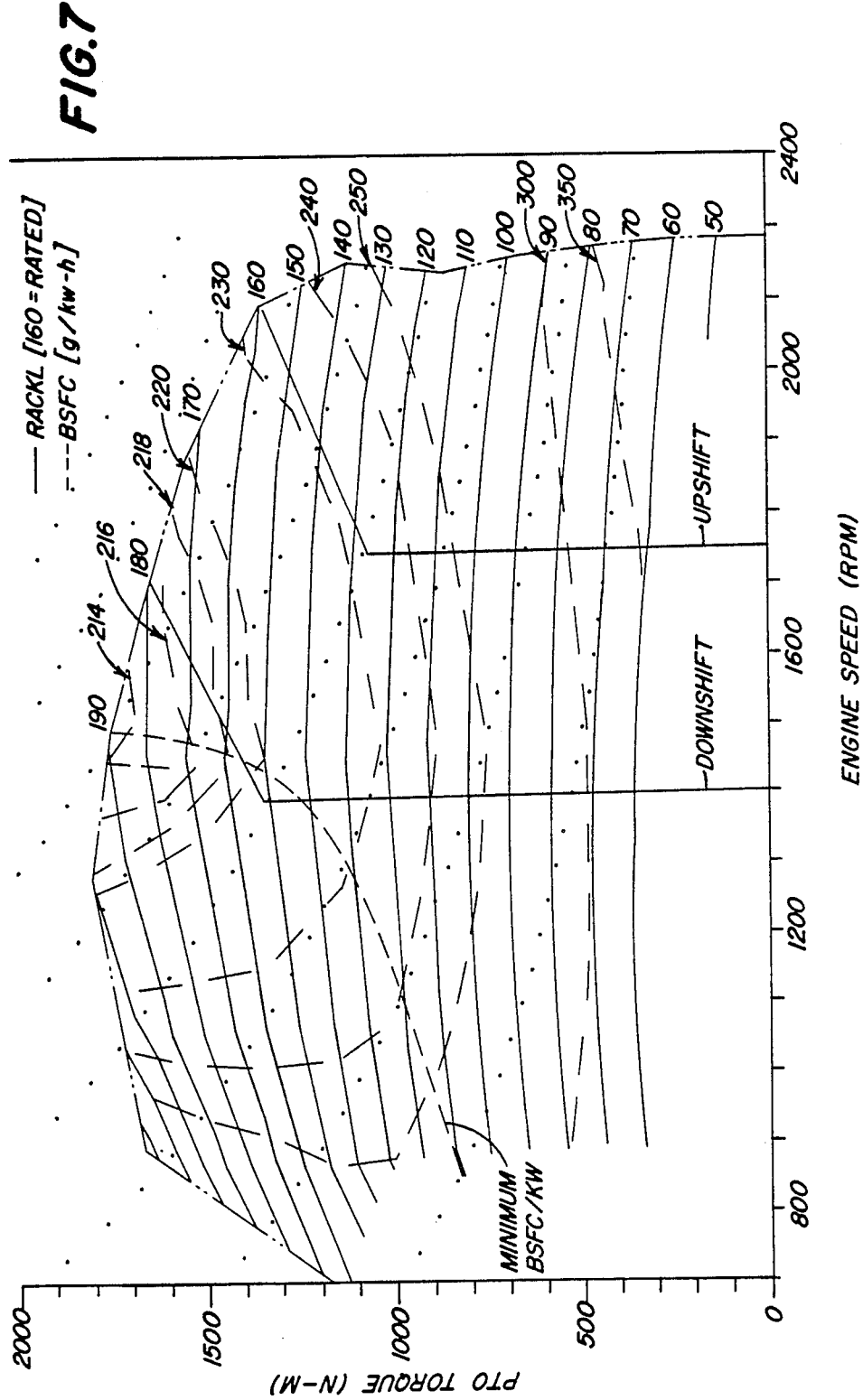
FIG. 7 is another graphical representation of a mass fuel flow vs. torque and engine speed characteristic.

Referring now to the torque vs. engine speed characteristic illustrated by FIG. 7, in the constant ground speed control mode, the major factor in determining fuel economy is the location of the operating point in the engine torque-speed map. This is determined by the upshift and downshift speeds and torques programmed into the controller. FIG. 7 shows the ideal minimum fuel trajectory in torque-speed space for a tractor (bold dashed lines). If the vehicle operation could be constrained to this trajectory, then maximum fuel efficiency would be obtained for each power level.

Due to practical considerations, such as a finite number of discrete gear ratios, non-zero shift times, engine cooling, power train stress, minimum hydraulic pump speed, etc., this ideal trajectory is not obtainable. The goal is to keep as close to the ideal trajectory as possible without violating these practical limits. The bold solid lines show a possible compromise among these goals. The transmission is upshifted when the engine torque is less than the upshift torque and the engine speed is greater than the upshift speed. Likewise, the transmission is downshifted when the engine torque is greater than the downshift torque or less than the downshift speed.

The exact location of these speed and torque lines varies with each vehicle model and with each transmission gear within each particular model. The downshift speed is determined for a particular gear as the minimum acceptable engine speed for hydraulic pump operation, engine cooling, and torque reserve for that gear. The downshift torque is then determined as the maximum acceptable torque for power train stress and wear. Since the transmission has finite gears, the spacing between the upshift and downshift torques and, likewise, the upshift and downshift speeds, must provide enough hysteresis for stable operation. The theoretical minimum hysteresis would be the percentage change in transmission gear ratios between the adjacent gears. For example, if the downshift from fourth to third gear resulted in a 15% increase in the transmission reduction ratio, the upshift speed for third gear must be at least 15% greater than the downshift speed for fourth gear. Likewise, the upshift torque for third gear must be at least 15% less than the downshift torque for fourth gear.

In practice, the hysteresis must be wider to account for losses in the power train, noise in the system, governor droop, etc. Table 1 shows the ground speed mode shift points for an example vehicle. The program listing in the attached microfiche appendix includes data representing such shift points.

The selection of the engine speed mode shift points differs in two ways from that of the ground speed; (1) since the ground speed is no longer held constant, the form of the implement load line is very important, and (2) since the shifting is based only on engine torque, there are no speed points to calculate (the panic downshift speed still applies).

Table 2 shows some example engine speed mode shift points with the hysteresis level required for a mouldboard plow. A downshift torque level of 180 RACKL (122% of rated torque) is determined by the maximum allowable long term transmission torque. The 1500 rpm upshift speed is arbitrarily chosen to prevent upshifting at very low engine speeds.

TABLE 1

| APT GROUND SPEED MODE SHIFT POINTS | | | | | | | | | |
|---|---|---|---|---|---|---|---|---|---|
| DWNSHFT SPEED (RPM) | DWNSHFT y-int (RACKL) | PANIC SPEED (RPM) | % DELTA DOWNSHFT | GEAR | ENG/AXLE REDUCT. | % DELTA UPSHIFT | UPSHFT y-int # (RACKL) | UPSHFT SPEED (RPM) | MPH@ RATED (MPH) |
| — | — | — | — | 1 | 333.0445 | −30.13 | −93 | 1800 | 1.32 |
| 1150 | 12 | 1000 | 43.12 | 2 | 232.6951 | −17.23 | −49 | 1800 | 1.89 |
| 1430 | 12 | 1100 | 20.82 | 3 | 192.4502 | −20.41 | −64 | 1800 | 2.29 |
| 1360 | 12 | 1100 | 25.64 | 4 | 153.2562 | −13.18 | −34 | 1750 | 2.87 |
| 1470 | 12 | 1200 | 15.18 | 5 | 133.0287 | −11.88 | −50 | 1730 | 3.31 |
| 1480 | 12 | 1200 | 13.48 | 6 | 117.2145 | −13.22 | −50 | 1750 | 3.76 |
| 1470 | 12 | 1300 | 15.24 | 7 | 101.7154 | −11.98 | −50 | 1850 | 4.33 |
| 1500 | 12 | 1400 | 13.60 | 8 | 89.52816 | −14.17 | −50 | 1850 | 4.97 |
| 1500 | 12 | 1400 | 16.51 | 9 | 76.86451 | −11.88 | −50 | 1800 | 5.73 |
| 1500 | 12 | 1400 | 13.48 | 10 | 67.72272 | −13.19 | −50 | 1800 | 6.50 |
| 1460 | 12 | 1400 | 15.19 | 11 | 58.7911 | −10.62 | −50 | 1690 | 7.49 |
| 1470 | 12 | 1300 | 11.88 | 12 | 52.53896 | −19.19 | −62 | 1870 | 8.38 |
| 1440 | 12 | 1200 | 23.74 | 13 | 42.45148 | −28.50 | −91 | 1970 | 10.37 |
| 1300 | 12 | 1200 | 39.86 | 14 | 30.36752 | −19.20 | −62 | 1620 | 14.50 |
| 1240 | 12 | 1000 | 23.77 | 15 | 24.5357 | — | — | — | 17.94 |

Note: Upshift y-intercept for gears 5–11 selected for upshift line to pass through rated speed and torque.

| | |
|---|---|
| TIRE ROLLING RADIUS | 855 MM |
| RATED ENGINE SPEED | 2200 RPM |
| LOW IDLE | 800 RPM |
| HIGH IDLE (2.5% DROOP) | 2275 RPM |
| MINIMUM ENGINE SPEED FOR RAPID UPSHIFT | 1400 RPM |
| MAXIMUM ENGINE SPEED FOR RAPID DOWNSHIFT | 1700 RPM |
| MAXIMUM ENGINE SPEED FOR DOWNSHIFT | 2100 RPM |
| TEST ENGINE SPEED FOR RAPID DOWNSHIFT HOLD SPEED | 1600 RPM |
| NO LOAD ENGINE HOLD SPEED FOR RAPID UPSHIFT (GEARS 12-15) | 1900 RPM |
| NO LOAD ENGINE HOLD SPEED FOR RAPID UPSHIFT (GEARS 1-11) | 1700 RPM |
| NO LOAD ENGINE HOLD SPEED FOR RAPID DOWNSHIFT (LOW TORQUE) | 1550 RPM |
| NO LOAD ENGINE HOLD SPEED FOR RAPID DOWNSHIFT (HIGH TORQUE) | 1600 RPM |
| GROUND SPEED MODE UPSHIFT SLOPE | 15554 RACKL*RPML |
| GROUND SPEED MODE DOWNSHIFT SLOPE | 15120 RACKL*RPML |
| (RUSTQR) MAXIMUM TORQUE FOR RAPID UPSHIFT (EXCEPT 1ST GEAR) | 101 RACKL |
| (PDSTQR) PANIC DOWNSHIFT TORQUE BELOW PANIC DOWNSHIFT SPEED | 131 RACKL |
| (PANICT) PANIC DWNSHFT TORQUE ABOVE PANIC DWNSHFT SPEED | |
| GEAR 2-5 | 190 RACKL |
| GEAR 6-15 | 200 RACKL |
| (RDSTT) RAPID DOWNSHIFT TEST TORQUE FOR ENGINE SPEED HOLD | 114 RACKL |
| THROTTLE RAMP TEST TORQUE | 72 RACKL |

TABLE 2

| APT ENGINE SPEED MODE SHIFT POINTS | | | | | | | | |
|---|---|---|---|---|---|---|---|---|
| DWNSHFT TORQUE (RACKL) | PANIC SPEED (RPM) | % DELTA DWNSHFT | GEAR | ENG/AXLE REDUCT. RATIO | % DELTA UPSHIFT | UPSHFT y-int# (RACKL) | UPSHFT SPEED (RPM) | MPH RATED (MPH) |
| — | — | — | 1 | 333.0445 | −30.13 | 82 | 1500 | 1.32 |
| 180 | 1000 | 43.12 | 2 | 232.6951 | −17.23 | 116 | 1500 | 1.89 |
| 180 | 1100 | 20.82 | 3 | 192.4502 | −20.41 | 106 | 1500 | 2.29 |
| 180 | 1100 | 25.64 | 4 | 153.2562 | −13.18 | 126 | 1500 | 2.87 |
| 180 | 1200 | 15.18 | 5 | 133.0287 | −11.88 | 126 | 1500 | 3.31 |
| 180 | 1200 | 13.48 | 6 | 117.2145 | −13.22 | 126 | 1500 | 3.76 |
| 180 | 1300 | 15.24 | 7 | 101.7154 | −11.98 | 126 | 1500 | 4.33 |
| 180 | 1400 | 13.60 | 8 | 89.52816 | −14.17 | 126 | 1500 | 4.97 |
| 180 | 1400 | 16.51 | 9 | 76.86451 | −11.88 | 126 | 1500 | 5.73 |

TABLE 2-continued

| | | | | | | | | |
|---|---|---|---|---|---|---|---|---|
| 180 | 1400 | 13.48 | 10 | 67.72272 | −13.19 | 126 | 1500 | 6.50 |
| 180 | 1400 | 15.19 | 11 | 58.7911 | −10.62 | 126 | 1500 | 7.49 |
| 180 | 1300 | 11.88 | 12 | 52.53896 | −19.19 | 110 | 1500 | 8.38 |
| 180 | 1200 | 23.74 | 13 | 42.45148 | −28.50 | 86 | 1500 | 10.37 |
| 180 | 1200 | 39.86 | 14 | 30.36752 | −19.20 | 110 | 1500 | 14.50 |
| 180 | 1000 | 23.77 | 15 | 24.5357 | — | — | — | 17.94 |

| | |
|---|---|
| TIRE ROLLING RADIUS | 855 MM |
| RATED ENGINE SPEED | 2200 RPM |
| LOW IDLE | 800 RPM |
| HIGH IDLE (2.5% DROOP) | 2275 RPM |
| MAXIMUM ENGINE SPEED FOR DOWNSHIFT | 2100 RPM |
| (ESMUST) ENGINE SPEED MODE UPSHIFT SLOPE | 0 RACKL*RPML |
| (PDSTQR) PANIC DOWNSHIFT TORQUE BELOW PANIC DOWNSHIFT SPEED | 131 RACKL |
| (PANICT) PANIC DWNSHFT TORQUE ABOVE PANIC DWNSHFT SPEED, GEAR 2-5 | 190 RACKL |
| GEAR 6-15 | 200 RACKL |

Briefly, the algorithm executed by the ECU 30 is as follows:

The controller first tests to see if the operator has requested automatic operation via switch 40. if not, the controller does nothing. If automatic has been selected, then the status of clutch switch 44 is tested.

If the cluth pedal (not shown) is pressed, then automatic operation is not allowed and the program loops back to the automatic test. If the clutch pedal is not pressed, then the program tests for a combination of low engine speed and high engine torque. If this combination exists, then the controller assumes the engine 10 is about to stall. The transmission 14 is immediately downshifted until the engine speed and/or the torque has recoverd.

If the engine 10 is not in a stall condition, the program tests to see if the top gear limit set by 46 has been exceeded. If it has (most likely due to the operator lowering the limit), the transmission 14 is downshifted once every 4 seconds until the top gear limit is reached.

If the current gear is at or below the top gear limit, then the mode switch 42 is tested. If the constant engine speed control mode is selected, a speed lever test is bypassed, and the program jumps to a downshift speed test.

If the constant ground speed control mode is selected, then the position of speed lever 52 is tested. If the ground speed command has been increased by the operator, a rapid upshift routine is entered. If the current gear is equal to the top gear limit, no further upshifting is allowed and the program returns to an auto test portion. If the present gear is below the top gear limit, the transmission 14 is upshifted with a 0.1 second pause for gears 1-7, 0.3 second pause for gears 8-11, or a 1.0 second pause for gears 12-14, between shifts until the engine speed command has fallen below the upshift speed for the gear or until the engine torque becomes too high. If the operator has selected the constant ground speed control mode, then during the upshifting, the engine speed is held at predetermined speed until the correct gear is reached. Then, the engine speed is commanded to the product of the ground speed command multiplied by the gear ratio as before. This keeps the engine from going to high idle when a number of upshifts are required and smooths out the shifts.

If the operator has decreased the ground speed command via lever 52, a rapid downshift routine is entered. The transmission 14 is downshifted with a 0.2 second pause (for gears 2-11) or a 0.5 second pause (for gears 12 - 15) between shifts until the engine speed command has risen above the downshift speed for that gear or the engine speed exceeds the maximum speed for rapid downshiftings, in which case, the downshift rate is slowed to one shift every 4 seconds. This slower downshift rate gives the operator time to respond to the engine overspeeding. If the operator has selected the ground speed mode, the engine speed is held at predetermined speeds, depending on the engine torque during downshifting. This keeps the engine from going to low idle and provides smoother shifting at low loads and higher torque reserve at high loads.

If there is no change in the commanded ground speed, or if the operator has selected the constant engine speed mode, then the engine speed is tested. If the engine speed is below the downshift speed and is decreasing, or if the torque is above the downshift torque and increasing with the engine speed decreasing, for more than 2 seconds in gears 12-15, or 4 seconds for gears 2-11, then the transmission is downshifted. Note that the engine speed must be decreasing if a downshift is to occur. If the ground speed mode is selected, the engine speed is throttled up (until high idle is reached) with each downshift to maintain the commanded ground speed. If none of the downshift conditions are met, the top gear limit is tested.

If the current gear is less than top gear limit, the engine speed above the upshift speed, and the engine torque is less than upshift torque for more than 4 seconds, the transmission is upshifted with a 4 second pause between shifts until the engine speed is below the upshift speed, the torque is greater than rated torque, or the top gear limit is reached. If the ground speed mode is selected, the engine speed is automatically throttled back (until low idle is reached) with each upshift to maintain the commanded ground speed.

If none of the shift conditions are met, the program branches back to the auto test.

It should be noted that the transmission is shifted rapidly when the operator has commanded a ground speed change and is shifted more slowly in response to load changes (with the exception of the stall condition). This makes the controller very responsive to the operator, but prevents the controller from repeatedly shifting in response to short-term variations in the load due to hitch movement or field conditions. The operator would probably find such repeated shifting to be objectionable.

The following Component List relates to the detailed schematics of FIGS. 2a-2g and 3a-3d. Particular component values are, of course, merely exemplary . . . there being many variations which would be suitable.

| COMPONENT LIST | | | |
|---|---|---|---|
| DESIGNATOR | QT | NAME | SPECIFICATION |
| U1, U2 | 2 | Regulator, Voltage | SG S7805AK 3838 |
| CR13 | 1 | Diode, Zener, Protective | GS1 GZ144098B |
| Q1–Q4 | 4 | Transistor,NPN,Power Darlington | SPECIAL 2N6578 |
| R1–R4 | 4 | Resistor, Wire Wound, 5 W | 0.25, 1% |
| R5–R8 | 4 | Resistor, Metal Film, ¼ W | 100, 1% |
| R9–R12 | 4 | Resistor, Metal Film, ¼ W | 124, 1% |
| R13–R17 | 5 | Resistor, Metal Film, ¼ W | 1.18K, 1% |
| R18 | 1 | Resistor, Metal Film, ¼ W | 2.21K, 1% |
| R19 | 1 | Resistor, Metal Film, ¼ W | 3.24K, 1% |
| R20–R23 | 4 | Resistor, Metal Film, ¼ W | 3.40K, 1% |
| R24–R28 | 5 | Resistor, Metal Film, ¼ W | 8.06K, 1% |
| R29–R34 | 6 | Resistor, Metal Film, ¼ W | 10K, 1% |
| R35–R38 | 4 | Resistor, Metal Film, ¼ W | 69.8K, 1% |
| R39 | 1 | Resistor, Metal Film, ¼ W | 73.2K, 1% |
| R40–R44 | 5 | Resistor, Metal Film, ¼ W | 100K, 1% |
| R45 | 1 | Resistor, Metal Film, ¼ W | 301K, 1% |
| C1–C5 | 5 | Capacitor, Polyester, 0.01 MFD | 63 V, 10%, WIMA MKS2 PCM5 or EQUIV. |
| C6,C7 | 2 | Capacitor, Polyester, 0.1 MFD | 63 V, 10%, TOM IR67104K or EQUIV |
| C8,C9 | 2 | Capacitor, Ceramic, 0.33 MFD | 50 V, 10%, MIL C-11015 CK06BX334K,CLAB CK06BX334K, or EQUIV |
| C10 | | Capacitor, Aluminum, 430 MMF | 40 V, MEPCO ELECTRICA |
| CR1–CR4 | 4 | Diode, Switching | IN4148 |
| CR5–CR8 | 4 | Diode, Rectifier | MR754 |
| CR9–CR12 | 4 | Diode, Rectifier | MR821 |
| U3 | 1 | I.C. CMOS, 2 INPUT OR | MOT MC14071BCPDS OR NS D4071BCN A+ |
| U4 | 1 | I.C. CMOS,BUFFER,INVERTING | MOT MC14049UBCPDS OR NS CD4049CN A+ |
| U5,U6 | 2 | I.C. TTL,DRIVER, NOR | NS 5545J-8 883B |
| U7,U8 | 2 | I.C.,Bipolar, Comparator, Voltage | MOT LM2901DS or NS LM2901N A+ |
| R53–R63 | | Resistor, Carbon Comp. ½ W | 2K, 5% |
| C53–C56 | 4 | Capacitor, Ceramic 0.01 MFD | 200 V, 20%, CLAB OR MAL CK06BX103M or EQUIV. |
| C57 | 1 | Capacitor, Polyester, 0.1 MFD | 63 V, 10%, TOM IR67104K OR EQUIV |
| CR51 | 1 | Diode, Switching | IN4148 |
| CR52 | 1 | Diode, Rectifier | MR754 |
| C101 | 1 | Capacitor, MICA, 5 PF | 300 V, +−0.5 PF CDE CD5CC050D03 |
| C102 | 1 | Capacitor, MICA, 10 PF | 300 V, 5% CDE CD5CC100J03 |
| C103 | 2 | Capacitor, Ceramic, 22 PF | 100 V, 10% CLAB CN15A 220K |
| C104 | 1 | Capacitor, MICA, 200 PF | ARCO DM10-D201J |
| C105–C106 | 2 | Capacitor, Polyester,1000 PF | 100 V, 20% WIMA FKS2 PCM5 OR EQUIV. |
| C107–C128 | 22 | Capacitor, Polyester, 0.01 MFD | 63 V, 10%, WIMA MKS2 PCM5 OR EQUIV |
| C130–C131 | 2 | Capacitor, Polyester, 0.1 MFD | 63 V, 10%, TOM IR67104K OR EQUIV |
| Y1 | 1 | Crystal, 6.0 MHZ | MTRON or CTS KNIGHTS |
| CR101–CR102 | 2 | Diode, Rectifier | IN4001 |
| CR103–CR113 | 11 | Diode, Switching | IN4148 |
| R101, R102 | 2 | Resistor, Metal Film ¼ W | 10, 1% |
| R103 | 1 | Resistor, Wire Wound, 1 W | 40.2, 1% |
| R104 | 1 | Resistor, Metal Film ¼ W | 100, 1% |
| R105,R106 | 2 | Resistor, Metal Film ¼ W | 499, 1% |
| R107 | 1 | Resistor, Metal Film ¼ W | 100K, 1% |
| R108 | 1 | Resistor, Metal Film ¼ W | 1.15K, 1% |
| R109, R110 | 2 | Resistor, Carbon Comp., ½ W | 2.0K 5% |
| R111 | 1 | Resistor, Metal Film, ¼ W | 3.01K, 1% |
| R112 | 1 | Resistor, Metal Film, ¼ W | 3.24K, 1% |
| R113–R117 | 5 | Resistor, Metal Film, ¼ W | 4.75K, 1% |
| R118 | 1 | Resistor, Metal Film, ¼ W | 8.06K, 1% |
| R119–R150 | 32 | Resistor, Metal Film, ¼ W | 10K, 1% |
| R151–R153 | 3 | Resistor, Metal Film, ¼ W | 13.7K, 1% |
| R154 | 1 | Resistor, Metal Film, ¼ W | 16.2K, 1% |
| R155–R157 | 3 | Resistor, Metal Film, ¼ W | 22.1K, 1% |
| R158–R173 | 16 | Resistor, Metal Film, ¼ W | 47.5K, 1% |
| R174–R176 | 3 | Resistor, Metal Film, ¼ W | 100K, 1% |
| R177 | 1 | Resistor, Metal Film, ¼ W | 301K, 1% |
| U11 | 1 | I.C., Bipolar, Comparator, | MOT LM2901INDS |

-continued
COMPONENT LIST

| DESIGNATOR | QT | NAME | SPECIFICATION |
|---|---|---|---|
| U12 | 1 | Voltage I.C., CMOS, 2 Input NOR | or LM2901N A+ MOT MC14001BCPDS or NS CD4001BCN A+ |
| U13-U15 | 3 | I.C., CMOS Flip-Flop, D-Type | MOT MC14013BCPDS or CD4013BCN A+ |
| U16 | 1 | I.C., CMOS, Analog Switch | MOT MC14016BCPDS or NS CD4016BCN A+ |
| U17-U19 | 3 | I.C., CMOS, Buffer inverting | MOT MC14049UBCPDS or NS CD4049CN A+ |
| U20 | 1 | I.C., CMOS, Analog Switch | MOT MC14051BCPDS |
| U21 | 1 | I.C., CMOS, 2-input OR | MOT MC14071BCPDS or CD4071BCN A+ |
| U22,U23 | 2 | I.C., CMOS, Buffer, 3-State Non-inverting | MOT MC14503BCPDS or NS CD4503BCN A+ |
| U24 | 1 | I.C., CMOS Schmitt Trigger, Inverting | MOT MC14584BCPDS or NS CD40106BCN A+ |
| U25 | 1 | I.C., TTL, Driver, NOR | NS 55454J-8 883 |
| U26 | 1 | I.C., CMOS, A D converter | NS or INTER ADC0804LCD |
| U27 | 1 | I.C., HMOS, Microcomputer | Intel 8051 |
| U28 | 1 | I.C., NMOS, Prog. Timer 16-Bit | Intel ID8253 Specified From −40 to +85 C |
| U29 | 1 | I.C., LSTTL, Latch, 3-State | MOT SN74LS373NDS or NS DM74LS373N A+ |
| U30 | 1 | I.C., NMOS, Memory, EPROM | Intel TD2732A |

Detailed Logic Flow

Figure 8:
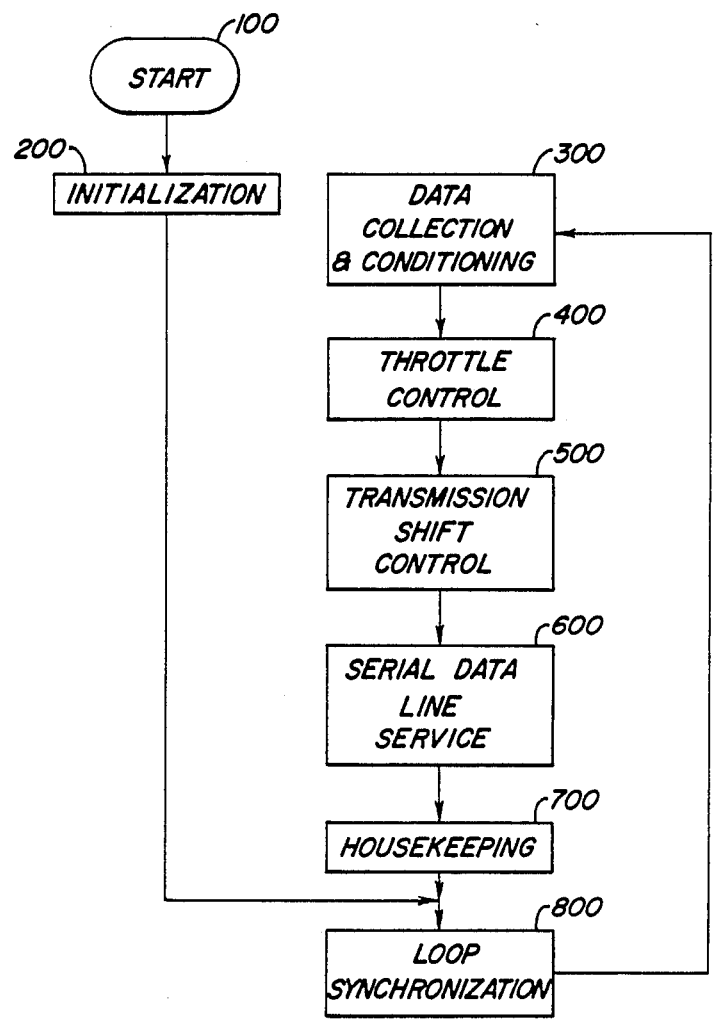
FIG. 8 is a simplified flow chart of the main loop algorithm.

FIGS. 8-19 illustrate the detailed logic flow of the APT controller algorithm. FIG. 8 provides an overview of the program. The latter part of this description includes a glossary of variable names and a list of definitions that will be useful in understanding the flow charts.

Items that appear in the flow charts in all capitals (i.e., CLUTCH, SPD, etc.) are variable names that represent permanent physical locations in the memory of the microprocessor. Lower case variables (i.e. Count#), Speed Derivative Timer, Governor Droop Compensation, etc) are temporary variables and have no permanent location. Variables enclosed in parentheses, as (variable 1, variable 2) are two byte variables where "variable 1" is the most significant byte and "variable 2" is the least significant byte. For example, (R5,R4) or (THROTH, THROTL) are two byte variables. Numeric constants are assumed to be decimal unless a different baseis denoted.

Arrays of one or more variables are denoted with brackets as ARRAY {variable 1, variable 2 ... } where "ARRAY" is the name of the array and "variable 1, variable 2..." are the indices. FRACTN {OPTION} is an example of an array FRACTN in one variable OPTION. RATIO {OPTION, R3} is an example of an array in two variables.

One exception is the modulo function designated, MODn {variable}, where "n" denotes the modulo value and "variable" is the variable name operated upon. For example, MOD4 {STPCNT} means the modulo 4 value of variable STPCNT. See the list of definitions for an explanation of the modulo function.

Subroutines are denoted with square brackets as SUBROUTINE [argument 1, argument 2 ... ]where "SUBROUTINE" is the name of the subroutine and "argument 1, argument 2 ... " are the arguments. FILTER [count#, RPML, 7, 3] and LINE [DWNTQR]are examples of subroutines.

In reading the flow chart, it should be kept in mind that the variables related to engine speed (i.e., RPML, RPMDLY, RPMCOM, UPSPD, and DWNSPD) are engine speed periods and not true engine speed. That is, RPML is inversely proportional to engine rpm. Thus, the expression "RPML greater than UPSPD" is equivalent to "engine speed less than upshift speed".

The main loop in FIG. 8 is an overview of the entire program. The program is implemented in a sequential organization. Each section of the program is entered on every pass through the main loop. Information is passed between each of the sections by the use of flags and permanent variables. It can take several passes through the main loop to complete an operation in one of the program sections. An example of this is the upshift timer in the transmission shift control section.

The main loop is executed once every 10 msec. In addition to the main loop, there are 4 interrupt routines.

When power is first applied or a hardware reset occurs, the INITIALIZATION section 200 is entered. Here the various flags, pointers, variables, and counters are initialized.

Execution then proceeds to the LOOP SYNCRONIZATION section 800. The 10 msec. loop time is controlled by this code.

When the start of the next 10 msec. period is reached, the DATA COLLECTION & CONDITIONING section 300 is entered. At this point, all the digital inputs are read, debounced, and stored in memory. The raw data from the external counters is checked for validity, truncated to 8 bits, low pass filtered, and stored in memory The voltage from gear encoder pot 26 is decoded into the gear number.

The next section is THROTTLE CONTROL 400. Here, engine speed command ESC for the electronic governor 32 is computed.

The TRANSMISSION SHIFT CONTROL section 500 is entered next. The digital inputs and the gear number are checked with the current operating conditions for validity. The electrical signals or commands which cause the transmission to shift are generated by this algorithm section.

Control next passes to the SERIAL DATA LINE SEVICE routine 600. Here, the gear number and status messages are transmitted to the dashboard instrumentation 76 via a serial line.

In the HOUSEKEEPING section 700, variables associated with the main loop are updated and occurrences of the interrupts are tested.

Control again passes to the loop synchronization section 800 where the loop begins again after waiting for the beginning of the next 10 msec. time period. This cycle repeats until power is removed or a hardware reset occurs.

INITIALIZATION

Figure 9:
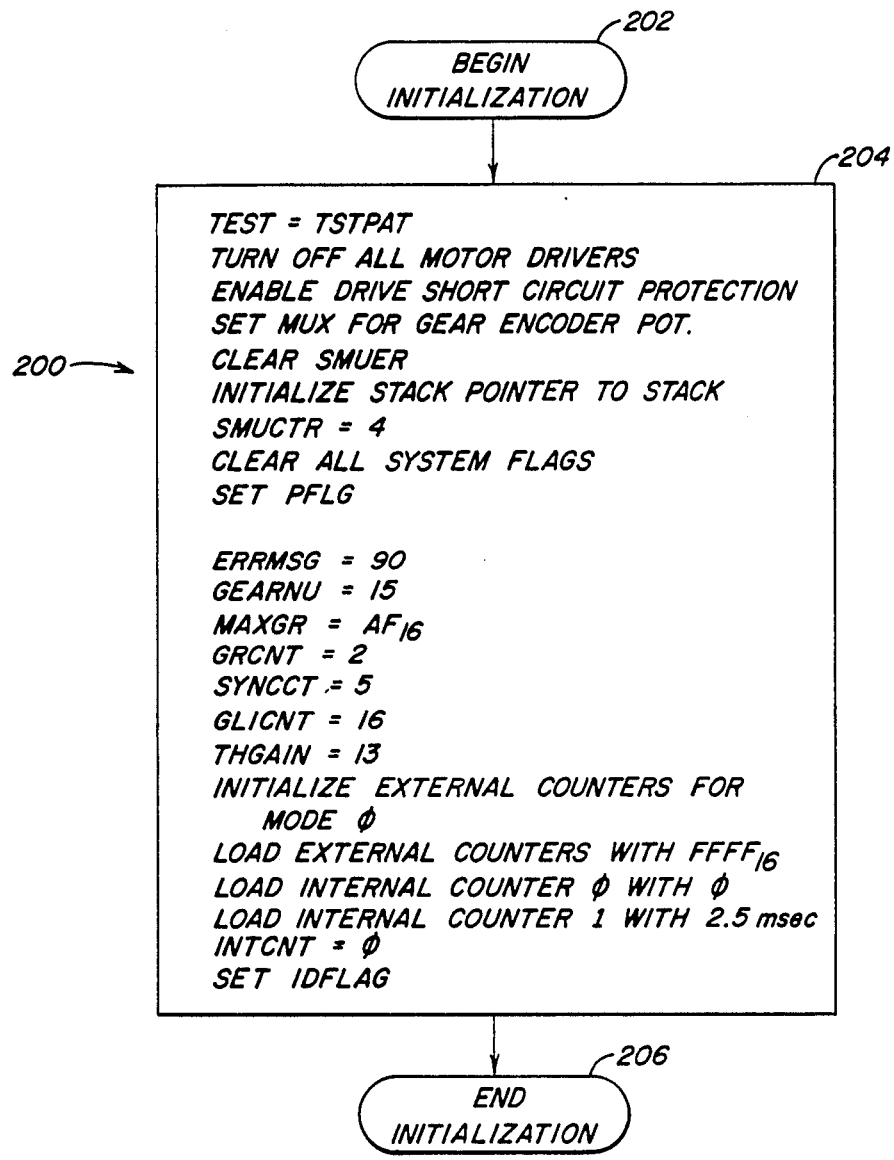
FIG. 9 is a flow chart of the initialization section of the main loop.

Referring now to FIG. 9, the system variables are set up in the initialization section 200. The variable TEST is loaded with constant TSTPAT. TEST will be checked in the loop synchronization section 800 to make sure that the program has passed through the initialization section before executing the main loop. All the step motor drivers in driver circuit 31 are turned off, the driver short circuit protection is enabled, and the MUX (U20) of the A to D convertor (U26) is set to the value from gear encoder pot 26.

The serial line to a diagnostic display (not shown) is zeroed. The stack pointer is set to the constant STACK. The downshift, upshift, first shift started, pseudo rapid upshift, panic downshift, rapid downshift, and rapid upshift, auto throttle smoothing, variable gain throttle, manual throttle, data type display, data switch, and clutch flags are cleared. The ID flag is set.

The program mode flag is set. However, it will be cleared upon entry into the manual mode. Setting the problem mode flag in the initialization prevents the program from entering the automatic mode directly from the initialization condition without the operator commanding the manual mode first.

The error message (ERRMSG) and the error flag (ERRFLG) are set to indicate a "powered up in automatic" condition. These will be cleared if the manual mode is entered.

The gear number (GEARNU) and the maximum gear limit (MAXGR) are set to 15. The switch bank 1 debounce counter (GRCNT) is set for 2 matches to be required before new switch states will be accepted.

The electronic engine governor sync pulse counter is initialized to count 5. This will prevent data collection from the governor 32 until the next sync pulse is encountered.

The data switch counter (GLICNT) is set to 16. This requires that there must be 16 error occurrences before an error message is sent to the diagnostic display (not shown) and automatic operation is aborted.

The variable gain throttle is set to full resolution (THGAIN = 13).

The three external counters are set for binary count, mode 0, and double byte read/write operation. External counters 1 and 2 are loaded with FFFF base 16.

Internal timer/counter 1 is loaded with constant MLPTIM. This will cause an interrupt to occur in 2.5 msec. and is the time base for a motor control interrupt routine. Internal timer/counter 0 is cleared.

The interrupt 1 cycle counter is cleared. This counter is used in the motor control interrupt routine to control sending the throttle command to the governor. This counter is also used in the loop synchronization section to determine the beginning of the 10 msec. time frame.

DATA COLLECTION AND CONDITIONING

Referring now to FIGS. 10a–10h, the data collection and conditioning routine 300 is at the top of the main loop. The switch flag (GLIFLG) is initialized at step 3102 to a 1, indicating that no data switches have been found on this pass. This flag will be cleared to a 0 state if any data is found out of range.

The status of the clutch switch 44 and of option jumpers OP-0, OP-1 and OP-2 is read at 3104. These are not debounced due to the static nature of the inputs. The clutch flag is cleared at 3106 if the clutch pedal (not shown) is not depressed. Otherwise, the clutch flag is set and delayed speed lever position (LEVDLY) is set equal to the speed lever 52 position (LEVL) at 3110. This will zero the derivative of the speed lever position and prevent the rapid shift mode from being entered when clutch is released.

The status of jumpers OP-1, OP-2 and OP-3 is loaded into memory. If no jumpers are connected, then memory location OPTION is cleared; otherwise, the state of the option jumpers are loaded. This insures that a valid option code is used even when all jumpers are open, in which case, the serial data line service section sends the gear encoder pot position number instead of the gear number and error codes to the diagnostic display (not shown).

The raw mass fuel flow number from external counter 9 (FUELRH, FUELRL) is tested to be between 2180 and 116 at 3202-3206. If it is not, error message 69 is set at 3222 if the switch counter is zero, (i.e., 16 errors have occurred).

If the fuel flow is in range, the data is truncated to 8 bits, low pass filtered, and stored as RACKL by the FILTER subroutine (3208-3224).

The speed lever position (LEVL) is checked at 3301 to be greater than or equal to 16. If not, LEVL is set equal to 16 at 3303. This is done to ensure that the initial condition of LEVL is a valid number (i.e. 16 or greater) when the system is first initialized at power up. If the initial value of LEVL is randomly set to a value of less than 16 at power up, LEVL would never ramp above 13 for an input of 16 due to the hysteresis scheme (remainder truncation) applied to LEVL, as described latter in this section.

The raw speed lever position number from external counter 0 (SPDLRH, SPDLRL) is tested to be between 116 and 141 (3302-3306). If it is in range, the data is truncated to 8 bits, low pass filtered, and stored as LEVL by the FILTER subroutine (3308-3318). If the data is out of range, and the switch counter has decremented to zero, an error message is set. If the data is between 84 and 108, error message 95 (governor diagnosed throttle error) is set at 3340; otherwise, error message 70 (speed lever out of range) is set at 3330.

The raw engine speed period number from external counter 1 (RPMH, RPML) is divided by 8 and tested to be between 40 and 255 (3402, 3404 and 3414). If it is not, error message 68 is set at 3412. If the data is in range, it is low pass filtered and stored as RPML by subroutine FILTER at 3416.

Figure 15:
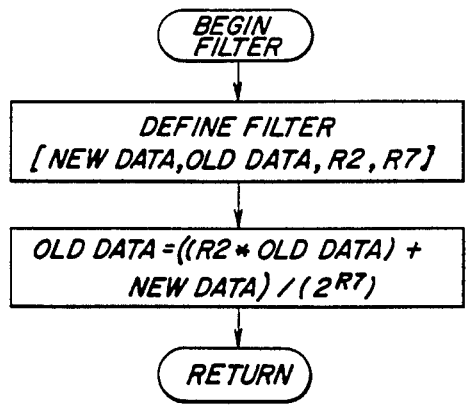
FIG. 15 is a flow chart of a FILTER subroutine.

RPML, LEVL, and RACKL are low passed filtered and saved as RPMDLY, LEVDLY, and RCKFLT, respectively, by subroutine FILTER (see 3502-3506 and FIG. 15). These filtered numbers will be used to compute the slope of the engine speed, speed lever position, and the mass fuel flow in the transmission shift control section.

The 2 least significant bits of the speed lever remainder (LEVLR), as calculated by subroutine FILTER, are zeroed at 3508. This has the effect of adding 2 bits of hysteresis to the speed lever position (LEVL).

The non-linear speed lever position (NLSPDL) is computed in steps 3602-3608 as a function of the speed lever position (LEVL) as follows:

NLSPDL =(LEVL/2)+8 for LEVL not greater than 122, and

NLSPDL =2(LEVL−87)−1 for LEVL greater than 122.

NLSPDL is used to expand the resolution of the speed lever at the lower speeds where it is needed most. NLSPDL is used in place of LEVL in the throttle control section. LEVL is used in the transmission shift control section for the rapid shift determination.

The watch dog retrigger is cleared at 3608. The watch dog retrigger must be set and cleared on each pass through the main loop; otherwise, the watch dog timer will time out and force a hardware reset.

The top gear limit, forward reverse, neutral interlock, mode select and auto/manual switches are read and tested against their last readings of (GRTEMP) (3702-3704). If there is a match and the match counter (GRCNT) has been decremented to 1 (i.e., 2 successive matches), then MAXGR is loaded with the value of the switches at 3710. If there is no match or if there has been two successive matches, GRCNT is set to 0 and GRTEMP is set to the current value of the switches (3712, 3714).

The gear encoder pot position number (GEARPT) is tested to be between 3 and 252 (3802-3804). If less than 3, error message 94 is set at 3816. If GEARPT is in range, then it is tested at 3808-3812 with the entries in array GEARV which contain the encoder pot position target number for each gear. If OPT2 is cleared, which may, for example, indicate that a row-crop vehicle is coupled to the vehicle, then the first 16 entries of the array are used. If OPT2 is set, which may, for example, indicate that the vehicle is a 4-wheel drive vehicle, then the second set of 16 entries are used. Starting with entry 0 (representing neutral) through entry 15 (representing) 15th gear, GEARPT is tested with each array entry until GEARPT is less than 7 plus the array entry. 7 is added to the array entry to ensure that all encoder pot position numbers +/−7 to either side of the target number will be assigned the gear number associated with that target encoder position number. The gear number (GEARNU) is then set equal to the entry sequence number (count) at 3820. GR16OP is set equal to GEARNU plus 16 times OPTION at 3822 for use in array indexing in other sections of the program.

THROTTLE CONTROL

Figure 11B:
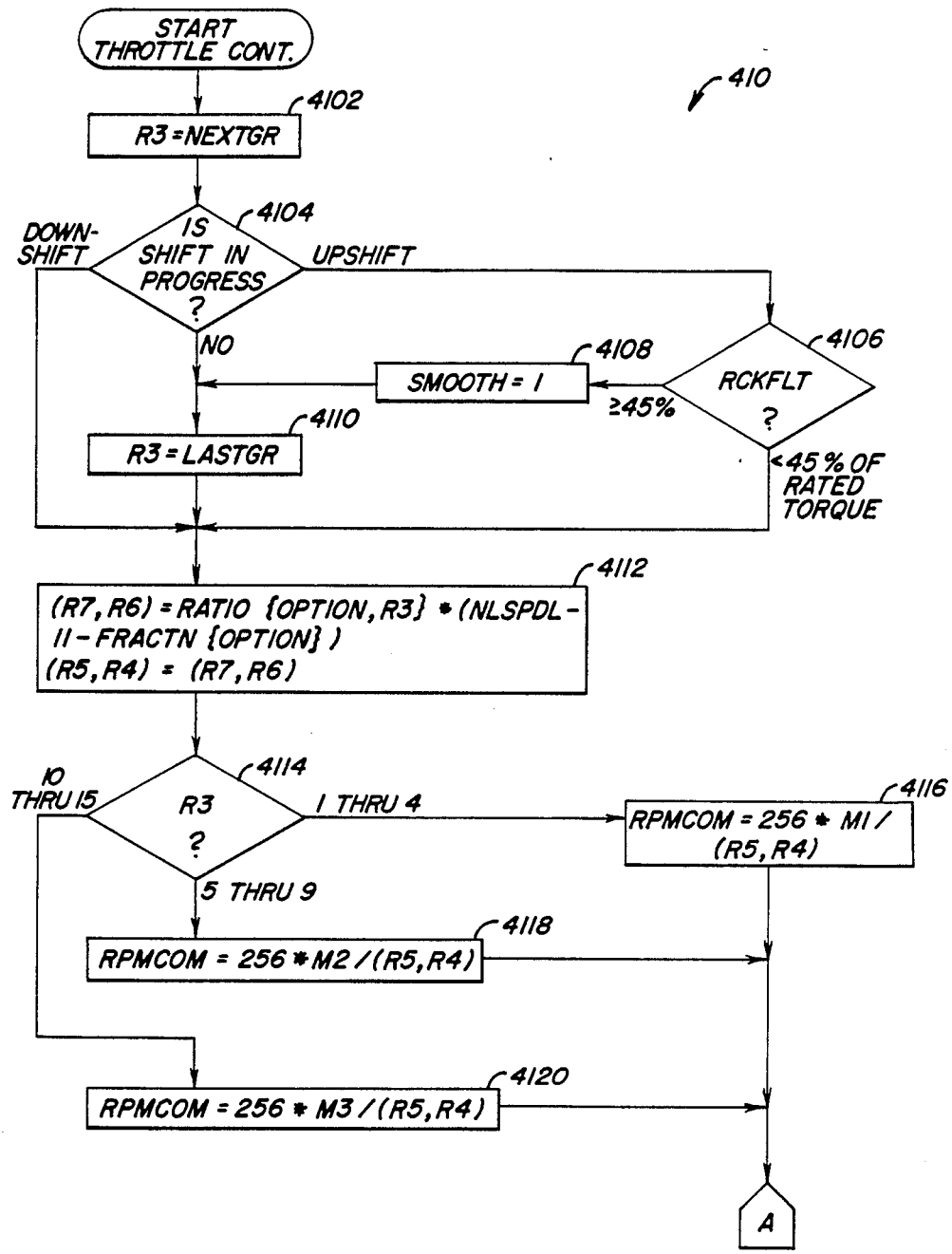
FIGS. 11b, 11c(1), 11c(2), 11d-11j form a detailed flow chart of the throttle control portion.

The throttle control section (see 400 and Figs. 11a-11j) is divided into two parts, 410 and 420-486, as best seen in Figs. 11a(1) and 11a(2). The first part 410 computes the variable RPMCOM used in the transmission shift control section. The second part 420-486 computes the actual engine speed command (THROH, THROL) sent to the engine governor 32.

Compute RPMCOM

Referring now to Fig. 11b, the engine speed command computed in 4102-4120 is the engine speed required to maintain the ground speed as commanded by the speed lever 52 (when in ground speed mode). This routine produces an 8-bit number (RPMCOM) that represents the desired engine speed in engine speed mag pickup counts (i.e., this number is in the same form as RPML—engine speed period). RPMCOM is used to determine if the engine speed command is above or below the upshift and downshift speeds. This command is not sent to the governor 32. Instead, the throttle command computed in the second part of this section is sent to governor 32.

Variable R3 (4102) is a local variable and is used as the gear number in this section for the purpose of indexing into data tables. Using a local variable instead of the actual gear number allows flexibility in assigning when the engine speed changes during the gear shift. If there are no shifts in progress, R3 is set equal to the gear number of the last pass through the main loop (LASTGR) at 4110. LASTGR is used instead of GEARNU to prevent the engine speed from changing when entering controller commanded manual due to the operator manually shifting gears.

If a downshift is in progress, R3 is set at 4102 to the gear being shifted to (NEXTGR). If an upshift is in progress and the engine torque is low, then R3 is also set equal to NEXTGR. If an upshift is in progress during high torque, then R3 is set equal to LASTGR at 4110 and the SMOOTH flag is set at 4108. Setting the SMOOTH flag enables the second part of this section to slowly ramp the engine speed command rather than make a step change, thus smoothing the shift.

The local variable (R7, R6), which is the product of the gear ratio and the non-linear speed lever, is computed at 4112 as:

(R7, R6)=RATIO {OPTION, R3} * (NLSPDL−11−FRACTN{OPTION})

The array RATIO is an array gear ratio in two variables: tractor model (OPTION) and gear number (R3). The constant 11 and the array FRACTN are subtracted from NLSPDL for scaling purposes. (R5, R4) is set equal at 4112 to (R7, R6).

The variable RPMCOM is computed at 4116, 4118 or 4120 as:

RPMCOM=256 * M1{OPTION}÷(R5, R4)

for 0≦R3 ≦4,

RPMCOM=256 * M2{OPTION}÷(R5, R4)

for 5≦R3 ≦9, and

RPMCOM=256 * M3{OPTION}÷(R5, R4)

for 10≦R3 ≦15.

To improve the accuracy of the calculations using the gear ratio, the array RATIO contains M1 {OPTION} times the engine speed to axle speed reduction ratio for gears 1-4, M2 {OPTION} times the engine speed to axle speed reduction ratio for gears 5 -9, and M3 {OPTION} times the engine speed to axle speed reduction ratio for gears 10-15. This keeps the array entries greater than 64 which reduces round off errors in the multiplications. Thus, 3 different coefficients are required, dependent on the gear number when using values from RATIO.

R3 and (R7, R6) are passed to the second part of this section for use in the Compute Automatic Throttle routine.

Compute (THROH, THROL)

Referring now to Figs. 11c-11j, the second part of this section computes the 16 bit number (THROH, THROL) which is the throttle command pulse width sent to the engine governor 32. This second part consists of four parallel paths. Which path is taken is determined in 4202-4218 by the condition of the system flag set in other sections of the main loop. The four paths are the VARIABLE GAIN THROTTLE (430), the AUTOMATIC THROTTLE (460), the HOLD THROTTLE FOR RAPID UPSHIFT (450), and the HOLD THROTTLE FOR RAPID DOWNSHIFT (422).

Variable Gain Throttle

If the manual throttle flag (MTHRFL) is set, if the transmission is in neutral or reverse, if the auto/manual switch 40 is in the manual position, if the mode switch 42 is in the engine speed position, or if the problem mode flag (PFLG) is set, then control is transferred to the variable gain throttle routine which is the first path.

Figure 11D:
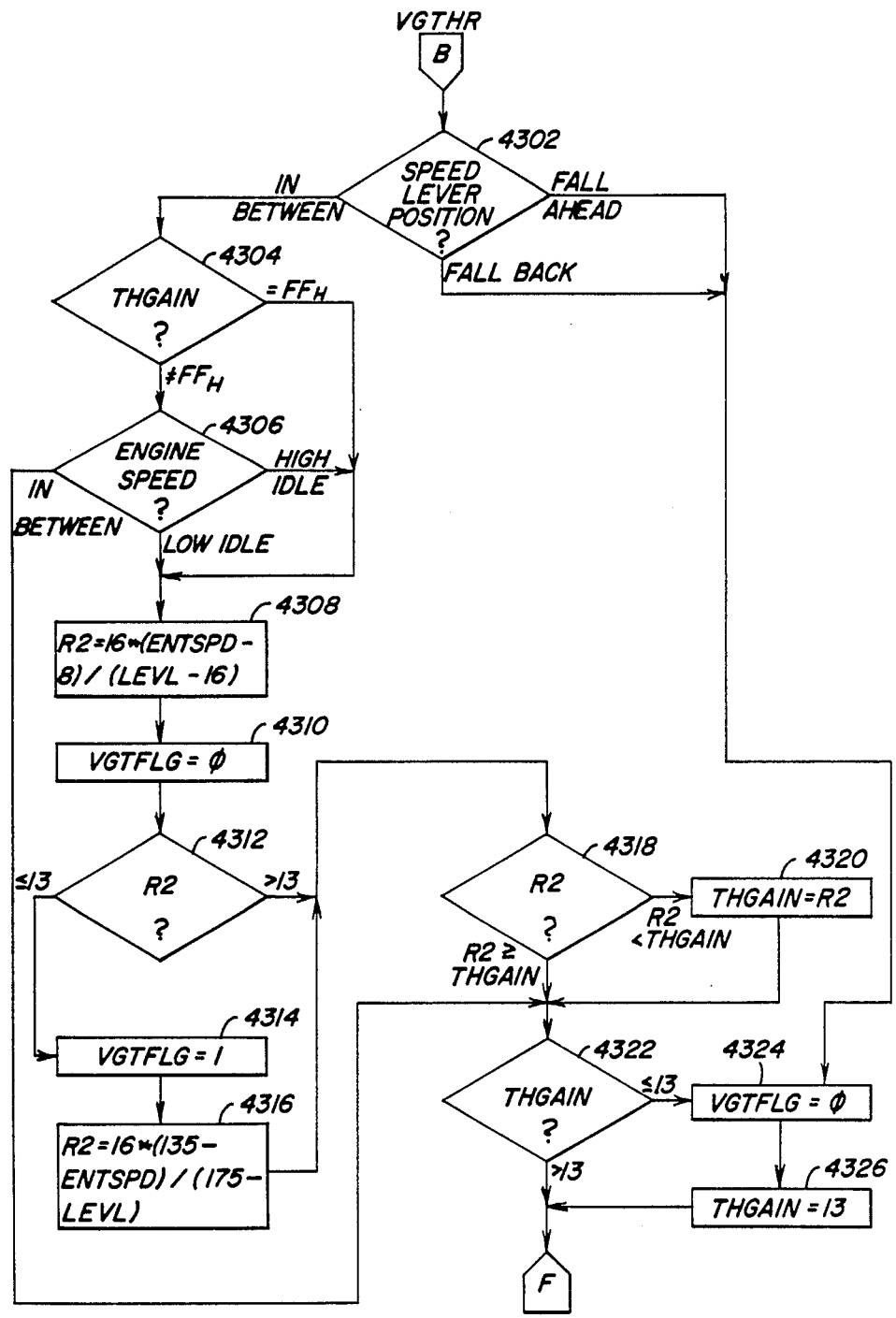
FIGS. 11a(1) and 11a(2) form a simplified flow chart of the throttle control portion of the main loop.
Figure 11E:
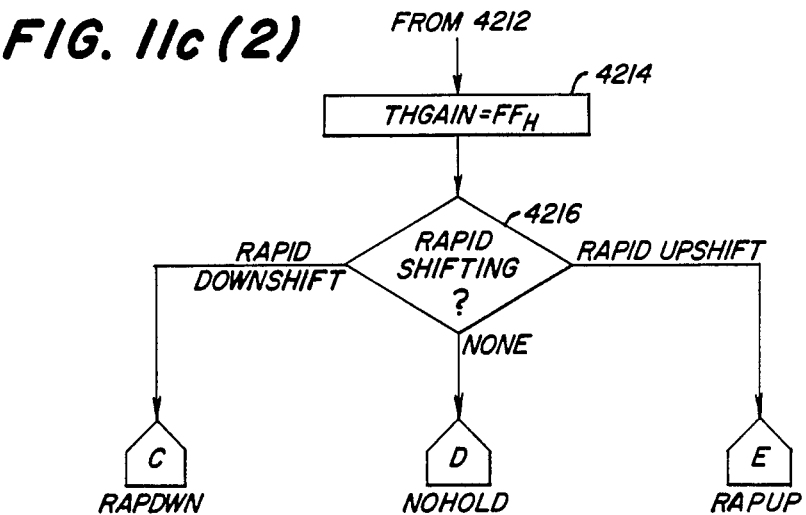

Referring now to Figs. 11d and 11e the variable gain throttle routine is used when the system is in controller commanded manual. When the APT system is in automatic and the ground speed control mode is selected, the speed lever 52 is calibrated in ground speed such that minimum ground speed is commanded when the speed lever 52 is full back, and maximum ground speed is commanded when it is full ahead. In manual, it is desired that the signal from speed lever 52 become a true throttle control signal calibrated in engine speed and not ground speed. Difficulty occurs when making the transition between automatic and manual, as the speed lever position may result in significantly different engine speeds between the two modes, causing the vehicle to lurch when the mode is changed. The variable gain throttle routine corrects this problem by maintaining a constant engine speed as the system changes from automatic to manual control. Note that this routine only is active for the auto-to-manual transitions and not the manual-to-auto transitions.

The variable gain throttle routine rescales the signal from speed lever 52 such that the lever position commands in manual the same engine speed as was commanded in the automatic ground speed control mode. The speed lever 52 will remain at this reduced resolution until the speed lever 52 is moved such that the engine speed is either at high or low idle. If the speed lever 52 is pushed past the position that commands the engine to high idle (pulled below the position that commands low idle), the throttle command to the engine will remain at high idle (low idle) and the speed lever gain is adjusted to make that lever position the new high idle (low idle) position, thus increasing the lever resolution. Full manual speed lever resolution is reached when the speed lever 52 is pushed to either the full ahead or full back position.

The variable gain throttle routine begins at 4302 by testing the speed lever position. If the lever is at either extreme, then throttle gain is set to full resolution (THGAIN=13)(4326). If the lever is not at either extreme and both the engine speed is between low and high idle and this is not the first pass through this routine (THGAIN<>FF), then the throttle gain remains unchanged.

If this is the first pass or the engine speed is at either extreme, then a new throttle gain is computed. In computing the new throttle gain, it must first be determined if the current operating point is above or below the full manual throttle resolution line, as different equations are used in computing (THROH, THROL). The operating point is first assumed to be above and a new throttle gain is computed and stored at 4308 in local variable R2:

$$R2 = 16 * (ENTSPD-8)(LEVL-16).$$

The VGTFLG flag is cleared at 4310 to indicate that the operating point is above the full manual throttle resolution line.

If R2 is greater than 13 (the full resolution gain), then the assumption was correct and R2 is used as the new throttle gain. If R2 is less than or equal to 13, then the operating point is really below the full manual throttle resolution line and R2 is recalculated at 4316 as:

$$R2 = 16 * (135-ENTSPD)/(175-LEVL).$$

The VGTFLG flag is then set to indicate that the operating point is below the full manual throttle resolution line.

R2 is then tested with THGAIN and the least of the two is loaded into THGAIN (4318-4320). Then, THGAIN is limited not to be less than 13 (4322-4326).

A local variable (R5, R4) representing the new throttle command is calculated at 4330 or 4332, depending on the state of the VGTFLG flag:

$$(R5, R4) = THGAIN * (LEVL-16) + 128$$

for VGTFLG=0 (4330) or, $$(R5, R4) = 2168 - THGAIN * (175-LEVL)$$

for VGTFLG=1 (4332)

Control is then passed to the Limit Calculated Throttle routine (Fig. 11j) where (R5, R4) is limited to be between 128 and 2168.

Automatic Throttle

Figure 11F:
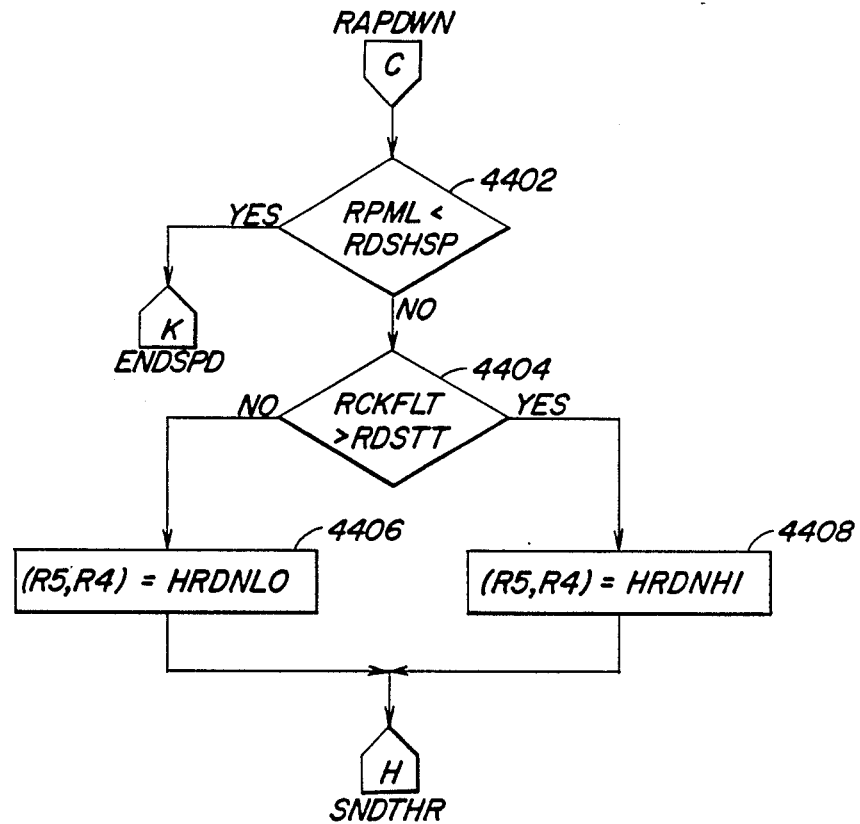
Figure 11G:
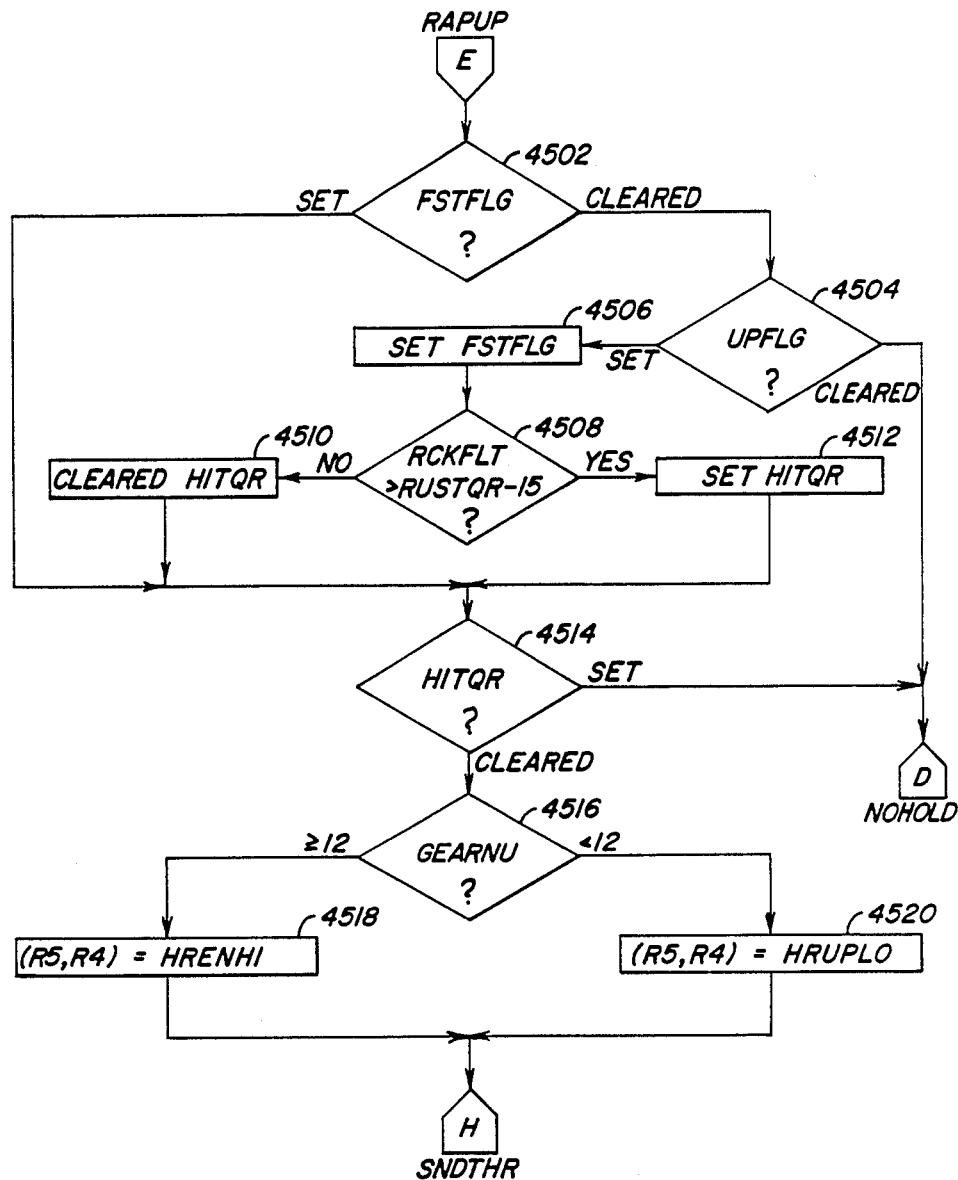
Figure 11H:
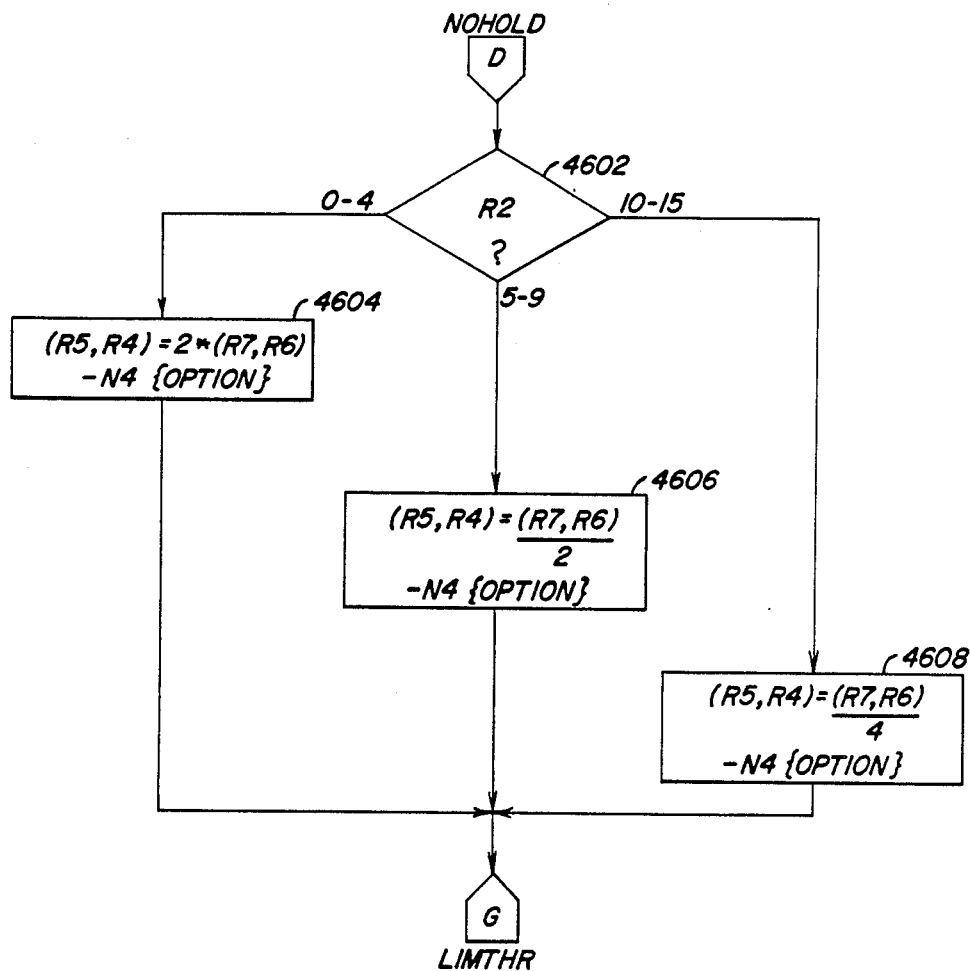
Figure 11I:
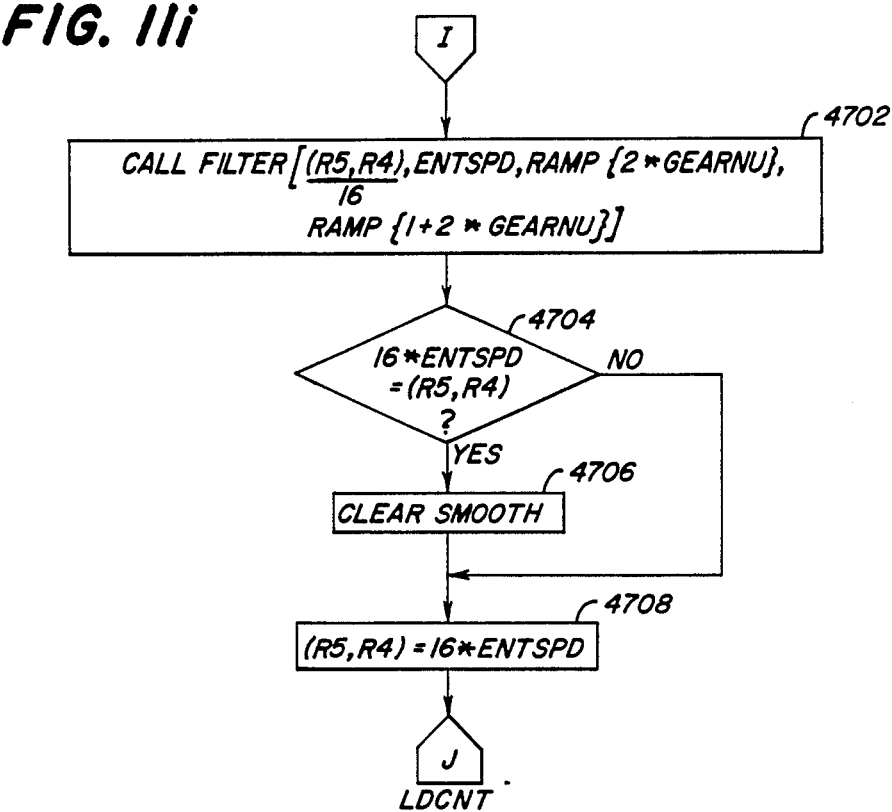

Referring now to Fig. 11h, if none of the shift flags are set and the controller is in the automatic mode, then control is passed to the Compute Automatic Throttle routine which is the second path. A local variable (R5, R4) representing the new throttle command depending on local variable R2 (the gear number used to compute RPMCOM) is computed at 4604, 4606 or 4608:

$$(R5, R4) = 2 * (R7, R6) - N4 \; \{OPTION\}$$

for $0 =< R2 =< 4$; and $$(R5, R4) = 0.5 * (R7, R6) - N4 \; \{OPTION\}$$

for $5 =< R2 =< 9$; and $$(R5, R4) = 0.25 * (R7, R6) - N4 \; \{OPTION\}$$

for $10 =< R2 =< 15$.

Control is then passed to the Limit Calculated Throttle routine (Fig. 11j) where (R5, R4) is limited to be between 128 and 2168.

Hold Throttle for Rapid Upshift

Referring now to Fig. 11g, if the rapid upshift flag is set, then the third path is taken. During a rapid upshift, the shifting can be made smoother if the engine speed is held at a predetermined level after the rapid upshift has begun the first shift. The synchronization of the holding action with the beginning of the shift is accomplished with the FSTFLG flag.

If this is the first pass through this path since a rapid upshift has been commanded, then FSTFLG will be cleared. The FSTFLG flag being cleared causes the UPFLG flag to be tested (4504). If UPFLG is cleared, then no upshift has been started and control is passed to the Compute Automatic Throttle routine. If UPFLG is set, then the upshift has started. The FSTFLG is set at 4506 to indicate that the engine speed should be held and the engine torque is tested. If at 4508 the engine torque is less than RUSTQR −15, then the HITQR flag is cleared at 4510 indicating a low torque at the start of a rapid upshift. Otherwise, HITQR is set at 4512. If HITQR is set, the branch to the Compute Automatic Throttle routine is taken. If HITQR is cleared, control passes to the Hold Throttle command for Rapid Upshift routine.

In the Hold Throttle Command for Rapid Upshift routine, a local variable (R5, R4) representing the new throttle command depending on GEARNU is created at 4518 or 4520 as follows:

(R5, R4)=HRUPLO for GEARNU <12; and (R5, R4)=HRENHI for GEARNU > =12.

Hold Throttle for Rapid Downshift

Referring now to Fig. 11f, if the rapid downshift flag is set, then the fourth path is taken. Holding the engine speed to a predetermined level as soon as the shift starts will smooth a rapid downshift.

If at 4402 the engine speed is less than the rapid downshift hold speed, then there is no need to hold the engine speed and this section is exited (i.e., the throttle command to the governor 32 is left unchanged). Otherwise, a local variable (R5, R4) representing the new throttle command, depending on engine torque, is created at 4406 or 4408 as follows:

(R5, R4)=HRDNLO for RCKFLT = <RDSTT; and (R5, R4)=HRDNHI for RCKFLT >RDSTT.

Figure 11J:
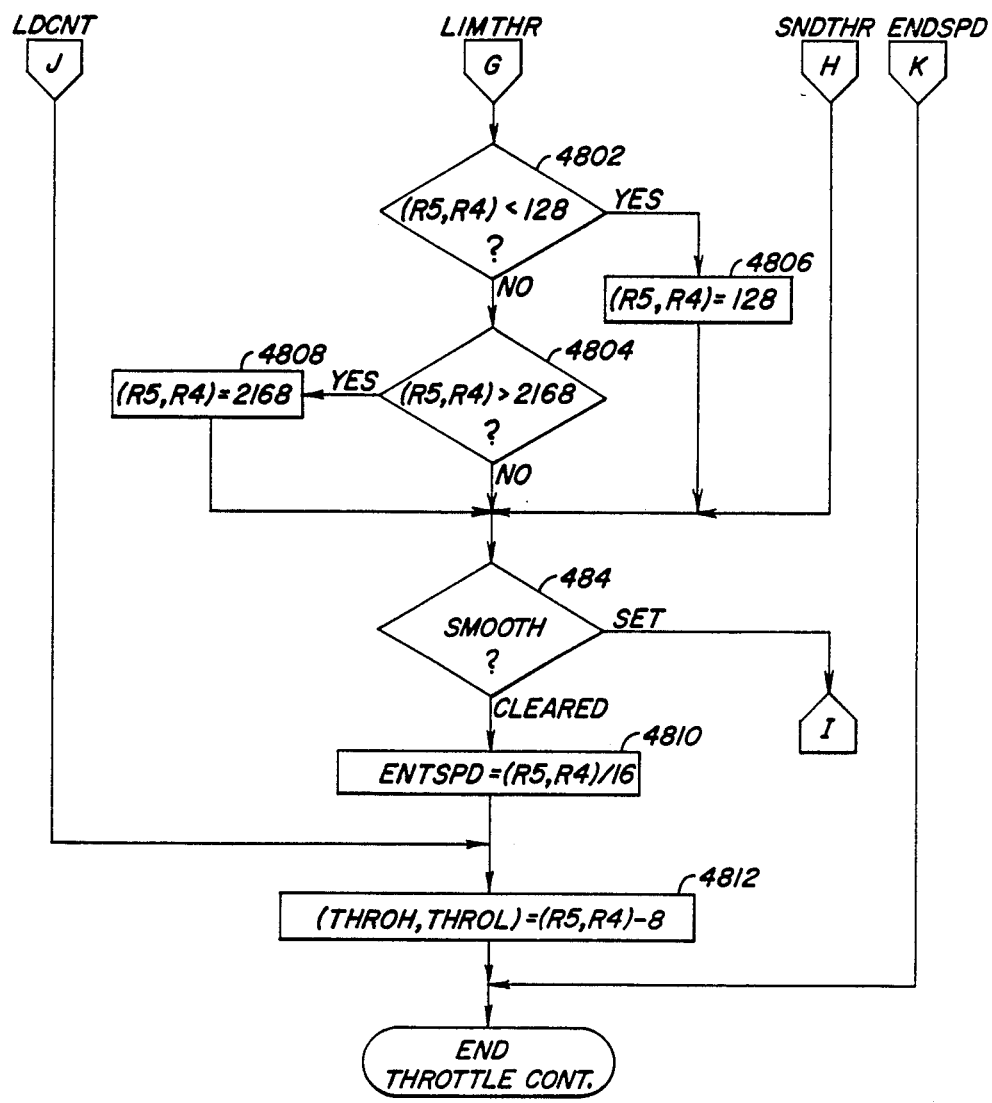

All four paths then come together again and the SMOOTH flag is tested (see Fig. 11a, step 484 and Fig. 11j). If the SMOOTH flag is set, then the throttle command is ramped from the value of ENTSPD (the current throttle command before the ramp was started) to the newly computed value in (R5, R4), (see Fig. 11i, 4702-4708). The rate of the ramp is determined by the entries in array RAMP. The SMOOTH flag is cleared once ENTSPD is ramped to the value in (R5, R4).

The final step (4812) in this section is to load (THROH, THROL) with the value in (R5, R4). (THROH, THROL) is used to determine the pulse width throttle command to be sent to the engine governor 32 in the Timer 1 Interrupt section.

TRANSMISSION SHIFT CONTROL

Figure 12B:
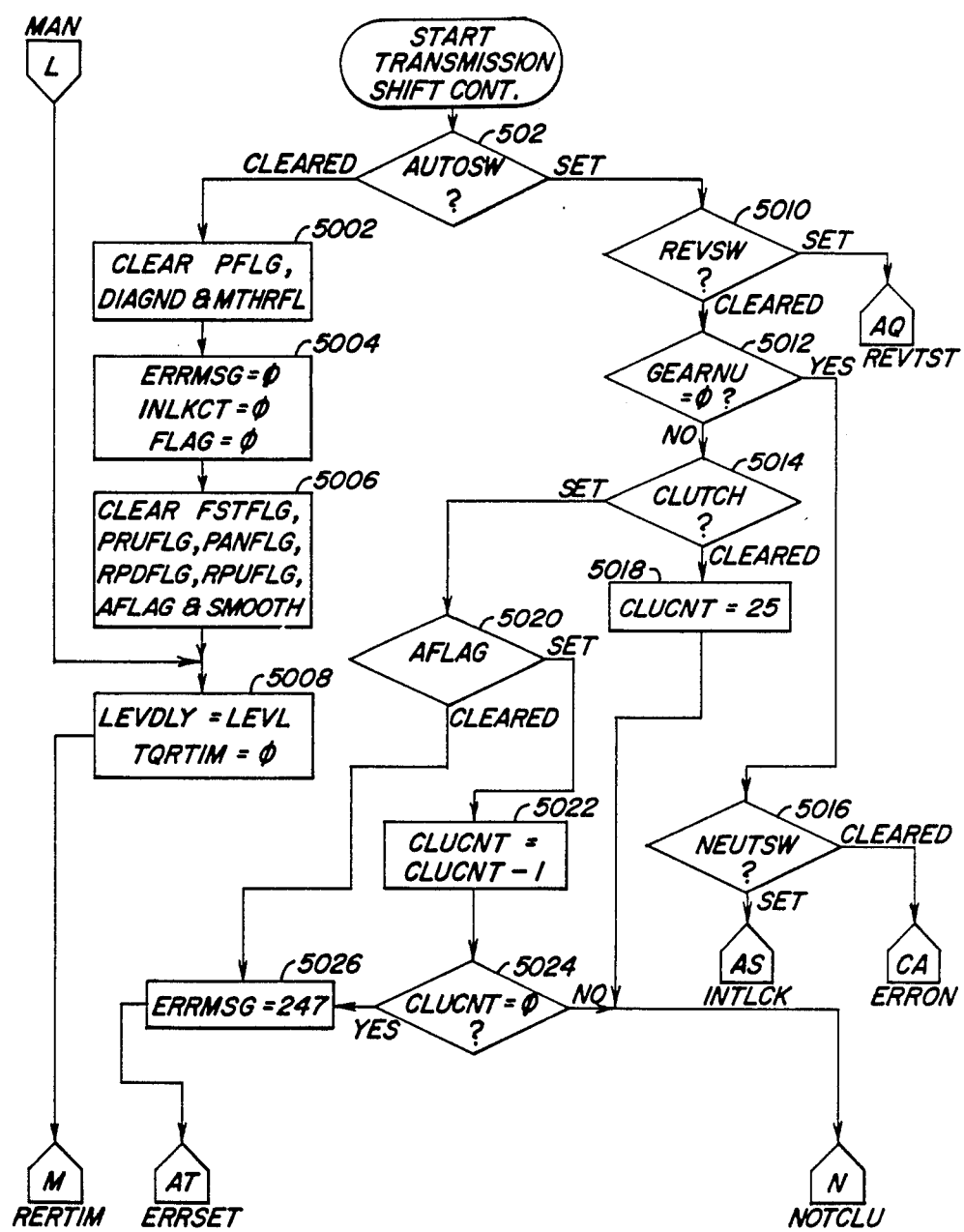
FIGS. 12b-12q form a detailed flow chart of the transmission shift control algorithm section.
Figure 12D:
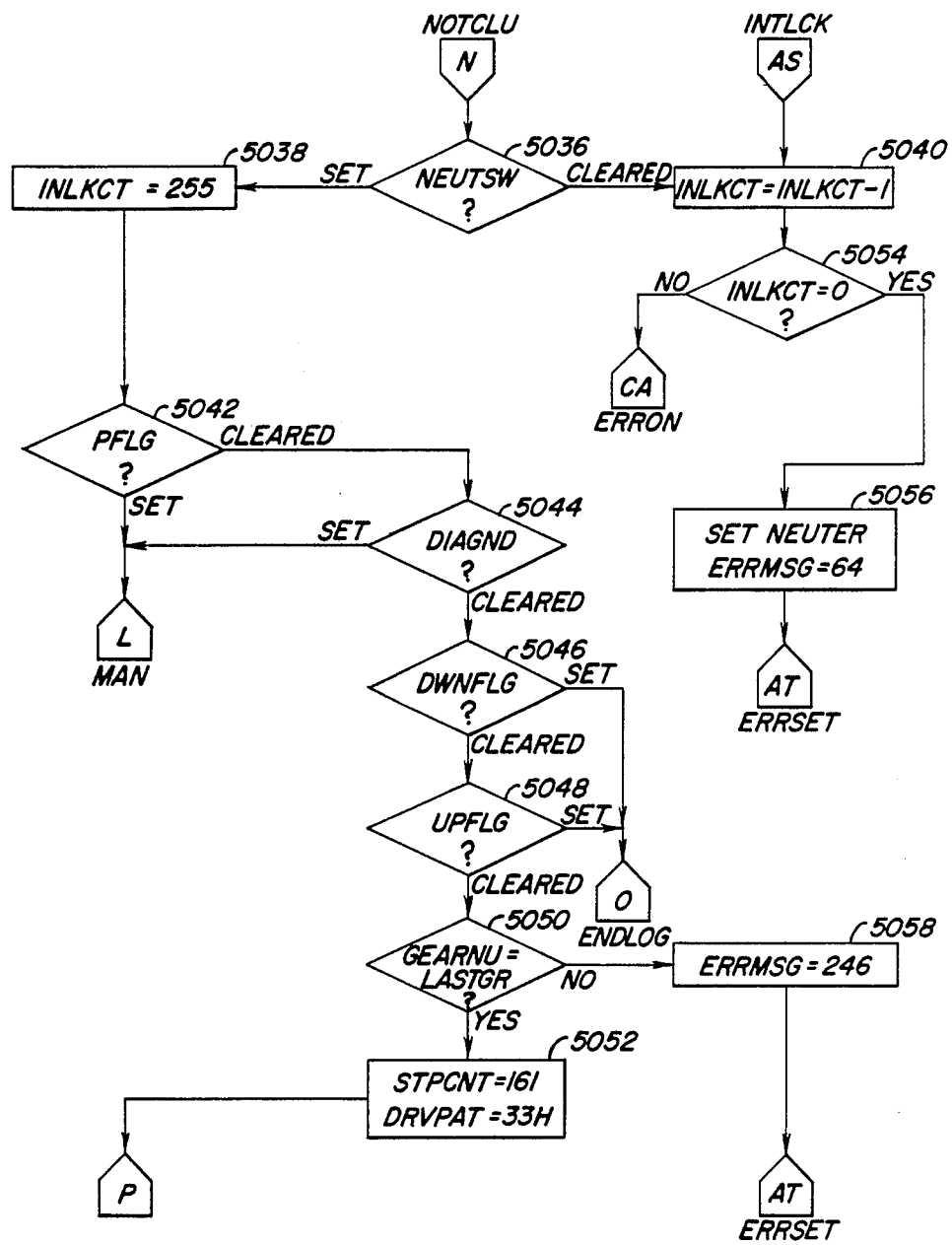
FIGS. 12a(1)-12a(3) form a simplified flow chart of the transmission shift control section of the main loop.
Figure 12E:
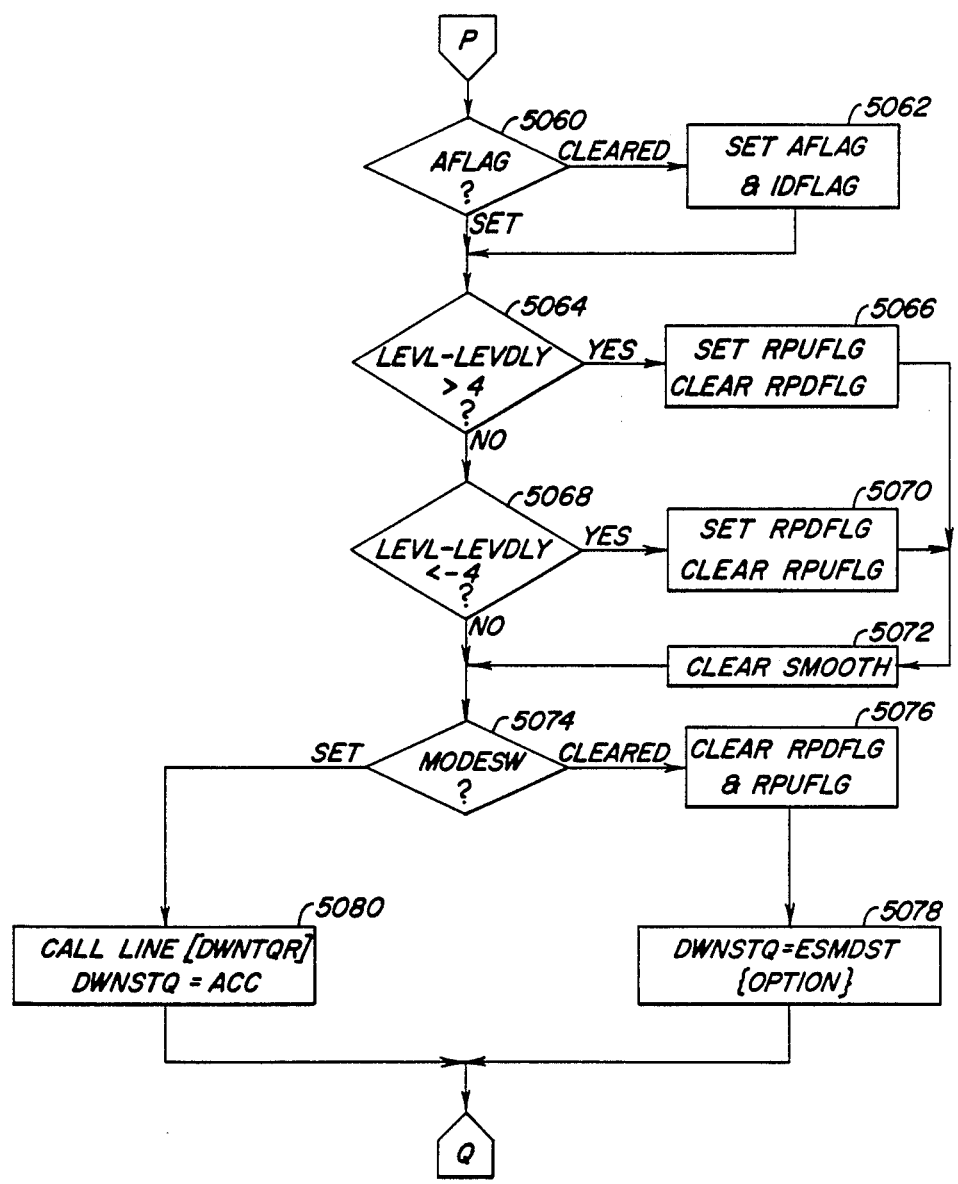
Figure 12F:
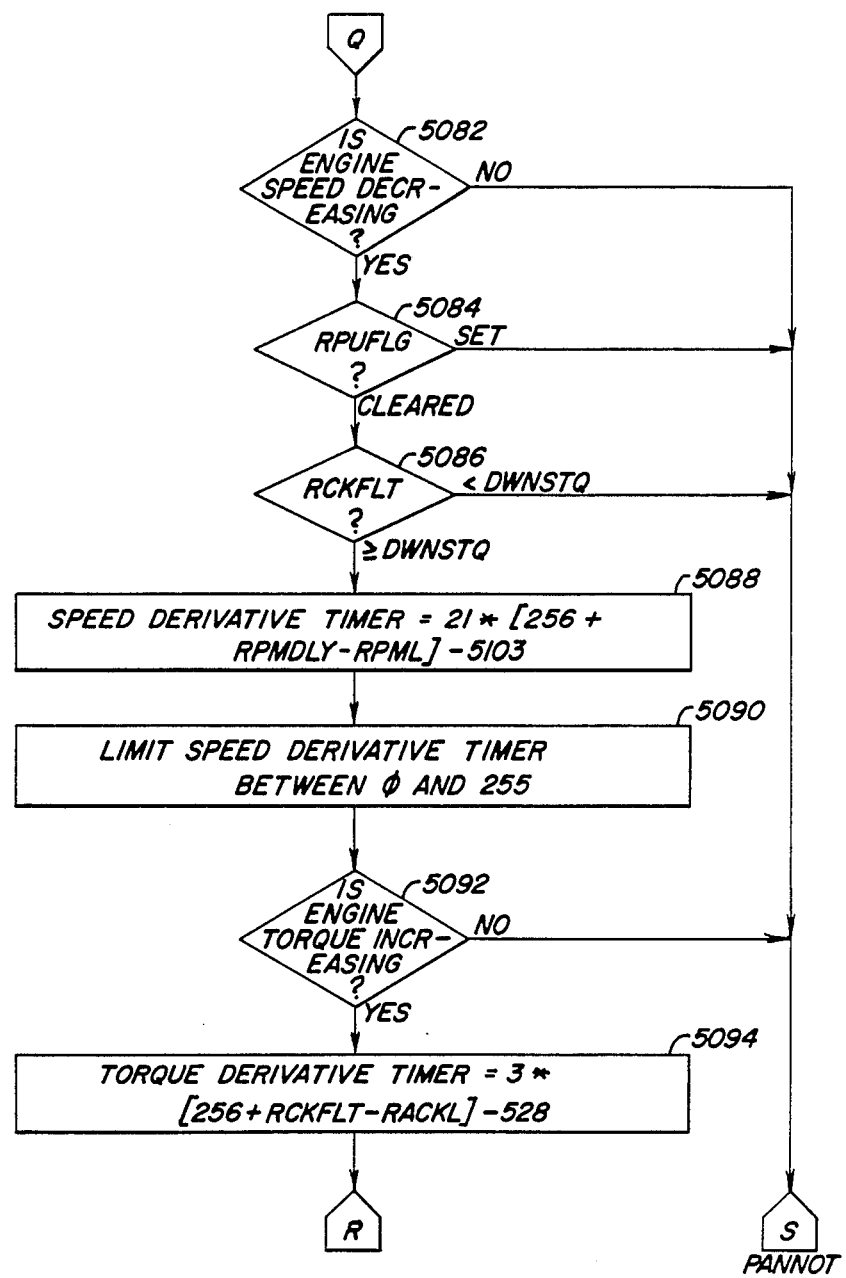
Figure 12G:
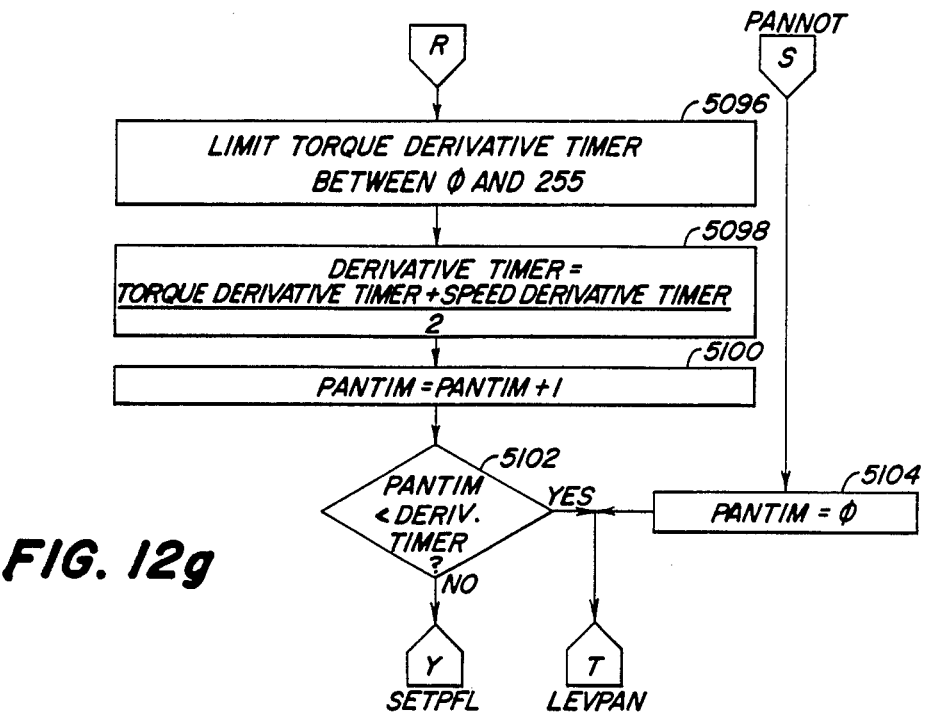
Figure 12H:
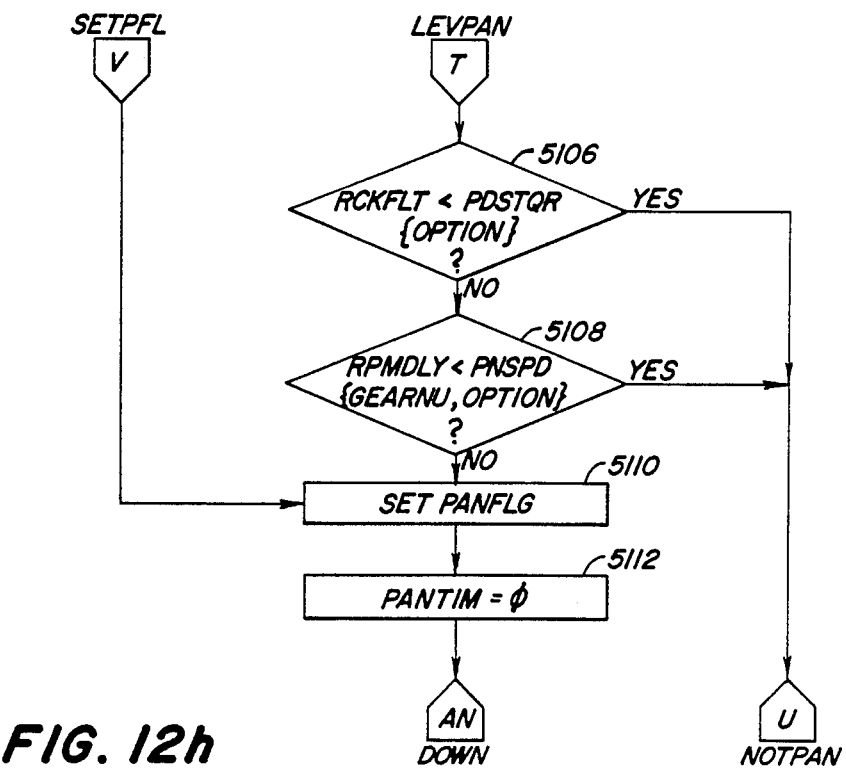
Figure 12I:
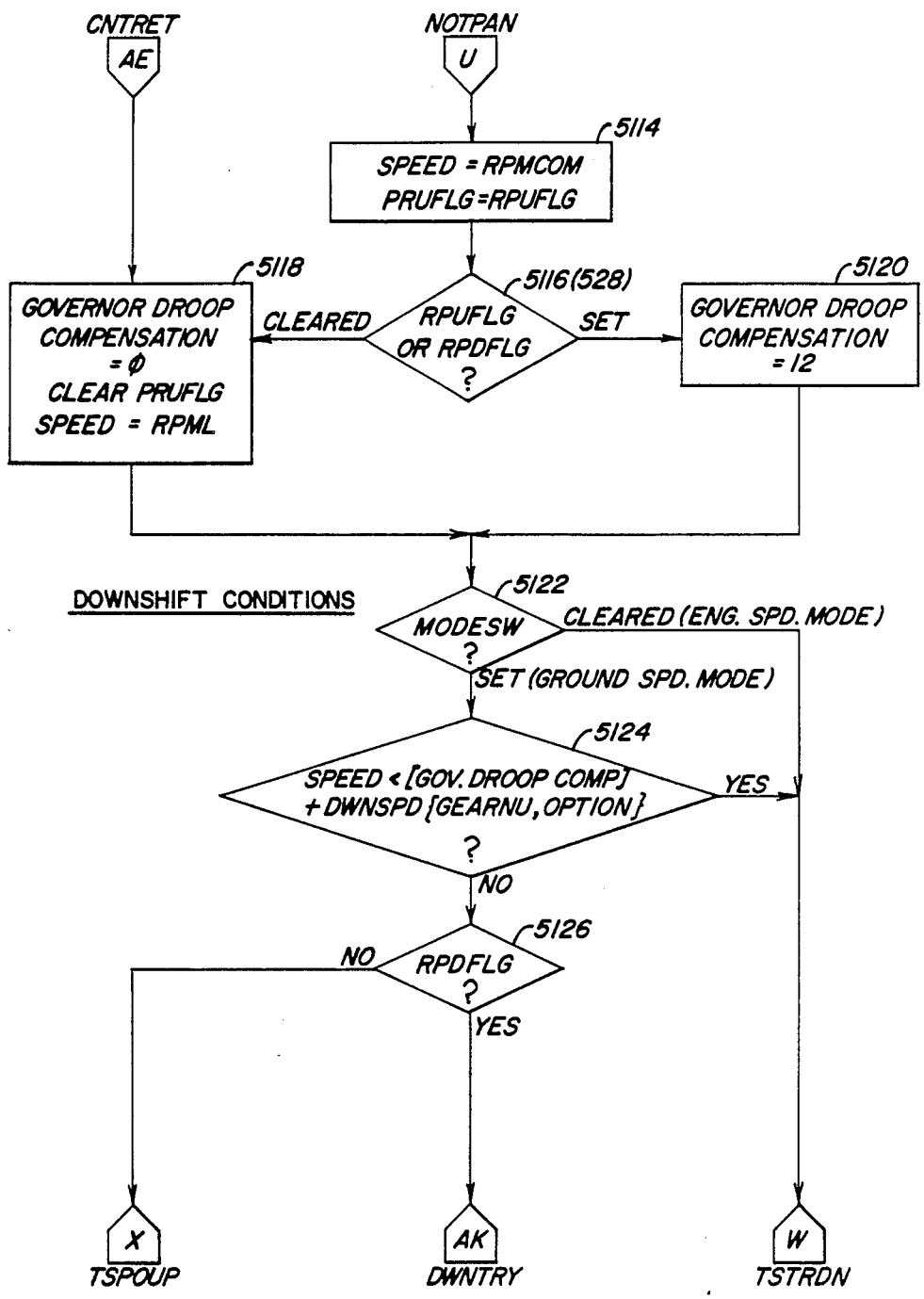
Figure 12J:
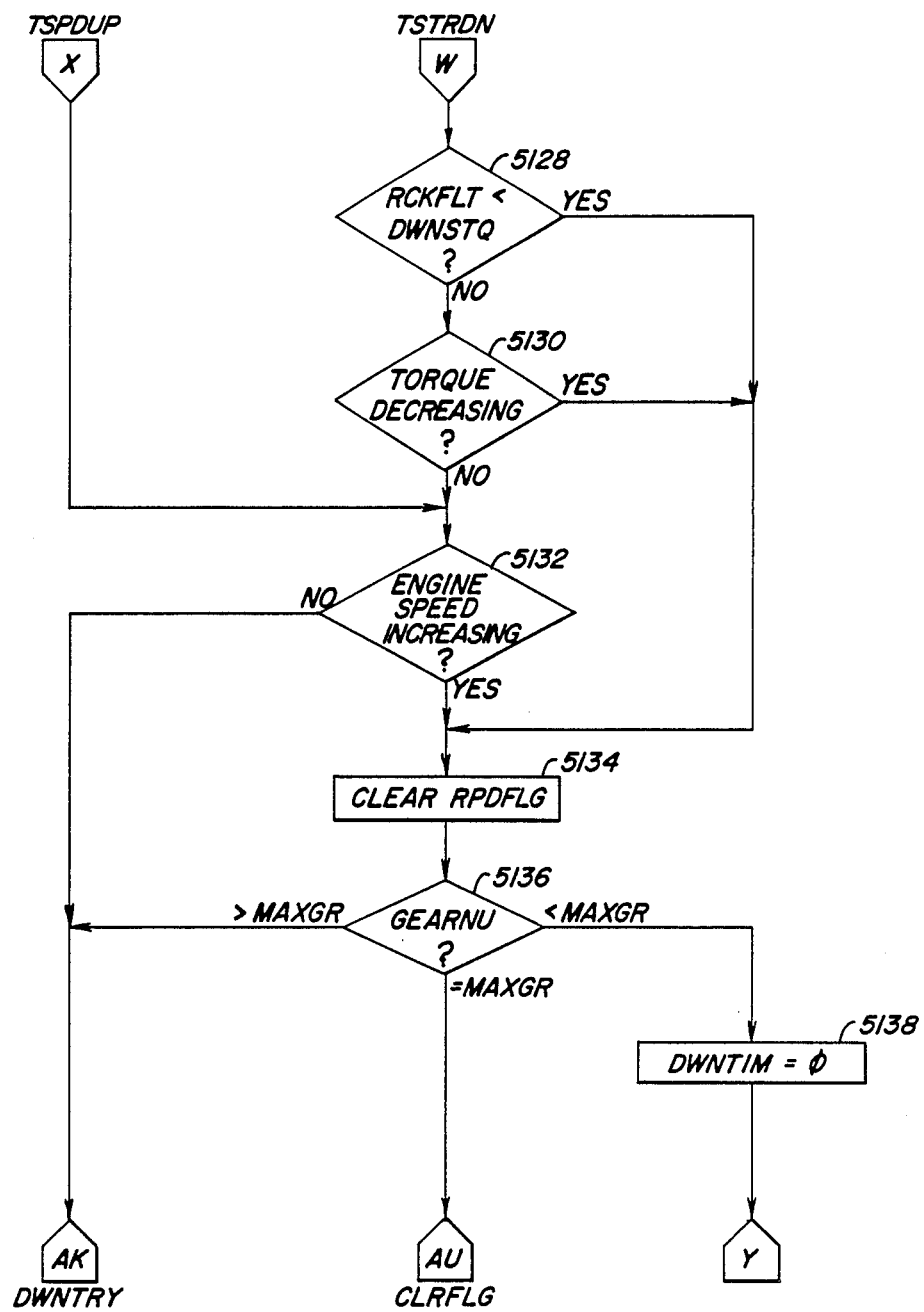
Figure 12K:
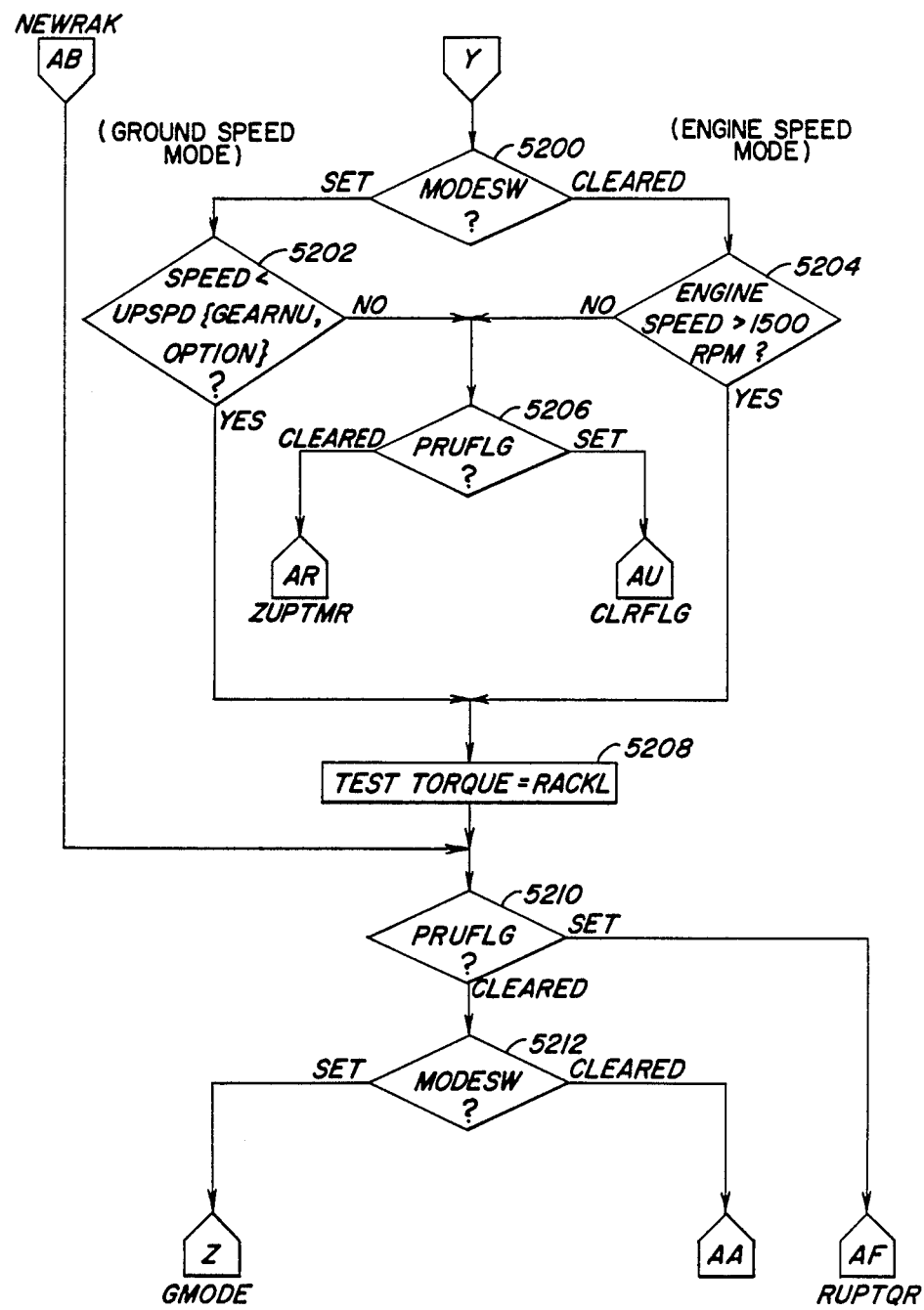
Figure 12L:
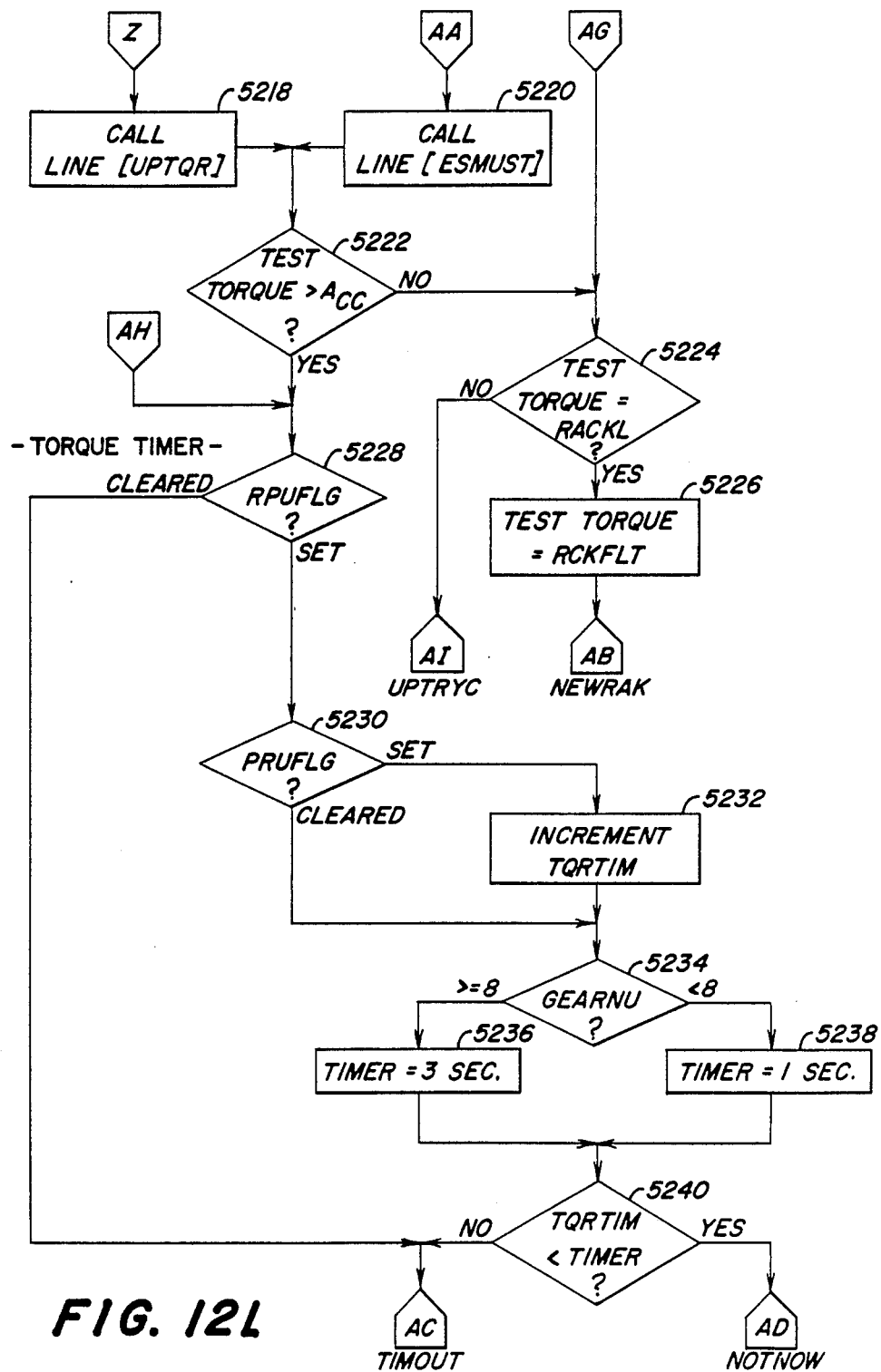
Figure 12M:
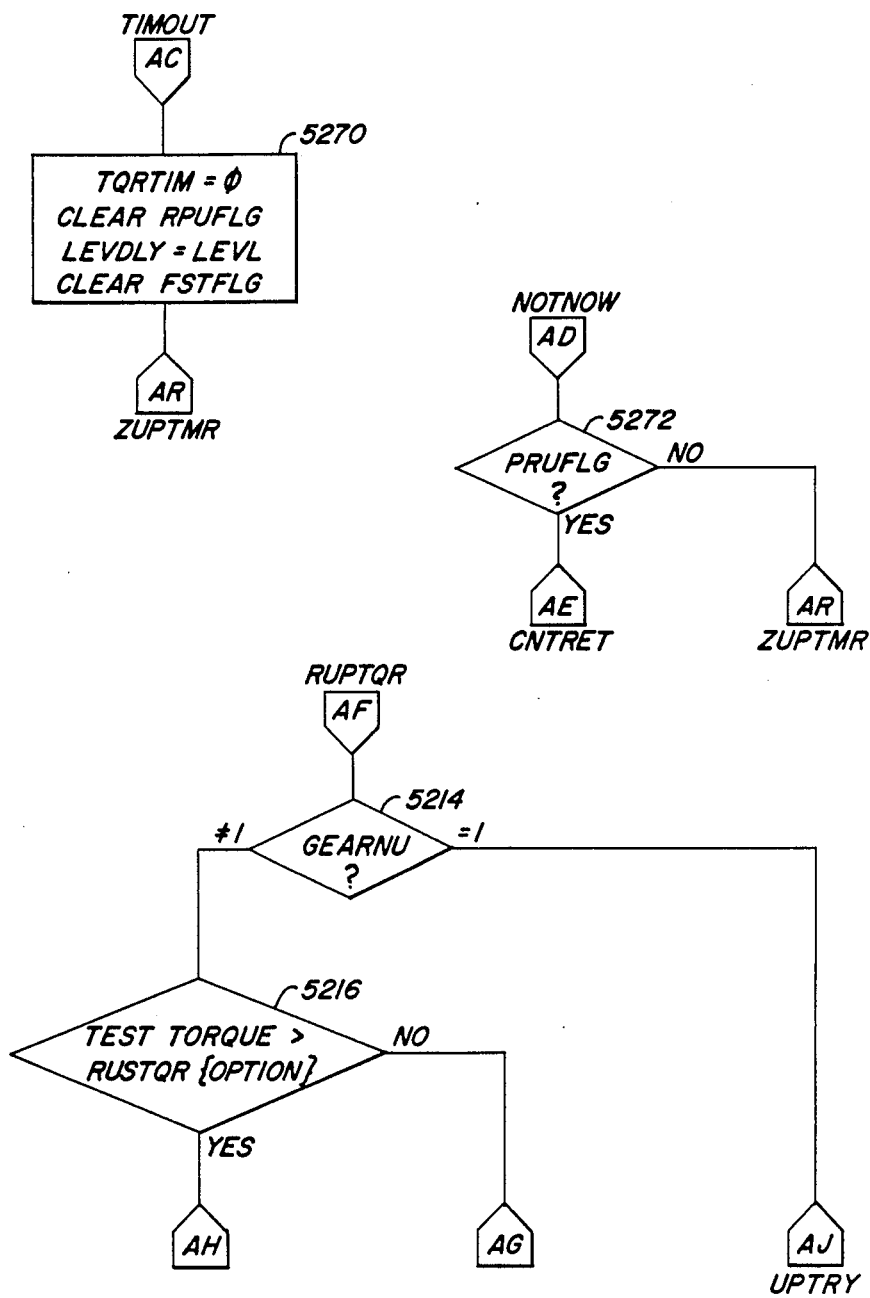
Figure 12N:
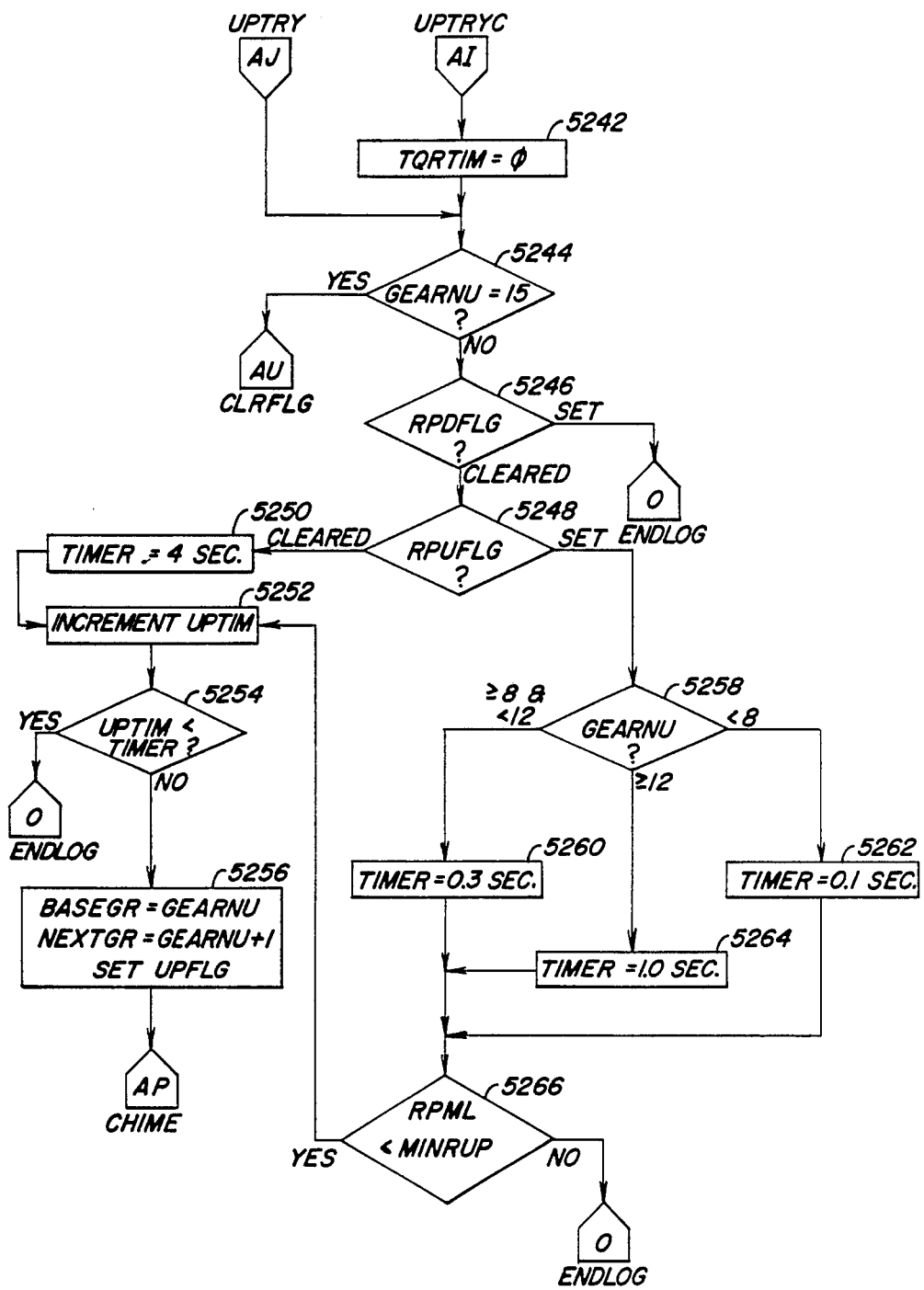
Figure 12O:
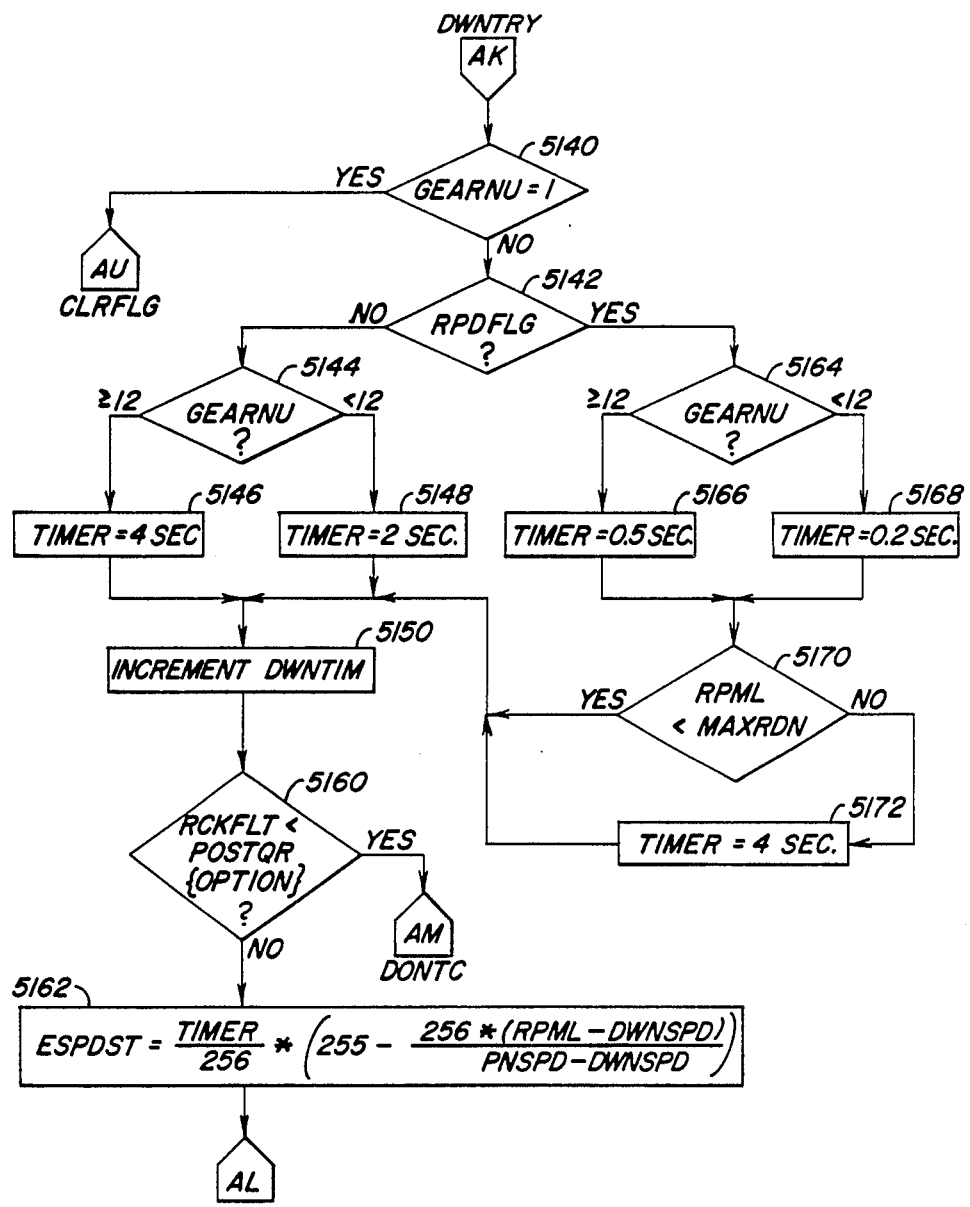
Figure 12P:
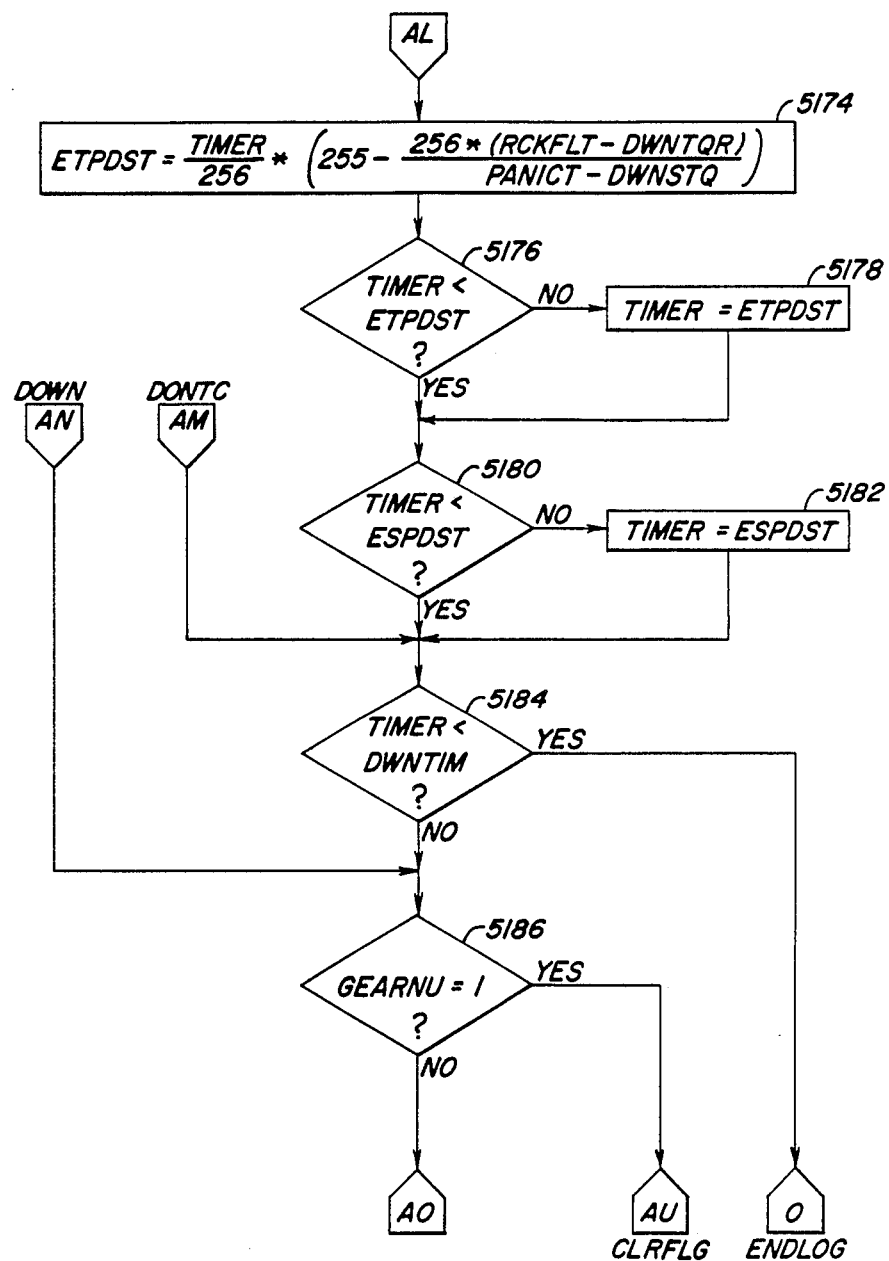
Figure 12Q:
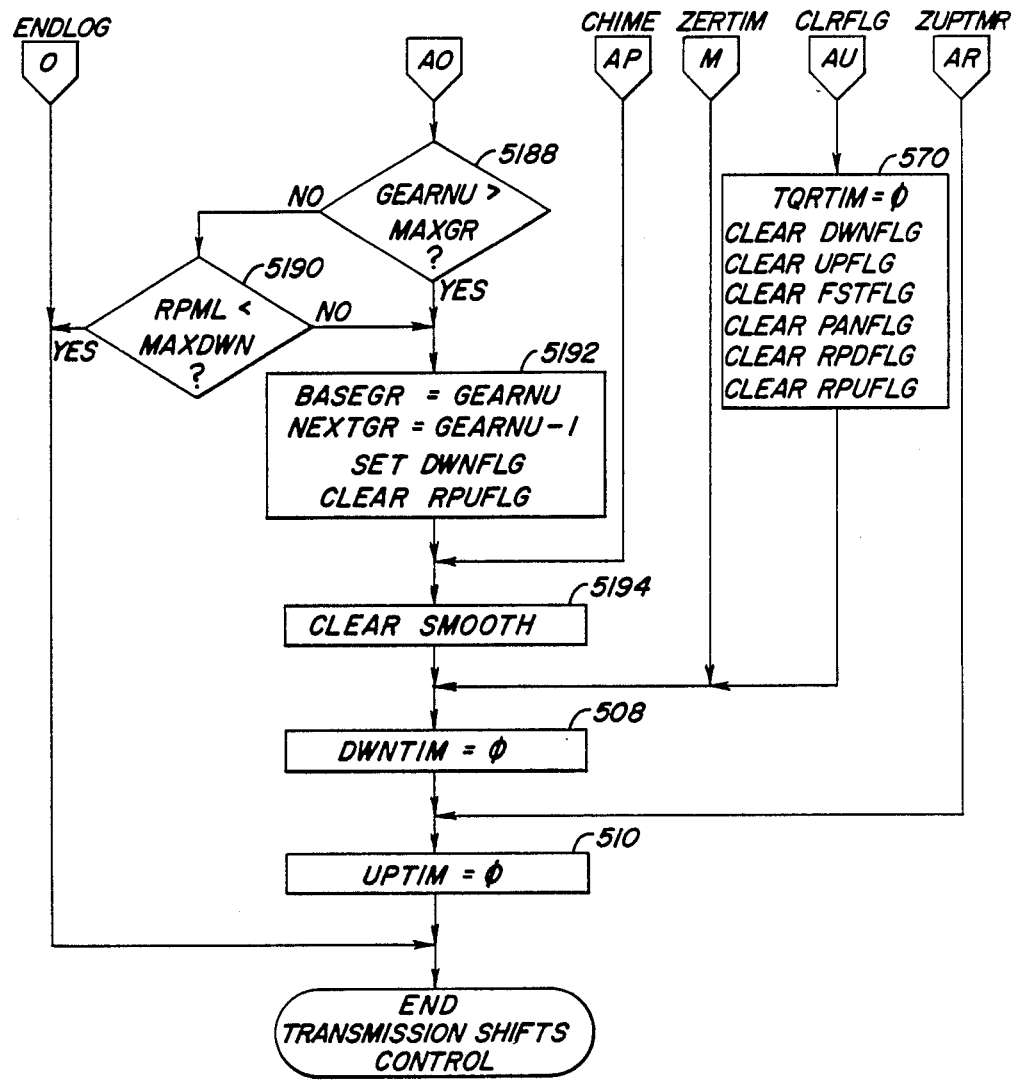

Referring now to FIGS. 12a–12q, the transmission shift control section may be divided into two major parallel paths: the manual mode and the automatic mode.

MANUAL

Referring now to steps 502 and 5026 of FIG. 12b and steps 508, 510, 570 and 5188-5194 of FIG. 12q, the manual mode is entered if (in 502) the auto/manual switch 40 is in the manual position or resume position. In the manual mode, all the error mode and shift flags are cleared at 5002-5008, the timers are zeroed at 508 and 510 and the section is exited. The manual mode is just an idle state that initializes the system for the next entry into the automatic mode. Note that all diagnosed errors are cleared in manual.

AUTOMATIC

The automatic mode is entered when the auto/manual switch 40 is in the automatic position. The automatic mode begins by testing the various inputs for validity.

INPUT VALIDITY TEST

Referring to FIGS. 12b-12d, (steps 502, and 5002-5052), the input validity test checks the operational state of the vehicle and determines if automatic operation of the transmission should be allowed. If a fault is found, then the associated error message and the problem flag is set, thus terminating automatic operation until the problem is cleared by passing through the manual mode.

If at 5010 the reverse flag (REVSW) is set, then the current gear number is tested at 5028. If the gear is greater than 4th, then error message 86 is set at 5032; otherwise, error message 66 is set at 5030. In either case, the problem flag is set at 5034 and control is transferred to the manual mode, except that the error flags are not cleared.

If, at 5012, the current gear number is zero (i.e., neutral), then the neutral interlock switch 38 (NEUTSW) is tested at 5016. If NEUTSW is cleared, (i.e., neutral), then error condition 66 is set and control is transferred to the manual mode with the error flags not cleared. If NEUTSW is set (5016) and the interlock counter (INLKCT at 5054) has not yet decremented to zero, then error condition 66 is set and control is transferred to the manual mode with the error flags not cleared. If INLKCT is zero at 5054, then error message 64 is set and control is transferred to the manual mode with the error flags not cleared. The interlock counter provides time for both the gear encoder pot 26 and the neutral interlock switch 38 to stabilize before testing for an error condition. This makes the timing of these two sensors less critical.

If, at 5014, CLUTCH is set (i.e., the clutch pedal is pressed), then the auto flag (AFLAG) is tested at 5020. If cleared, indicating automatic operation has not yet been allowed, error message 247 is set at 5026 and control is transferred to the manual mode with the error flags not cleared. If AFLAG is set at 5020, indicating the automatic mode was allowed on the last loop pass, then the clutch counter (CLUCNT) is decremented at 5022 and tested at 5024. If CLUCNT is zero, then error message 247 is set (5026) and control is transferred to the manual mode with the error flags not cleared. If CLUCNT is not zero, then control is passed to the next input test (5036). The CLUCNT timer provides debouncing of the clutch switch 44 and prevents random bouncing of the clutch pedal in rough field conditions from falsely terminating automatic operation.

If CLUTCH is set (i.e., the clutch pedal is released), then CLUCNT is set to 255 at 5018 and control passes to the next input test (5036).

The neutral interlock switch 38 (NEUTSW) is tested at 5036, and, if cleared, control is transferred to the interlock counter routine described above (5040, 5054–5056). If NEUTSW is set (i.e., not neutral), then INLKCT is set to 255 at 5038 and control is passed to the next input test.

If, at 5042, the problem flag (PFLG) is set, then control is transferred to the manual mode with the error flags not cleared. This prevents further automatic operation if an error has been detected.

If, at 5044, the diagnostic flag (DIAGNO) is set, indicating that the step motor diagnostics are in progress, then no error condition is set and control is transferred to the manual mode with the error flags not cleared.

If an upshift or downshift is in progress (i.e., UPFLG or DWNFLG set at 5046 or 5048), then no further action is required at this time and this section is exited.

If, at 5050, the current gear number (GEARNU) is not equal to the gear number of the last loop pass (LASTGR), meaning something other than the APT has shifted the transmission, then error message 246 is set at 5058 and control is transferred to the manual mode with the error flags not cleared.

SHIFT INITIALIZATION

The input validity test has been passed and the controller is now initialized for the next transmission shift. At 5052, the step motor step counter (STPCNT) is set to 161 to allow a maximum of 160 steps before giving up on a gear shift attempt. Also at 5052, the step motor drive pattern (DRVPAT) is set to 33 H for two-phase operation of the step motor 24.

Referring now to FIG. 12e, (steps 5060–5080), if the auto flag (AFLAG) is cleared at 5060, meaning that this is the first entry into auto since being in manual, then AFLAG is set and the vehicle indentification flag (IDFLAG) is set at 5062. Setting IDFLAG will cause the vehicle ID code to be transmitted once to the display 76.

RAPID SHIFT CONDITIONS

The speed lever 52 is tested for movement at 5064. If it has been advanced, then rapid upshifting is enabled (i.e., RPUFLG is set at 5066). If it has been pulled back, then rapid downshifting is enabled (i.e., RPDFLG is set at 5070). Lever movement is detected by subtracting the low-pass filtered lever position (LEVDLY) from the lever position (LEVL). If either of the rapid shift conditions are enabled, then the throttle ramp flag (SMOOTH) is cleared at 5072).

COMPUTE DOWNSHIFT TORQUE

The downshift torque (DWNSTQ) is a function of whether the ground speed mode or the engine speed mode has been selected. If the ground speed mode is operational (i.e., MODESW set at 5074), then DWNSTQ is computed at 5080 by sub-routine LINE with data table DWNTQR as the argument. If the engine speed mode is operational (i.e. MODESW cleared), then both rapid shift flags are cleared (5076) and DWNSTQ is the element of array ESMDST pointed to by index OPTION (5078).

PANIC SHIFT CONDITIONS

Referring now to FIGS. 12f–12h, (steps 5082–5112), in the panic shift condition test, the engine torque and speed are checked to determine if the engine is in danger of stalling. If so, the transmission is immediately downshifted one gear. The panic shift condition test can be broken into two parts: Derivative test and Level test.
Part 1: Derivative Test In the derivative test, the rate of change of the engine speed and the engine torque is used to detect a stall condition.

If the engine speed is not decreasing (5082), if the rapid upshift flag (RPUFLG) is set (5084) or if the filtered engine torque (RCKFLT) is less than the downshift torque (DWNSTQ) (5086), then the derivative test is bypassed, PANTIM is zeroed at 5104 and control is directly passed to the level test (Fig. 12h).

Otherwise, the speed derivative timer is calculated at 5088 as: speed derivative timer = 21 * (256 + RPMDLY − RPML) − 5103 and then is limited at 5090 to be a value between 0 and 255. The difference between the filtered engine speed period (RPMDLY) and the engine speed period (RPML) form the basis of the derivative. The remaining numbers scale the derivative such that a 20 rpm decrease at 1800 rpm yields a timer count of 252 and a 250 rpm decrease at 1800 yields a timie count of 0. Note that RPMDLY and RPML are engine speed periods and are inversely proportional to engine speed.

If the engine torque is not increasing, then the derivative test is bypassed, PANTIM is zeroed, and control is directly passed to the level test.

Otherwise, the torque derivative timer is computed at 5094 as:

torque derivative timer = 3 * (256 + RCKFLT − RACKL) − 528, and then is limited at 5096 to be a value between 0 and 255. The difference between the filtered engine torque (RCKFLT) and the engine torque (RACKL) forms the basis of the derivative. The remaining numbers scale the derivative such that an increase in engine torque of 1% of rated torque yields a timer count of 237 and an increase in engine torque of 50% of rated torque yields a timer count of 0.

The overall derivative timer is computed at 5098 as the simple average of the speed derivative timer and the torque derivative timer:

$$\text{derivative timer} = \frac{\text{speed deriv. timer} + \text{torque deriv. timer}}{2}.$$

The panic downshift timer (PANTIM) is incremented (5100) and tested (5102) with the derivative timer. If PANTIM is not less than the derivative timer, then control is passed to the level test. Otherwise, the derivative test has detected a stall condition which results in the panic downshift flag (PANFLG) being set at 5110, PANTIM being zeroed at 5112, and control being passed to the Initiate Downshift sub-subsection below.

Part 2: Level Test

In the level test, the level of the engine speed and the engine torque is used to detect a stall condition.

If, at 5106, the filtered engine torque (RCKFLT) is less than the element of the array PDSTQR pointed to by index OPTION or if, at 5108, the filtered engine speed period (RPMDLY) is less than the element of the array PNSPD pointed to by the indexes GEARNU and OPTION, then this subsection is exited and control passes to the Shift Conditions subsection (FIG. 12i). Otherwise, the level test has detected a stall condition which results in the panic downshift flag (PANFLG) being set at 5110, PANTIM being zeroed at 5112, and control being passed to the Initiate Downshift sub-subsection below.

SHIFT CONDITIONS

Referring back to FIG. 12a, the shift conditions subsection is the logic that actually determines when and if a transmission gear shift is required. This subsection may be broken down further into 7 major sub-subsections: Downshift Conditions, Downshift Timer, Initiate Downshift, Upshift Conditions, Torque Timer, Upshift Timer, and Initiate Upshift.

The logic flow through these sub-subsections begins with the downshift conditions 534, 538, 540. If any of the downshift conditions are met, the control transfers to the downshift timer 536, 542. The downshift timer either exits this section if it has not yet timed out or passes control to Initiate Downshift 526 and exits the section if it has timed out.

If none of the downshift conditions are met in the Downshift Conditions subsection, then control passes to the Upshift Conditions subsection 544, 546. If the engine speed upshift conditions are not met, then the section is exited. If they are met, then the torque upshift conditions are tested.

If the torque upshift conditions are met, then control is passed to the Upshift Timer sub-subsection 550, 562. The upshift timer either exits the section if it has not yet timed out, or if it has timed out, passes control to Initiate Upshift 564 and exits the section.

If the torque upshift conditions are not met, then control is passed to the Torque Timer sub-subsection 552, 554. The Torque Timer either clears the rapid upshift condition and passes control to Downshift Conditions if a rapid upshift condition is set, or exits the section if a rapid upshift condition is not set.

The shift conditions for both upshift and downshift are based on engine speed and engine torque. If either of the rapid shift conditions are met, then the engine speed period command (RPMCOM) is used in place of the engine speed period (RPML) in the engine speed tests. Local variable "Speed" contains the engine speed period selected.

Also, if either of the rapid shift flags are set, then the governor droop compensation is loaded with 12 at 5120 (FIG. 12i). This has the effect of raising the downshift test speed by 100 rpm in step 5124 to compensate for the governor droop at no load. If the droop is not compensated for in the rapid downshift mode, the transmission may be downshifted too many gear ratios at low transport loads. This is because at low loads, the engine speed will be above the speed command due to governor droop. Thus, at low loads, RPMCOM does not correctly represent the actual engine speed of the engine.

Downshift Conditions

Referring now to FIG. 12i, (steps 5114–5126), the downshift conditions begin by testing the mode switch 42 at 5122. If the engine speed mode is selected (MODESW cleared), the engine speed tests are bypassed and control is transferred to the downshift torque test. If the ground speed mode is selected (MODESW set), then Speed is tested at 5124 to see if it is less than the sum of the governor droop compensation and the downshift speed period (DWNSPD (GEARNU, OPTION)). (Note that since engine speed periods are being tested, this is equivalent to testing if the engine speed is greater than the downshift speed.) If yes, then no downshift is needed due to engine speed and control is transferred to the downshift torque test. If no, then the rapid downshift flag is tested at 5126.

If the rapid downshift flag (RPDFLG) is set, control is passed to the downshift timer sub-subsection. If RPDFLG is cleared, control is passed to the downshift engine speed slope test.

Referring now to FIG. 12j, (steps 5128–5138), the downshift torque test (5128) compares the engine torque (RAKFLT) with the downshift torque (DWNSTQ). If RCKFLT is less than DWNSTQ, then no downshift is required due to high engine torque and control is passed to the clear rapid downshift flag instruction (5134). If RCKFLT is greater than DWNSTQ, the slope of the torque is tested at 5136. If the torque is decreasing, then the engine is recovering and no downshift is required even though the torque is high, so control is passed to the clear rapid downshift flag instruction (5134). If the engine torque is not decreasing, control is passed to the downshift engine speed slope test (5132).

In the downshift engine speed slope test, if the engine speed is increasing, then the engine is recovering and no downshift is required regardless of the other conditions, so control is passed to the clear rapid downshift flag instruction (5134). If the engine speed is not increasing, then control is passed to the downshift timer subsection. Note that a downshift occurs only if the engine speed is not increasing.

The clear rapid downshift flag instruction (5134) clears the rapid downshift flag (RPDFLG) since no downshift condition was met. The current gear (GEARNU) is then tested at 5136 with the top gear limit (MAXGR). If GEARNU is greater than MAXGR, then the top gear has been exceeded (most likely due to the operator lowering the top gear limit) and control is passed to the downshift timer sub-subsection of FIG. 12o (steps 5140–5162). If GEARNU is equal to MAXGR, then the top gear has been reached and no further upshifting is allowed, so both shift timers and the shift flags are cleared and the transmission shift control section is exited (FIG. 12q). If GEARNU is less than MAXGR, the downshift timer (DWNTIM) is zeroed at 5138 and control is passed to the upshift conditions sub-subsection of FIG. 12k (steps 5200–5212).

Downshift Timer

Referring now to FIG. 12o, the downshift timer sub-subsection begins at 5140 by testing the current transmission gear (GEARNU). If GEARNU=1, then no further downshifting is allowed so the shift flags are cleared, both shift timers are cleared, and the transmission shift control section is exited (see 520 of FIG. 12q). If GEARNU is other than 1, then the rapid downshift flag is tested.

If, at 5142, the rapid downshift flag (RPDFLG) is not set, then a normal downshift is required. If, at 5144, GEARNU is less than 12th, then the downshift timer limit (local variable "timer") is set for 2 seconds (5148) and control is passed to the increment downshift timer instruction (5150). If GEARNU is greater than 11, then "timer" is set equal to 4 seconds (5146) before transferring control to the increment downshift timer instruction (5150). The longer downshift time for gears 12th and above prevents unwanted downshifts due to large transient load increases caused by the large gear changes in the upper gears. If, at 5142, RPDFLG is set, then a rapid downshift is required. For gears below 12th, "timer" is set to 0.2 seconds (5168). For gears greater than 11th, "timer" is set for 0.5 seconds (5166). In this case, the different shift times are required to achieve shift smoothness. The lower gears can be shifted through faster because they cause a smaller change in ground speed. If, at 5170, the engine speed period (RPML) is less than the maximum engine speed period for rapid downshifting (MAXRDN), (i.e., engine speed greater than maximum rapid downshift speed), then "timer" is set to 4 seconds at 5172. This allows the operator time to react to prevent rapid overspeeding of the engine.

The downshift timer (DWNTIM) is incremented at 5150 to count this pass through the downshift timer sub-subsection.

The engine torque (RCKFLT) is tested at 5160 to be less than the panic downshift torque (PDSTRQR {OPTION}). If so, the proportional downshift timer is bypassed and control transfers to the downshift timer test. If not, then the proportional downshift timer is computed at 5162.

The proportional downshift timer is composed of two parts: the engine speed proportional downshift timer (ESPDST) and the engine torque proportional downshift timer (ETPDST). The ESPDST is a downshift timer limit that is proportionally placed between 0 seconds and the value of local variable "timer" based on position of the engine speed period (RPML) between the downshift speed period (DSNSPD) and the panic downshift speed period (PNSPD):

$$ESPDST = \frac{timer}{256} * \left(255 - \frac{256 * (RPML - DWNSPD)}{PNSPD - DWNSPD}\right)$$

Referring now to FIG. 12p (steps 5174-5186), similarly, at 5174, the ETPDST is a downshift timer limit proportionally placed between 0 seconds and the value of "timer", based on the position of the engine torque (RCKFLT) between the downshift torque (DWNTQR) and the panic downshift torque (PANICT):

$$ETPDST \frac{timer}{25} * \left(255 - \frac{256 * (RCKFLT - DWNTQR)}{PANICT - DWNSTQ}\right)$$

"Timer" is then assigned at 5176-5182 the value that is the least of ESPDST, ETPDST, and "timer" Control then passed to the downshift timer test. The effect of the proportional downshift timer is to speed up the downshift rate according to how close the engine 10 gets to the panic shift conditions. This makes the system more responsive to sudden load increases before the panic downshift conditions are reached.

The downshift timer test (5184) consists of testing "timer" with the downshift timer (DWNTIM). If "timer" is less than DWNTIM, then it is not yet time to trigger a downshift and the transmission shift control section is exited. Otherwise, the downshift timer has timed out and control is transferred to the initiate downshift sub-subsection.

Initiate Downshift

At 5186, the gear number (GEARNU) is tested. If it equals 1, then no further downshifting can take place so the shift flags are cleared, both shift timers are zeroed, and the transmission shift control section is exited (see 570, FIG. 12q).

Referring now to FIG. 12q, (steps 5188-5194, and 508-510), if GEARNU is other than 1, then GEARNU is tested at 5188 (FIG. 12q) with the top gear limit (MAXGR). If GEARNU is greater than MAXGR, the maximum engine speed for downshift test is bypassed and control transfers to the set downshift flags command (5192). If GEARNU is less than MAXGR, then the engine speed period (RPML) is tested at 5190 to see if it is less than the maximum engine speed period for downshifting (MAXDWN) (ie., engine speed greater than maximum downshift speed). If true, then further downshifting is not allowed because it will overspeed the engine so the transmission shift control section is exited. If false, there is no danger of overspeeding and control is passed to the set downshift flags command (5192).

The set downshift flag command (5192) consists of setting the base gear (BASEGR) equal to the current gear (GEARNU), setting the target gear (NEXTGR) equal to GEARNU−1, setting the downshift flag (DWNFLG), and clearing the rapid upshift flag (RPUFLG). The SMOOTH flag is then cleared at 5194 and the transmission shift control section is exited.

Upshift Conditions

Referring now to FIG. 12k, the upshift conditions section begins by testing the mode select switch at 5200. If the engine speed mode is selected (MODESW cleared), then the engine speed is tested at 5204, if it is greater than 1500 rpm. If it is, then control passes to the "test torque" assignment instruction (5208). If the engine speed is less than 1500 rpm, then the engine speed is too low for upshifting and the pseudo rapid upshift flag (PRUFLG) is tested (5206). If PRUFLG is set, then the shift flags are cleared, both shift timers are zeroed, and the transmission shift control section is exited (570, 508 and 510 of FIG. 12q). If PRUFLG is cleared, then only the upshift timer is zeroed before exiting the transmission shift control section (510 of FIG. 12q). (Only the upshift timer is zeroed as this may be the second pass through the upshift conditions during a rapid upshift, and the upshift flag should not be cleared.)

If, at 5200, the ground speed mode is selected (MODESW set), then the local variable "speed" is tested at 5202 to determine if it is less than the upshift speed period (UPSPD {GEARNU, OPTION}) (i.e., engine speed greater than the upshift speed). If so, then the engine speed is high enough for an upshift and control is transferred to the "test torque" assignment instruction (5208)). If not, then the engine speed does not require that an upshift be made and the pseudo rapid upshift flag (PRUFLG) is tested (5206). If PRUFLG is set, then the shift flags are cleared, both shift timers are zeroed, and the transmission shift control section is exited. If PRUFLG is cleared, then only the upshift timer is zeroed before exiting the transmission shift control section. (Only the upshift timer is zeroed as this may be the second pass through the upshift conditions during a rapid upshift, and the upshift flag should not be cleared.)

The "test torque" assignment instruction (5208) is the initialization prior to the upshift torque test loop. This loop is passed through twice, once with local variable "test torque" equal to the unfiltered engine torque (RACKL), and once with "test torque" equal to the low pass filtered engine torque (RCKFLT). This allows either a long term high torque level or a rapid increase in engine torque to prevent upshifting.

With "test torque" initially loaded with RACKL, the pseudo rapid upshift flag (PRUFLG) is tested at 5210. If set, the gear number is tested at 5214 of FIG. 12m. If GEARNU=1, then the upshift torque tests are bypassed and control is passed to the initiate upshift subsection (FIG. 12n). (A rapid upshift out of first gear is always allowed regardless of the torque. This is because shifting from first gear causes a large transient torque that must be ignored.) If GEARNU is other than 1, then "test torque" is tested at 5216 to determine if it is larger than the rapid upshift torque (RUSTQR {OPTION}). If it is, the torque is too high for a rapid upshift and control passed to the torque timer sub-subsection of FIG. 12l, steps 5228-5240). If it is not, control passes to the RACKL test (FIG. 12l).

Referring to 5210 and 5212 of FIG. 12k and 5218 and 5220 of FIG. 12l, if PRUFLG is cleared, then "test torque" is tested to see if it is greater than either the engine speed upshift torque (LINE [ESMUST]) for the engine speed mode or the ground speed upshift torque (LINE [UPTQR]) for the ground speed mode. If "test torque" is greater than the upshift torque (at 5222), then the torque is too high for an upshift and control transfers to the torque timer section (5228-5240). If "test torque" (5224) is less than the upshift torque, control transfers to the RACKL test.

The RACKL test checks to see if this is the first or second pass through the upshift torque tests. If "test torque"=RACKL, then this is just the first pass, so "test torque" is loaded at 5226 with RCKFLT and control is passed to the beginning of the upshift torque test loop (FIG. 12k). If "test torque" is not equal to RACKL, then this is the second pass, both engine torques have been tested, and the conditions are correct for upshifting. The torque timer (TQRTIM) is cleared at 5242 and control passes to the upshift timer sub-subsection (FIG. 12n).

Torque Timer

Referring to FIG. 12l, the torque timer sub-subsection is entered whenever the engine torque is too high to permit upshifting. Rather than terminating rapid upshifts whenever the torque is high, the torque timer postpones the upshifts until the torque falls without clearing the rapid upshift flag. Only if the torque remains high for the length of the torque timer is the rapid upshift flag cleared. This allows the system to be insensitive to short term transient load increases due to rough shifts or field conditions. While the torque timer is counting, the pseudo rapid upshift flag (PRUFLG) is cleared and the shift conditions subsection is re-entered using the RPML in place of RPMCOM for the engine speed tests. This allows normal downshifting to occur if required while waiting for the torque to fall.

The torque timer routine begins by testing the rapid upshift flag (RPUFLG) at 5228. If PRUFLG is cleared, then the torque timer is not needed so the torque timer (TQRTIM) is cleared, the upshift timer is cleared, and the transmission shift control section is exited (see 5270, FIG. 12m)

If RPUFLG is set, then the pseudo rapid upshift flag (PRUFLG) is tested at 5230. If cleared, then this is the second pass through the shift conditions and the incrementing of the torque timer is bypassed. Otherwise, the torque timer is incremented at 5232.

Steps 5234-5238 operate so that the torque timer (TQRTIM) is set to 1 second if the gear is less than 8 or to 3 seconds for gears not less than 8. The different timer limits are required as the higher gears produce longer torque transients due to the larger ground speed changes they cause. If TQRTIM is less than timer at 5240, then the torque has been high too long so TQRTIM is cleared, RPUFLG is cleared, the upshift timer is cleared, and the transmission shift control section is exited (see 5270, FIG. 12m). If TQRTIM is less than the timer limit, then PRUFLG is tested at 5272 (FIG. 12m).

If, at 5272, PRUFLG is cleared, then this is the second paas through the shift conditions subsection so the upshift timer is cleared at 510 of FIG. 12q and the transmission shift control section is exited.

If, at 5272, PRUFLG is set, then it is cleared and the shift conditions section is re-entered via 5118 of FIG. 12i using RPML for the engine speed tests.

Upshift Timer

Referring now to FIG. 12n, (steps 5242-5266), the upshift timer section begins by comparing the gear number (GEARNU) to 15 at 5244. If GEARNU is equal to 15, then no further upshifting is allowed so the shift flags are cleared, both shift timers are zeroed, and the transmission shift control section is exited (see 570, 508 and 510 of FIG. 12q).

If GEARNU is other than 15, the rapid downshift flag (RPDFLG) is tested at 5246. If RPDFLG is set, then upshifting is not allowed and the transmission shift control section is exited. If RPDFLG is cleared, then the rapid upshift flag (RPUFLG) is tested at 5248.

If RPUFLG is cleared, then a normal upshift is required, the upshift timer limit (local variable "timer") is set to 4 seconds at 5250 and control passes to the increment upshift timer instruction (5252). If RPUFLG is set, then a rapid upshift is required. The upshift timer limit ("timer") is determined in steps 5258-5264 by the current transmission gear, as the lower gears may be upshifted faster than the higher gears due to the ground speed changes they cause. For gears less than 8, "timer" is set to 0.1 seconds (5262); for gears 8 through 11, "timer" is set to 0.3 seconds (5260) and for gears 12 and greater, "timer" is set to 1 second (5264). The engine speed period (RPML) is then tested at 5266 to determine if it is less than the minimum engine speed period for rapid upshifting (MINRUP) (i.e., engine speed greater than minimum rapid upshift speed). If not, rapid upshifting is not allowed and the transmission shift control section is exited; otherwise, control is transferred to the increment upshift timer instruction (5252).

The increment upshift timer (UPTIM) instruction 5252 counts the number of passes through the upshift timer sub-subsection. If at 5254 UPTIM is less than "timer", then it is not yet time to upshift and the transmission shift control section is exited. If UPTIM is greater than or equal to "timer", then the upshift timer has timed out and control passes to the initiate upshift sub-subsection.

Initiate Upshift

At step 5256, the initiate upshift sub-subsection sets the base gear (BASEGR) equal to the current gear (GEARNU), sets the target gear (NEXTGR) to GEARNU+1, sets the upshift flag (UPFLG). Then, at 5194 of FIG. 12q, the SMOOTH flag is set. Then, both shift timers are cleared at 508 and 510 and the transmission shift control section is exited.

Referring back to FIG. 8, the serial data line service routine 600 merely operates to control transmission of messages to the display 76 and to a diagnostic display (not shown). This message transmitting and display feature is not necessary to the operation of this system as an automatic control system and thus, forms no part of the invention defined in the appended claims. Therefore, this detailed description will not be burdened with a further description of this feature, it being sufficient to point out that the program listing in the attached microfiche appendix contains the software necessary to implement this feature.

HOUSEKEEPING

Figure 13:
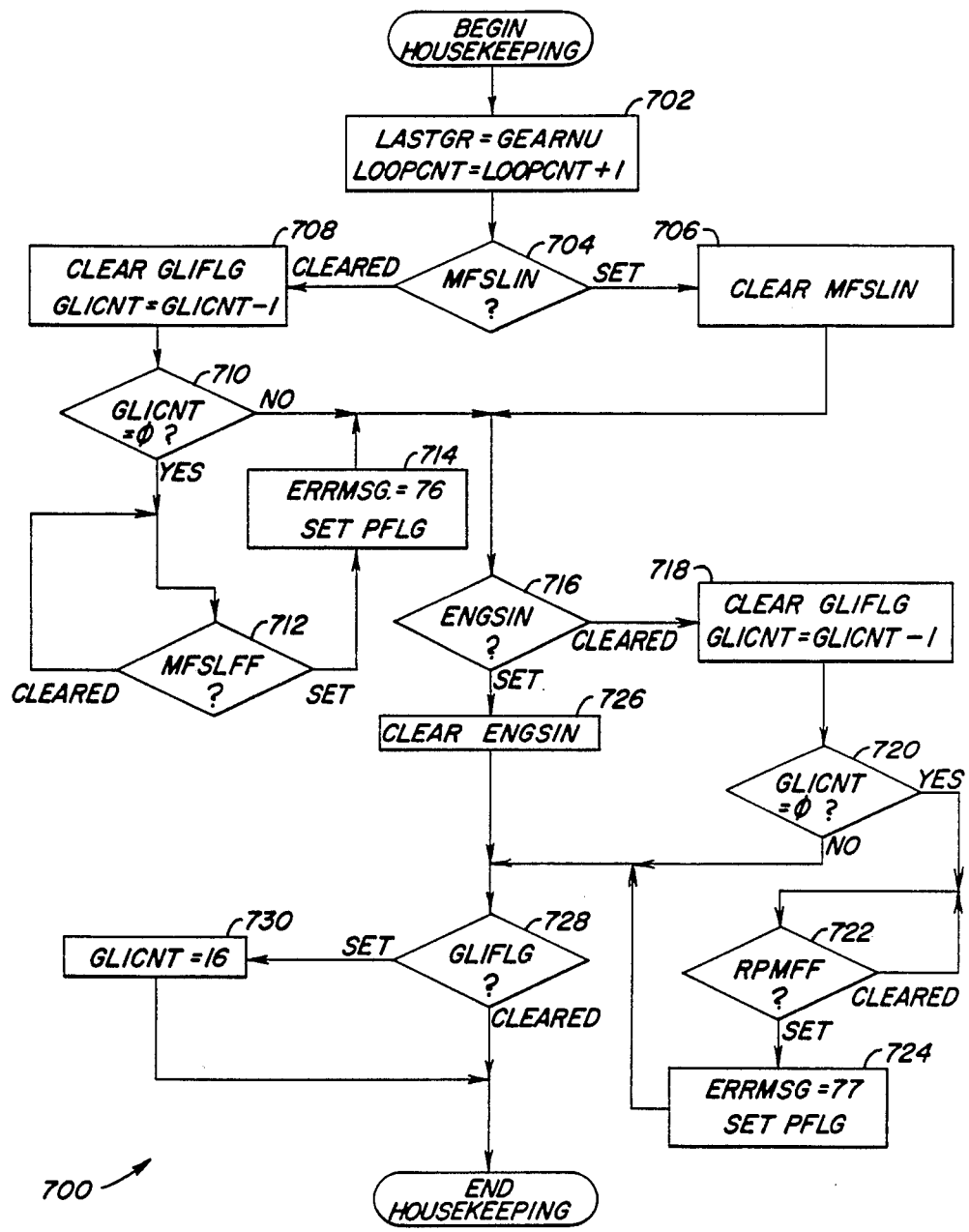
FIG. 13 is a flow chart of the housekeeping section of the main loop.

Referring now to FIG. 13, in the housekeeping section (700), variables related to the main loop are updated and occurrences of the interrupts are tested.

At 702, the variable LASTGR, which contains the gear number of the last loop pass, is updated with the current gear number (GEARNU). The main loop counter (LOOPCNT) is incremented.

At 704, the mass fuel flow speed lever interrupt flag (MFSLIN) is tested. If this flag is set, meaning this interrupt has occurred in the last pass through the main loop, then the flag is cleared at 706. If MFSLIN is cleared (i.e., there was no interrupt), then the data glitch flag (GLIFLG) is set at 708 and if there has been 16 successive errors, then the problem flag (PFLG) and error message 76 are set at 714.

The engine speed interrupt flag (ENGSIN) is tested next at 716. If this flag is set, meaning this interrupt has occurred in the last pass through the main loop, then the flag is cleared at 726. If ENGSIN is cleared (i.e., there was no interrupt), then the data switch flag (GLIFLG) is set at 718 and if there have been 16 successive errors, then the problem flag (PFLG) and error message 77 are set at 724.

Finally, glitch flag (GLIFLG) is tested at 728. If this flag is set, meaning there were no data errors found on the last pass through the main loop, then the switch counter (GLICNT) is set to 16 at 730. This requires that 16 successive errors must occur before an error condition is set. If GLIFLG is cleared, then CLICNT is left alone to continue counting.

LOOP SYNCRONIZATION

Figure 14:
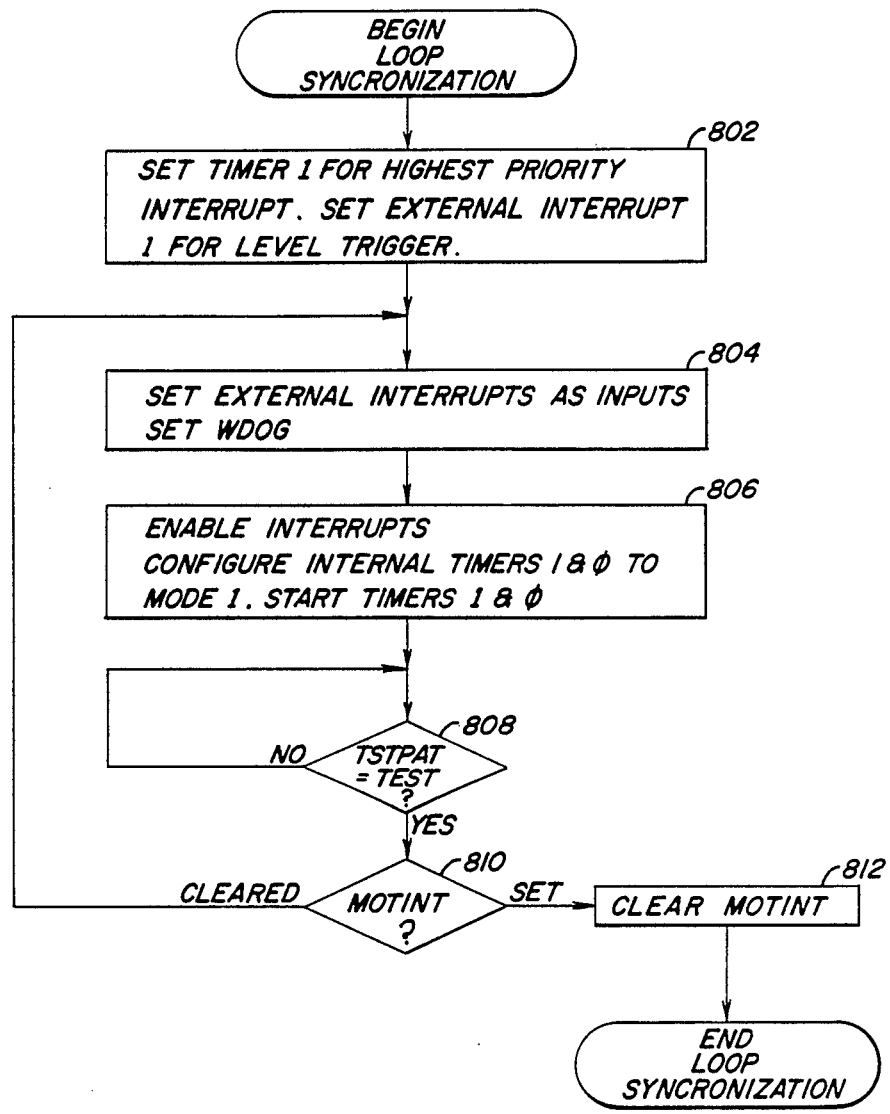
FIG. 14 is a flow chart of the loop synchronization algorithm portion.

Referring now to FIG. 14, this section (800) is the final portion of the main loop and controls the timing of the loop execution.

Internal timer 1 is set as the highest priority interrupt at 802. Extermanl interrupt 1 (data collection interrupt) is set for level triggering.

The timing loop begins by enabling the interrupt input hardware and setting the watchdog timer output (WDOG) at 804. If WDOG is not cycled on each loop pass, the watchdog timer will time out and force a hardware reset.

The interrupts are enabled at 806. Internal timer 1 and 0 are configured to mode 1 (i.e., a 16-bit timer/counter) and both timers are started. The timers and interrupts should normally have already been set up. However, they are reset here in the event that some random error has changed them.

The constant TESTPAT is compared with the variable TEST at 808. TEST is loaded with TESTPAT in the initialization section. If the two are not equal now, then it can be assumed that the program flow has not gone through the initialization section due to some error and the program is forced to loop to itself until the watchdog timer forces a hardware reset.

The motor interrupt flag (MOTINT) is tested at 810. If MOTINT is not set, the logic flow branches back to the top of the timing loop. If MOTINT is set, then this flag is cleared at 812 and the execution of the main loop is started again. MONINT is set on every 4th entry to the internal timer 1 interrupt routine. Since internal timer 1 interrupts every 2.5 msec., the main loop is exected every 10 msec.

SUBROUTINES

FILTER

Referring now to FIG. 15, filter is an implementation of a first order low pass filter. Given that the sample rate is 10 msec. (i.e., the loop timer of the main loop), the time constant is equal to (R2/100) seconds.

The FILTER subroutine averages the local variable "new data" with the local variable "old data" and stores the average back into the "old data". The equation used is:

$$\text{old data} = ((R2 \div \text{old data}) + \text{new data} + \text{remainder})/(2^{**}R7),$$

where variables R2 and R7 are the filter coefficients and must be set up in the calling program. R2 must be one less than 2** R7 for this filter to work. The variable "remainder" is the division remainder from the last call to FILTER with the variable "old data". Note that for each variable "old data" used there is a unique variable "remainder" maintained. The variable "remainder" is required to prevent round-off. errors.

Subroutine DIV16 (not shown) is a well-known general purpose 16 bit by 8 bit division routine that returns an 8 bit result. The equation used is of the form:

$$\text{Acc} = (R2, R1)/(R5, R4)$$

Note the binary point between R5 and R4 is the divisor.

Both the dividend and the divisor are shifted left together until at least one of them has a one in the msb. The shifted 16 bit dividend is then divided by the first 8 bits of the shifted divisor, the last 8 bits being ignored.

An overflow or a division by zero will return a value of 255 with the carry flag set.

LINE

Figure 16:
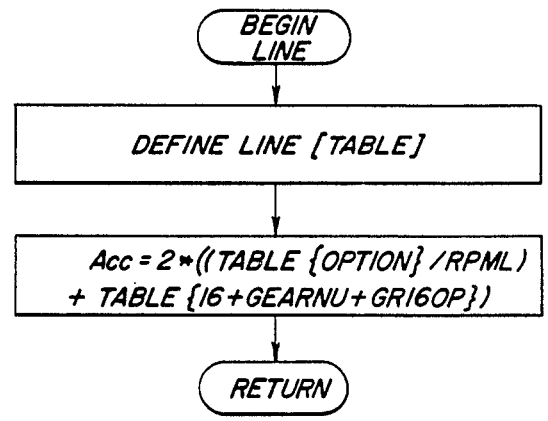
FIG. 16 is a flow chart of a LINE subroutine.

Referring now to FIG. 16, the LINE subroutine returns an 8 bit number (in RACKL format) that is the torque level for a given engine speed and a given line in torque speed space. The sole argument to LINE is the base address for the table containing the line slope and intercept. LINE uses the current gear number, the current engine speed, and the option switches as additional inputs.

The data table takes the following form:

The first 16 bytes are 8 two-byte words containing the slope information in the form of 0.5 * RACKL * RPML (remember that RPML is the reciprocal of engine speed). The slope is scaled by 0.5 so that it will fit into 2 bytes. The 8th entry is undefined. The remainder of the table contains the intercepts and consists of 7 groups of 16 one-byte numbers. Each group corresponds to one of the seven slopes described above. The 16 elements in each group correspond to the transmission gears neutral through 15th. The intercepts are in the form of 0.5÷RACKL where values 0-63 are positive and values 64-255 are 2s complement negative. The intercept is scaled by 0.5 so that it will fit into a single byte.

A call to LINE will result in the subroutine indexing into the table and taking the slope determined by variable OPTION. To this slope it will add the intercept determined by the variables OPTION and GEARNU. This sum is multiplied by 2 and returned to the calling program.

TIMER 0 INTERRUPT

Figure 17:
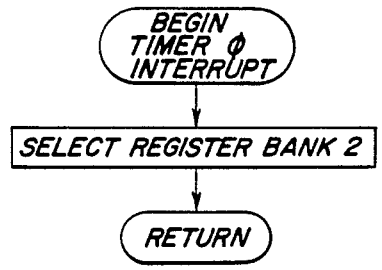
FIG. 17 is a flow chart of a TIMER 0 interrupt routine.

Referring now to FIG. 17, this routine is entered upon the overflow of internal timer counter 0. Timer/counter 0 is reserved for use in timing pulse widths from an optional ground speed radar (not shown). This interrupt is reserved for handling data transmission errors from the radar. At this time, this interrupt routine simply returns to the calling routine.

TIMER 1 INTERRUPT

Referring now to FIGS. 18a-18i, this routine is entered upon the overflow of internal timer/counter 1. Internal timer 1 is configured to interrupt the microprocessor at 2.5 milisecond intervals. Since internal interrupt 1 vectors the microprocessor to the step motor control routine, this provides for 400 step per second operation of the step motor 24. The main control loop is re-entered on every 4th interrupt by timer 1 yielding a 10 milisecond control loop period.

This routine begins at 6004 by reloading internal timer/counter 1 to interrupt in 2.5 msec.

On each 4th entry to this routine, external counter 2 is loaded at 6012 with (THROH, THROL) to update the throttle pulse width to the governor.

Figure 18A:
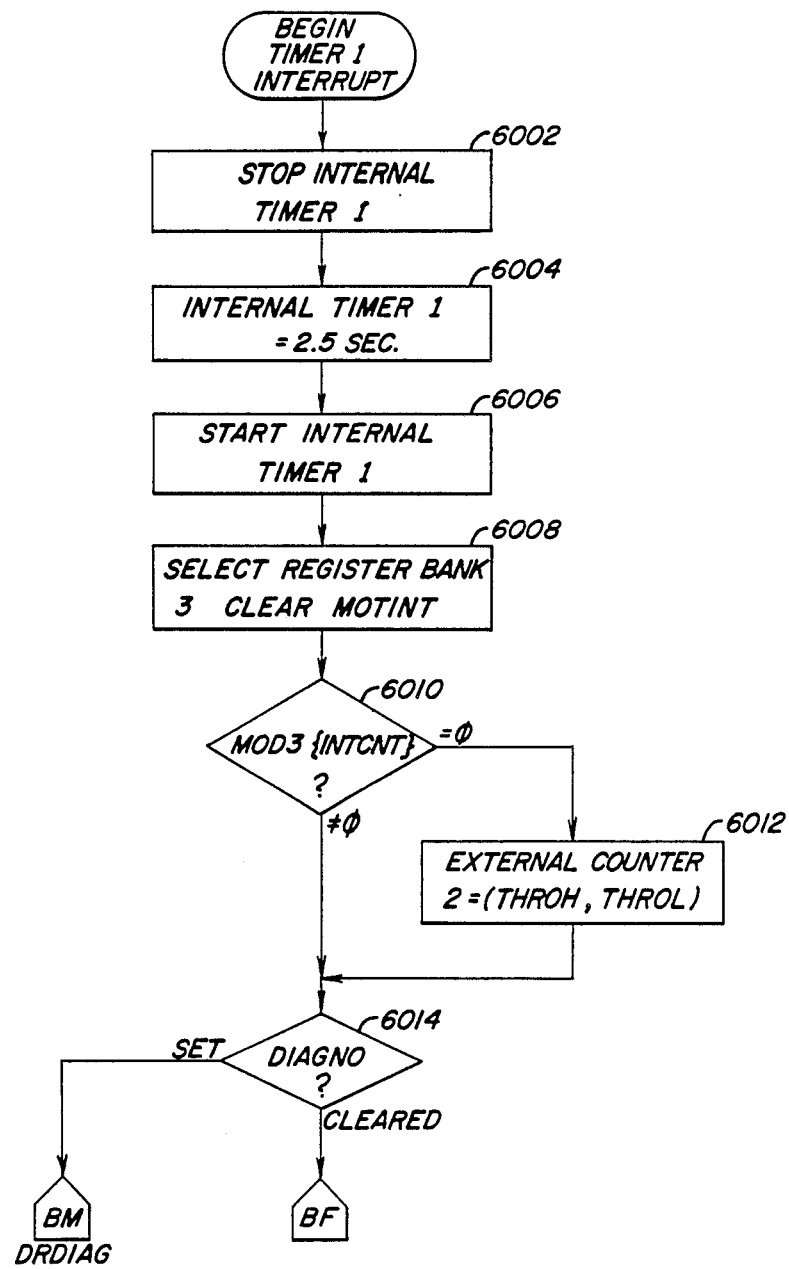
Figure 18B:
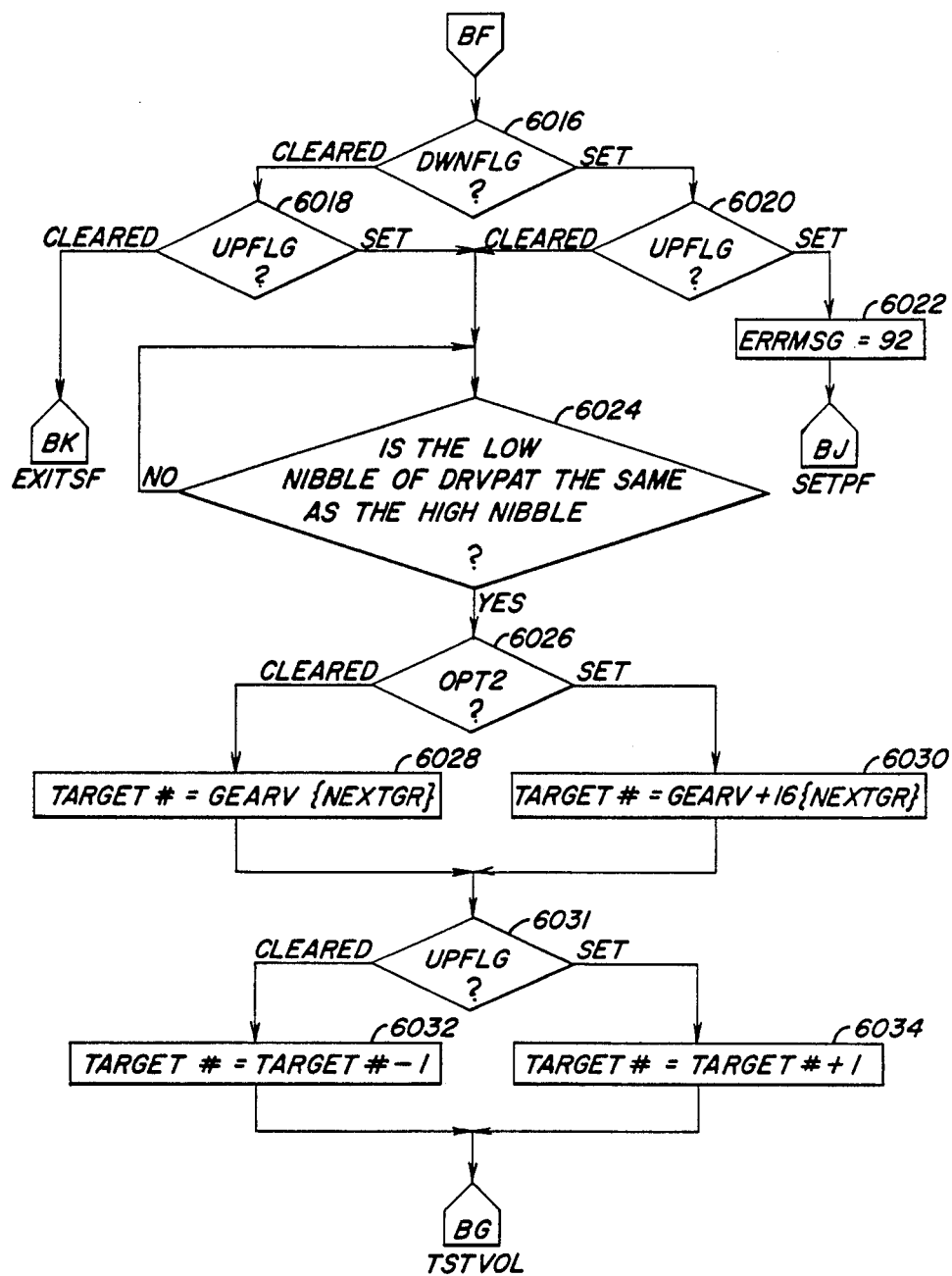
Figure 18C:
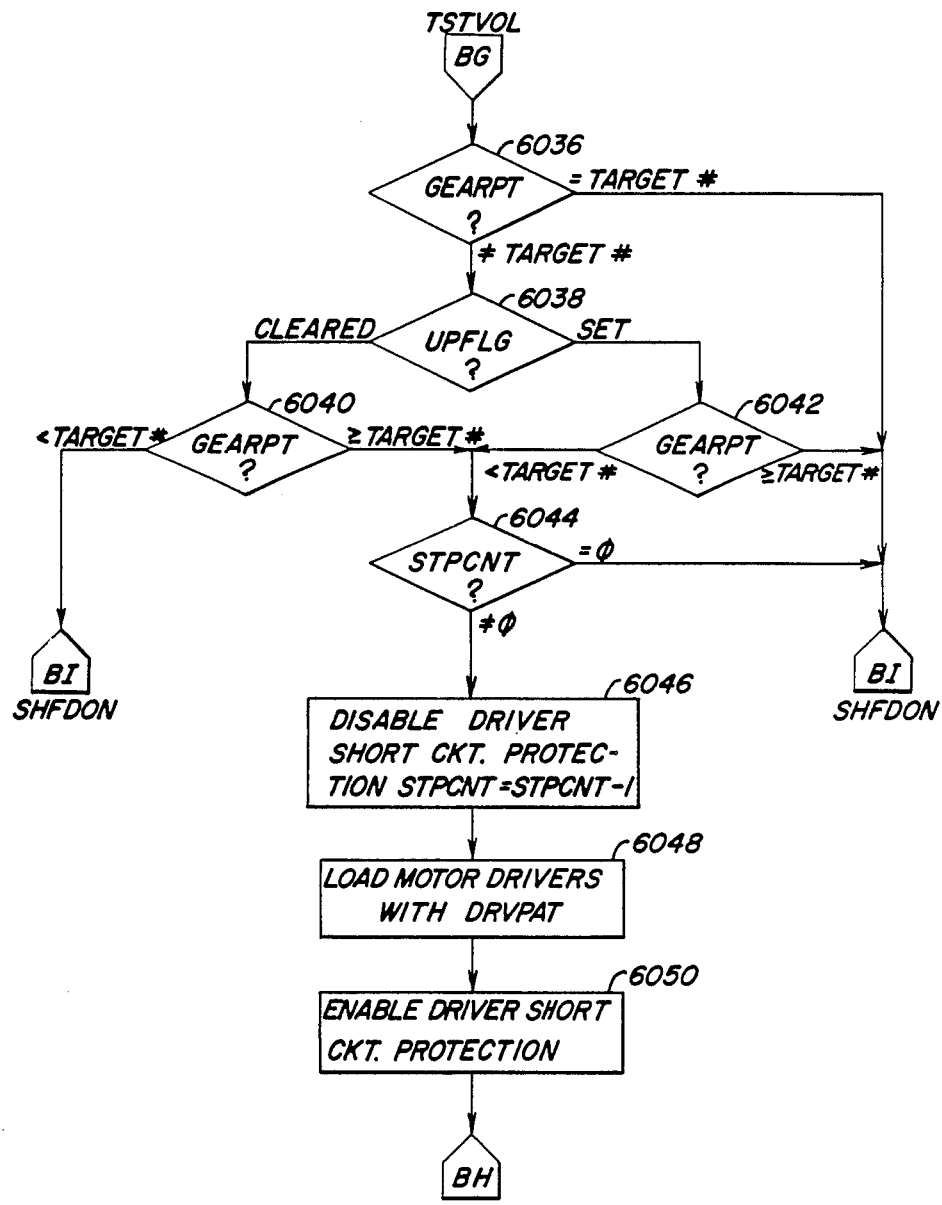
Figure 18D:
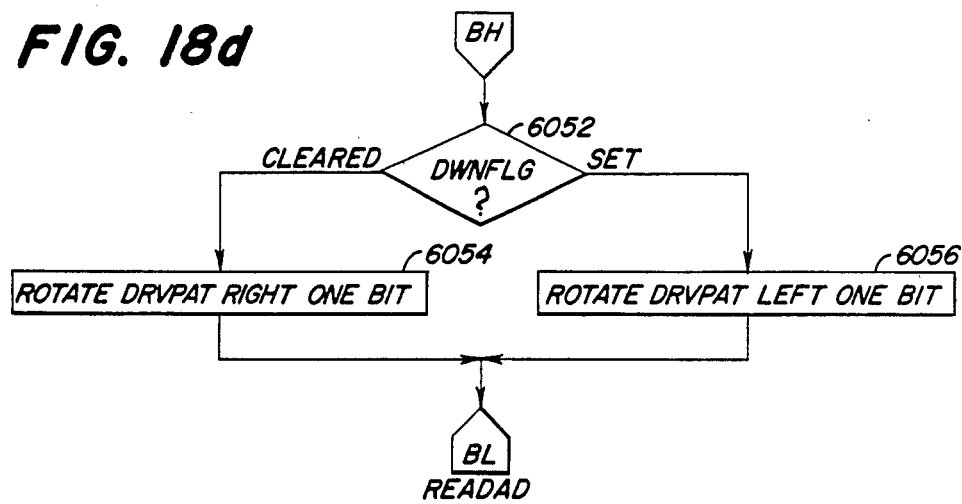
Figure 18F:
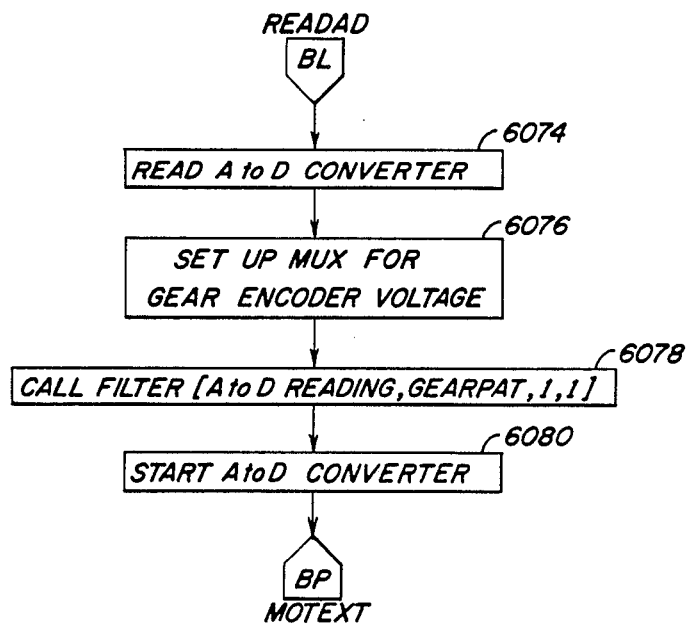
Figure 18E:
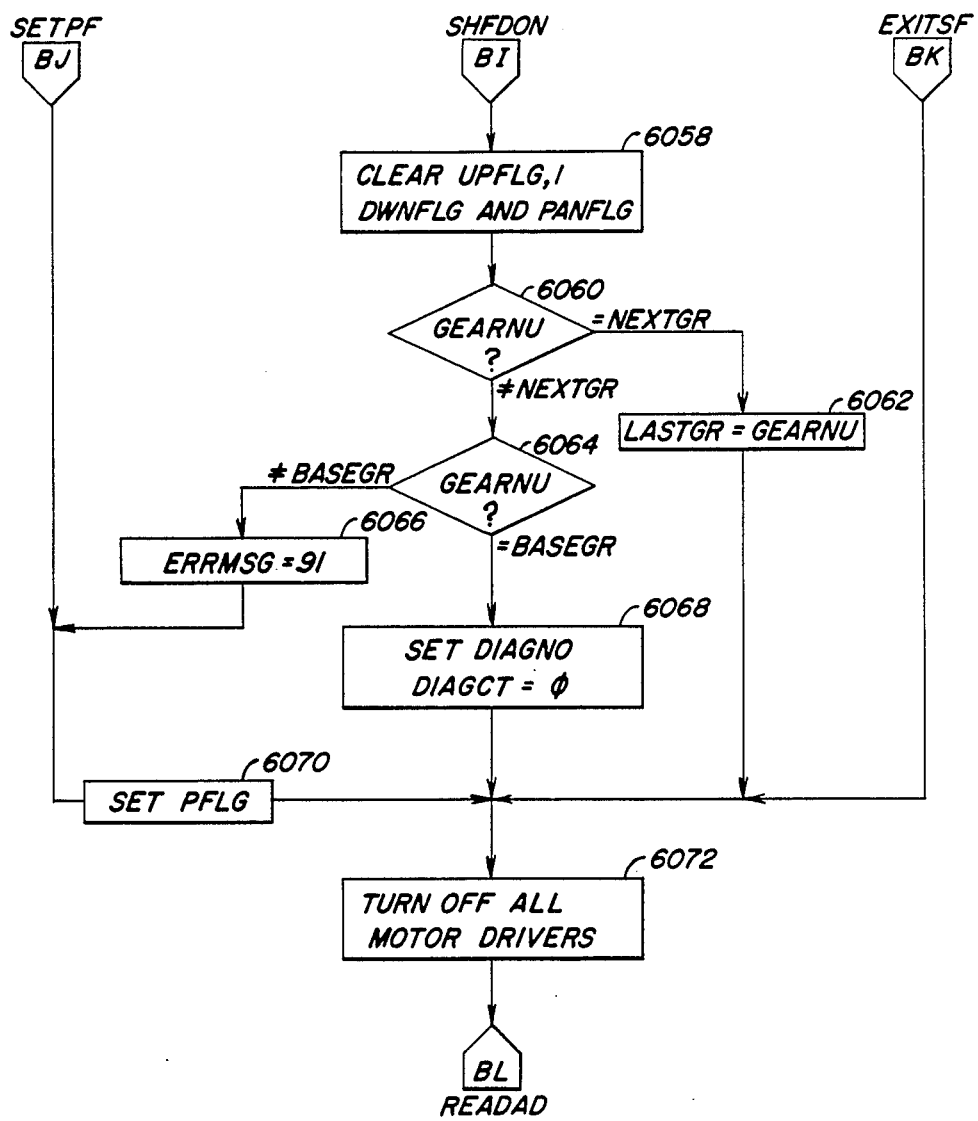
Figure 18G:
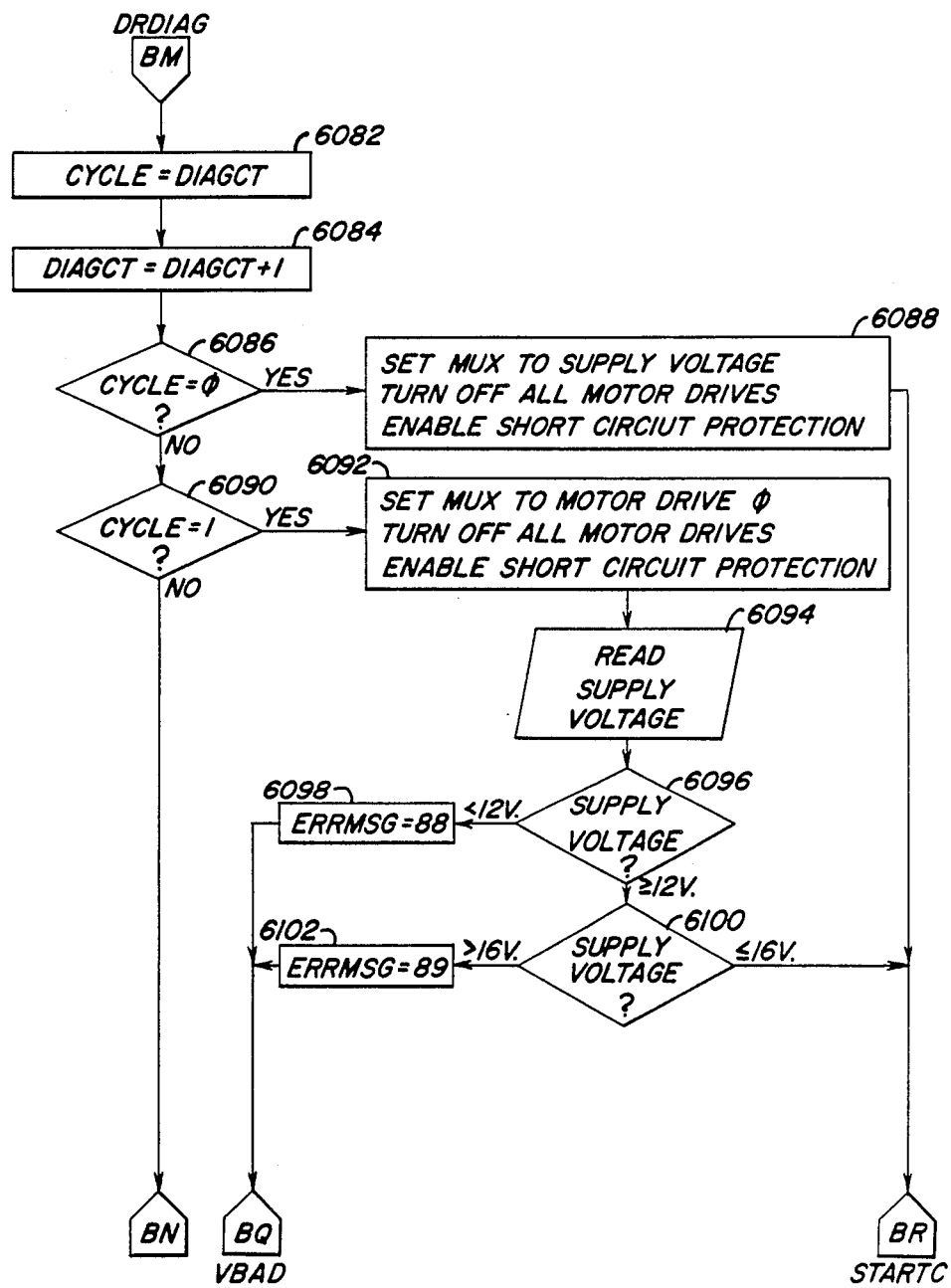

If the diagnostic flag (DIAGNO) is set at 6014, then control is transferred to the step motor diagnostic routine (FIG. 18g-i). In the diagnostic routine, the supply voltage and each of the motor driver collectors on and off voltages are tested to be within range. If a fault is found, then a corresponding error message is set. If no fault is found, then error message 65 is set at 6140, indicating that the fault is not in the motor and possibly the linkage is stuck. From the diagnostic routine, the interrupt counter (INTCNT) is incremented at 6152 and the interrupt routine is exited. Note that one test is made on each pass through the diagnostic routine. Eleven interrupts are required to complete the entire diagnostic routine.

Returning to FIGS. 18a and 18b, if DIAGNO is cleared at 6014, then the shift flags (DWNFLG and UPFLG) are tested at 6016-6020. If neither flag is set, then no motor movement is required so all motor drivers are turned off and control transfers to the A/D routine (FIG. 18e). If both flags are set, then an error has occurred so error message 92 is set at 6022, all motor drivers are turned off, and control passes to the A/D routine (FIG. 18e). If only one of two flags is set, then movement of the motor 24 (FIG. 18e) is required and the motor drive pattern is tested.

If, at 6024, the lower nibble of the drive pattern is not equal to the upper nibble, then an error has occurred and the program branches to itself until the watchdog timer forces a hardware reset.

If both nibbles are equal, then the target gear encoder pot number (target #) is loaded at 6028 or 6030 from the table GEARV with the indices OPT2 and NEXTGR.

Target # is incremented by one at 6034 if an upshift is required (UPFLG set) or is decremented by 1 at 6032 if a downshift is required (DWNFLG set). This provides a small amount of hysteresis to overcome the backlash in the gear encoder pot mounting.

Referring now to FIG. 18c, if the last gear encoder pot reading (GEARPT) equals target# at 6036, then the shift is completed and control transfers to "shift done" routine (Fig. 18e). If UPFLG is set and GEARPT is greater than target# (6038, 6042), then the motor 24 has passed the target and control transfers to the "shift done" routine. If UPNFLG is cleared and GEARPT is less than target# the motor 24 has passed the target and control transfers to the "shift done" routine via 6038 and 6040. Otherwise, the motor 24 has not yet reached the target and the motor step counter (STPCNT) is tested at 6044. If STPCNT=0, then the maximum number of steps have been made trying to reach the target, so control is transferred to the "shift done" routine. If STPCNT is not zero, then motor 24 is moved one step by loading the drivers with DRVPAT at 6048. DRVPAT is then rotated either right or left, depending on which shift flag is set, and control is passed to the A/D routine.

Turning now to FIG. 18e, the "shift done" routine signals the main loop that the shift is completed by clearing UPFLG, DWNFLG, and PANFLG at 6058. If the current gear is equal to the target gear (GEARNU=NEXTGR) at 6060, then LASTGR is set equal to GEARNU, all the motor drives are turned off, and control transfers to the A/D routine. If the current gear is equal to the gear the system is shifting from (GEARNU=BASEBR), then something is preventing the shift, so the diagnostic flag (DIAGNO) is set at 6068, all the drives are turned off at 6072 and control is transferred to the A/D routine. If GEARNU is equal to other than NEXTGR or BASEGR, then something other than the system has changed the gears, so error message 91 is set at 6066, all the motor drives are turned off, and control transfers to the A/D routine.

Referring now to FIG. 18f, the A/D routine at 6074 reads the analog-to-digital converter (U26 of FIG. 2d) for the raw number of gear encoder pot 26. The raw gear encoder pot number is averaged into GEARPT using subroutine FILTER at 6078. The A/D converter is restarted at 6080, the interrupt counter (INTCNT) is incremented (6152 of FIG. 18i), and the interrupt routine is exited. Note that the A/D converter is in this interrupt routine such that its operation is syncronized with the motor drives so that driver noise can be reduced.

EXTERNAL INTERRUPT

Referring now to FIGS. 19a-19e, this interrupt is entered at the end of every pulse on the mass fuel speed lever line or at the end of every engine speed pulse. This interrupt is also entered upon overflows from external counter 0 (engine speed) and external counter 1 (mass fuel/speed lever).

This routine operates by polling the mass fuel/speed lever and engine speed pulse interrupt sources and servicing them as required. If, after that, an interrupt is still pending, it is assumed that the overflow of either external counter 0 or external counter 1 has caused the interrupt. Each of the external counters are cleared and the interrupt line is tested in turn to determine which counter has forced the interrupt. Note that if several interrupts are pending, this routine will not terminate until they all have been serviced.

As this interrupt routine must respond to four different interrupt sources, all possibly occuring at the same time, it is required to keep track of how many interrupts have been serviced. A local variable "loop counter" is created to provide this function. "Loop counter" keeps track of how any cycles have been made through the interrupt routine. After four cycles (i.e., all 4 interrupts have been serviced), "loop counter" will trigger an error message if a fifth cycle is attempted.

This interrupt routine begins at 7002 by setting local variable "loop counter" equal to 5.

The top of the cycle begins by decrementing "loop counter" at 7004 and testing it for zero at 7006. If "loop counter" is zero, then this is the fifth cycle so error message 71 is set at 7008, external interrupt 1 is disabled at 7010, and the interrupt routine is exited. Note that the interrupt must be disabled to prevent re-entry to the interrupt routine which would keep the main loop from sending an error message to a diagnostic display (not shown).

If "loop counter" is not zero, then the count in internal timer/counter 1 is tested at 7012. If less than 96 microseconds remains in timer/counter 1, this routine waits until that is no longer the case. The reason for this is that the timer 1 interrupt routine contains a write command to external counter 2 to update the throttle output to the governor 32. As internal timer/counter 1 has the highest interrupt priority and may interrupt this routine, internal time/counter 1 must be checked to see if there is sufficient time (approx. 96 microseconds) for this routine to service one of the pending interrupts by reading external counter 0 or 1 before internal timer/counter 1 interrupts. If this is not done, the internal timer 1 interrupt routine may place a command to the external counters between the MSB and LSB read commands issued by this routine and confuse all three of the external counters.

If more than 96 microseconds remains in timer/counter 1, then the external interrupt 1 line is polled at 7014. If no interrupts are pending, the interrupt routine is exited. If an interrupt is pending, then the mass fuel/speed lever flip flop (MFSLFF) is polled at 7016.

Figure 19A:
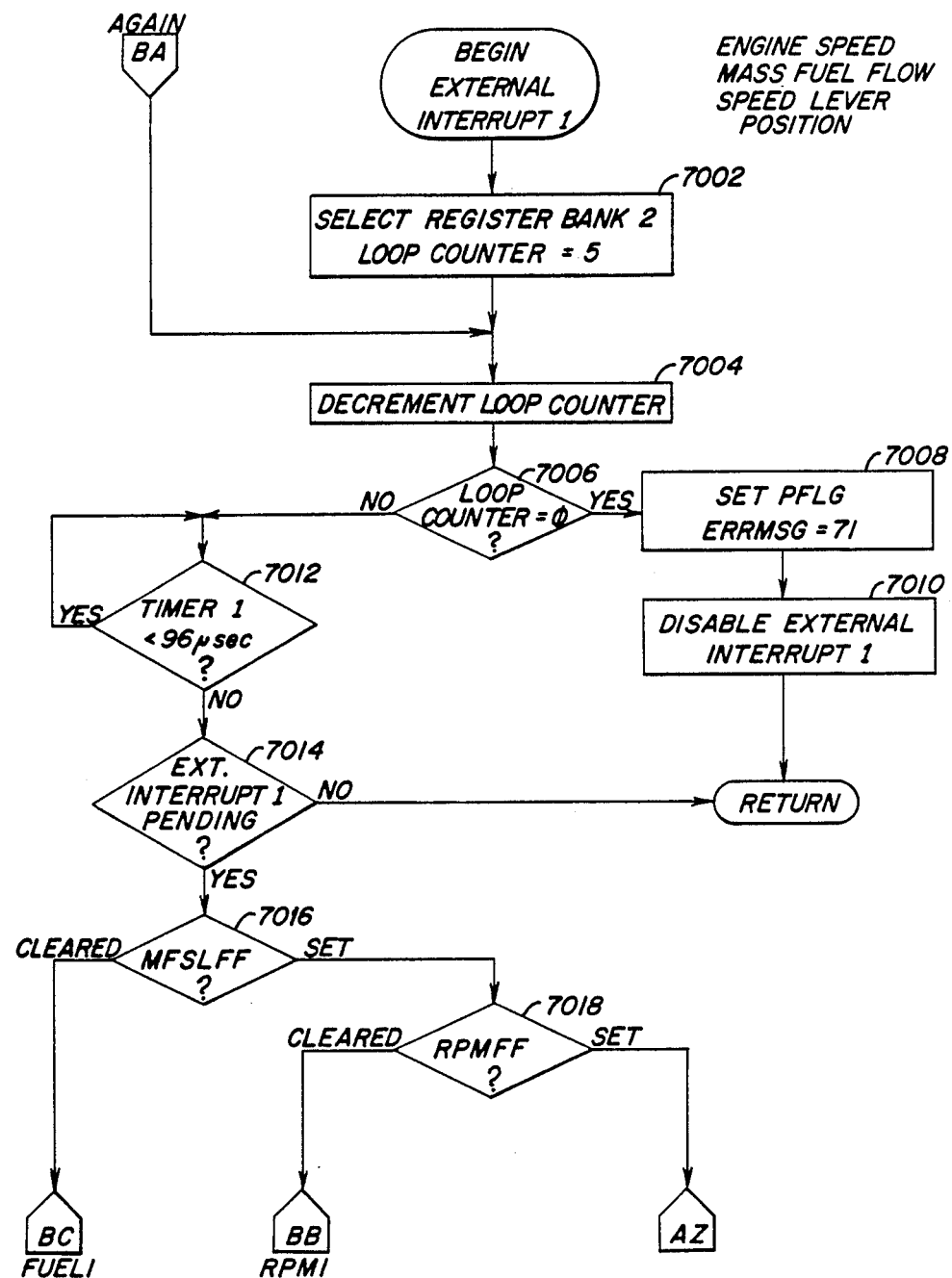
FIGS. 19a-19c form a flow chart of an external interrupt 1 routine.
Figure 19B:
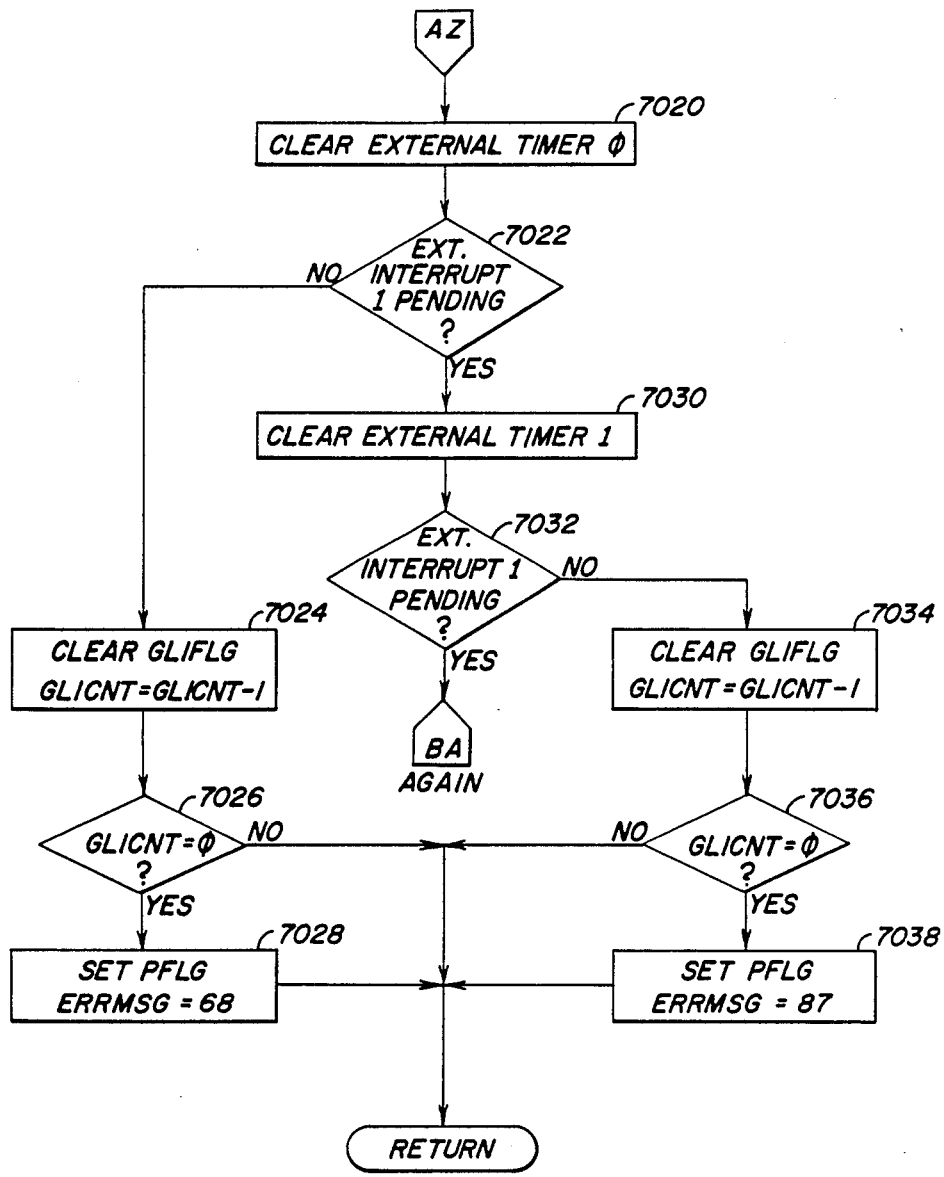
Figure 19C:
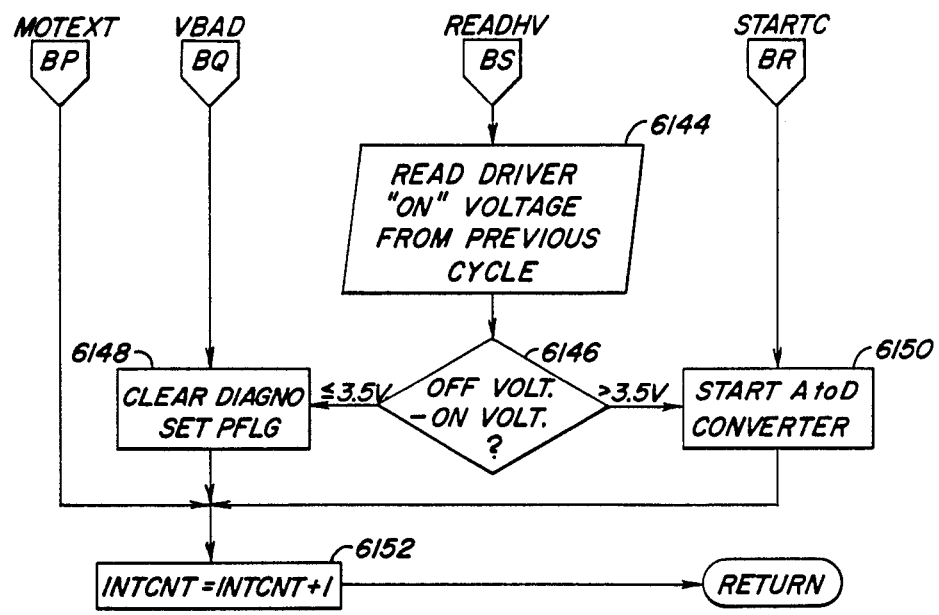
Figure 19C:
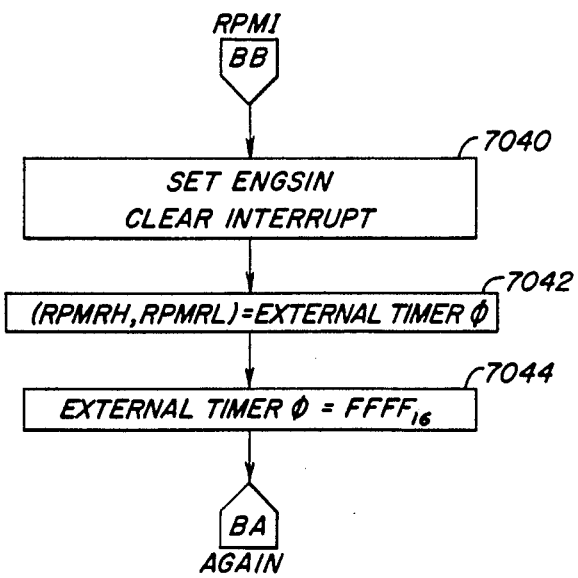
Figure 19D:
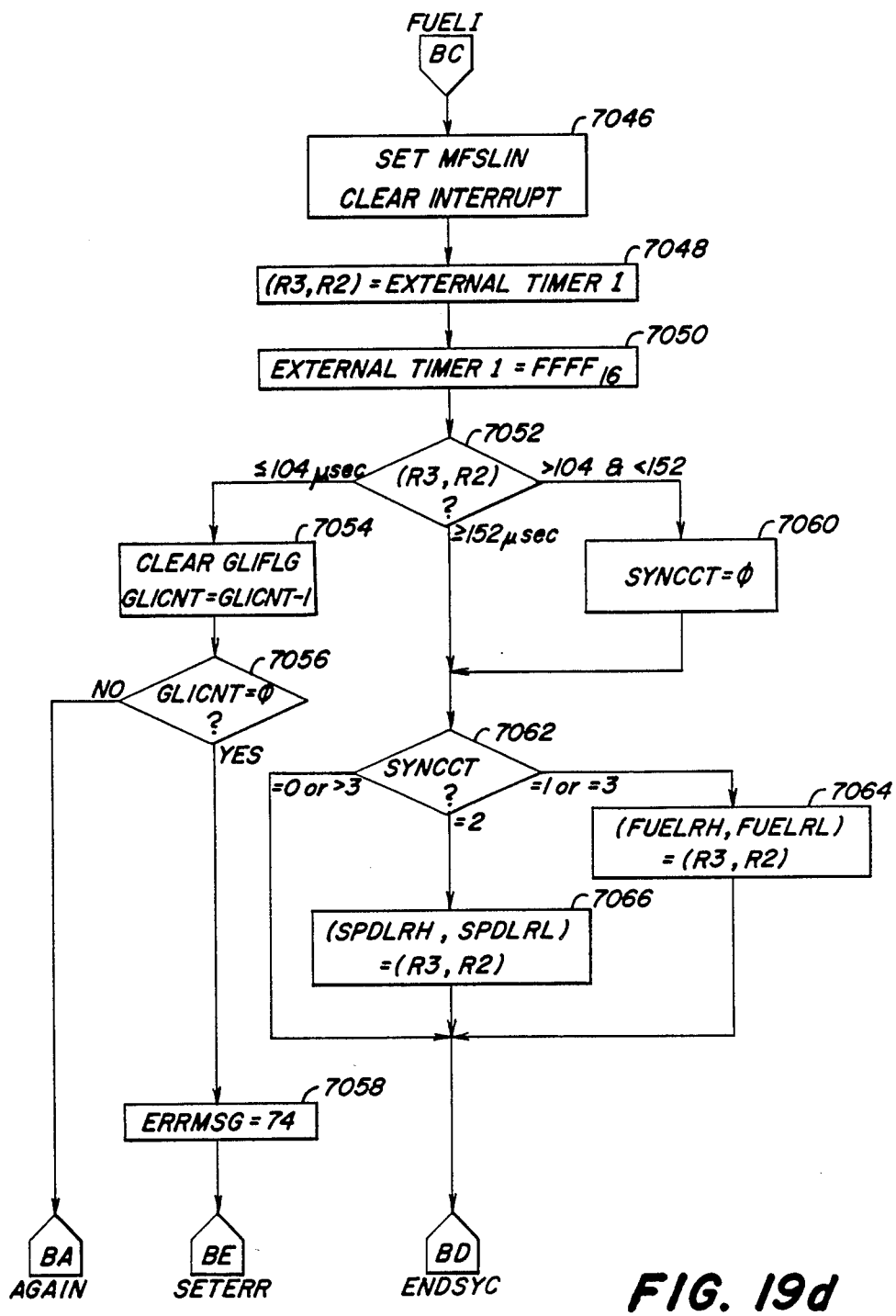
Figure 19E:
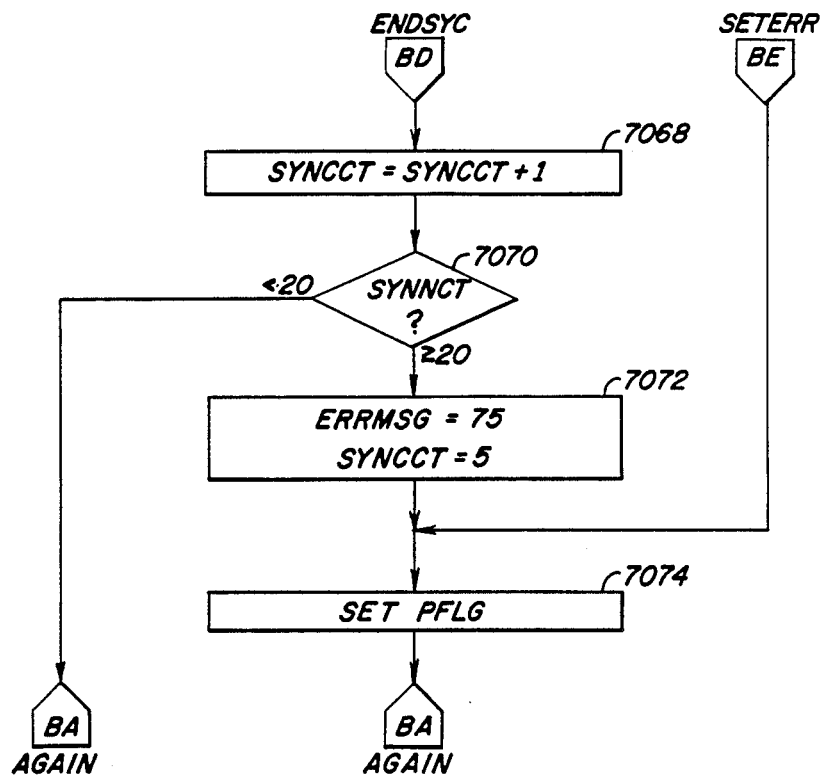

If the mass fuel/speed lever is the interrupt source (MFSLFF cleared), then control is transferred to the "mass fuel/speed lever" routine at 7018 (FIG. 19d). If MFSLFF is set, then the engine speed flip flop (RPMFF) is polled. If the engine speed pulse is the interrupt source (RPMFF cleared), then control is transferred to the "engine speed" routine (FIG. 19c). If RPMFF is set, then one of the external counter overflows could be the interrupt souuce.

At 7020, external timer 0 is cleared first, and then external interrupt 1 is tested at 7022. If this has cleared the interrupt, then the overflow of external timer 0 is the interrupt source, so error message 68 is set at 7028 upon decrementing at 7024 the glitch counter (GLICNT) to zero and the interrupt routine is exited.

If the clearing of external timer 0 has not cleared the interrupt, then external timer 1 is cleared at 7030. If this has cleared external interrupt 1, then the overflow of external timer 1 is the interrupt source so error message 87 is set at 7038 upon decrementing the glitch counter (GLICNT) to zero at 7034–7036 and the interrupt routine is exited.

If clearing both counters fails to clear external interrupt 1, control passes to the beginning of the cycle in the interrupt routine where "loop counter" is decremented and tested.

Referring now to FIG. 19c, the engine speed routine begins at 7040 by setting the engine speed interrupt activity flag (ENGSIN). This flag is tested in the main loop to see if the engine speed signal is present on each loop pass. The engine speed flip flop is cleared to ready the hardware to receive the next engine speed pulse.

External counter 0 is read at 7042 for the raw engine speed data which is stored as (RPMRH, RPMRL).

External counter 0 is reloaded at 7044 with FFFF base 16 to ready it for the next data pulse. (Recall that the external counters are down counters.)

Control passes to the beginning of the cycle in the interrupt routine where "loop counter" is decremented and tested.

Referring now to FIG. 19d, the mass fuel/speed lever routine begins at 7046 by setting the mass fuel/speed lever activity flag (MFSLIN). This flag is tested in the main loop to see if the mass fuel/speed lever flip flop is cleared to ready the hardware to receive the next mass fuel/speed lever pulse.

External counter 1 is read at 7048 for the raw counts which are stored as (R3,R2) until it is determined what the data is.

External counter 1 is reloaded at 7050 with FFFF base 16 to ready it for the next data pulse. (Recall that the external counters are down counters).

If, at 7052, (R3,R2) contains a count of less than 105 microseconds, the data is out of range so error message 74 is set at 7058 upon decrementing the glitch counter to zero (7054–7056), and control passes to the beginning of the interrupt cycle.

If, at 7052, (R3,R2) contains a count between 105 and 152 microseconds, the data is a sync pulse so the sync cycle counter (SYNCCT) is set at 7060 to zero, and control passes to the sync cycle counter test.

If SYNCCT is 0 or greater than 3, the data is a sync pulse or the system is still waiting for a sync pulse so control passes to the increment SYNCCT step.

If SYNCCT is 1 or 3, then, at 7064, the data in (R3,R2) is assumed to be mass fuel flow data and is stored as (FUELRH, FUELRL). Control passes to the increment SYNCCT step.

If SYNCCT is 2, then the data in (R3,R2) is taken as speed lever position and is stored as (SPDLRH, SDDLRL). Control passes to the increment SYNCCT step.

In the increment SYNCCT step (7068), SYNCCT is incremented to count the sync cycle.

If, at 7070, SYNCCT is greater than 20, then it has been too long since the last sync pulse was received. Error message 75 is set at 7072, SYNCCT is set equal to 5 to begin searching for the next sync pulse, and control passes to the beginning of the interrupt cycle.

If SYNCCT is less than 20, control passes to the beginning of the cycle in the interrupt routine where "loop counter" is decremented and tested.

-Variable Glossary-

A

ACC—Accumulator register. A general purpose register.

AFLAG—Auto indicator flag. Indicates the internal state of the shift logic algorithm. Set when auto, reset when manual or controller commanded manual.

AUTOSW—Auto switch flag. Indicates the state of the auto manual switch. Set when auto, reset when manual.

B

B—General purpose register.

BASEGR—Base gear number. Contains the value of GEARNU at the time the shift was initiated (i.e., the gear that is being shifted from).

C

CLUTCH—Clutch flag. Set when clutch pedal pressed. Cleared when clutch pedal released. When set, this flag forces the system to controller commanded manual.

CLUCNT—Clutch switch debouncing counter.

D

DIAGCT—Diagnostic cycle counter. Cleared when DIAGNO is first set. Incremented upon each entry into the motor diagnostic routine.

DIAGNO—Diagnostic flag. Set when the step motor fails to complete a gear change. Reset at completion of motor diagnostic routine. When set, this flag enables the step motor diagnostic routine to look for problems in the drivers, step motor, and wiring harness.

DISBUF—Display buffer. This buffer contains the messages to be output to the TED display.

DISPFL—Display flag. This flag is cleared when no problem mode is present. When a problem mode is present, this flag toggles for each message sent to a diagnostic display, thus allowing the message to alternate between the error code and the gear number.

DRVPAT—Motor driver pattern. Initialized to 33H by automatic mode logic at the start of each gear shift. Rotated right or left with each motor step. This determines which phases of the step motor are to be on or off. Only the 4 lsb are significant. A bit set indicates a motor phase to be turned on.

DRPROT—Motor drive protection flag. Set to allow commands to be sent to drivers. Clear to enable driver short circuit protection.

DWNFLG—Downshift flag. Set by automatic mode logic when downshift conditions are met. Cleared by completion of shift, problem mode entry, or manual mode entry. When set, this flag enables the step motor control logic to downshift the transmission.

DWNSPD—Downshift speed period. This number is proportional to the reciprocal of the engine speed (i.e., RPML format) that when the engine falls below, will cause downshifting.

DWNSTQ—Downshift torque (in RACKL units) as calculated from the subroutine LINE. The auto mode logic will downshift the transmission when the engine torque exceeds this level for a specified period of time.

DWNTIM—Downshift timer. Cleared in manual mode, at initiation of a shift, and when shift conditions are not met. Incremented on every 2nd pass of control loop when downshift conditions are met.

DWNTQR—Downshift torque array. This array is used as the argument for the LINE subroutine computing the downshift torque (DWNSTQ). The first 8 elements of the array contain the slope (in 0.5* RACKL*RPML units) of the downshift line for each vehicle model. The remaining 7 groups of 16 elements contain the torque intercept (in 0.5* RACKL units) of the downshift line for each transmission gear for each vehicle model.

E

ETPDST—Engine torque proportional downshift timer.

ENGSIN—Engine speed interrupt flag. Set on each occurrence of engine speed data interrupt. Cleared at end of control loop. This flag is used to determine if the engine speed interrupt has been active in the last control loop pass.

ENTSPD—Entry throttle command. This number is equal to (THROH,THROL)/16. This is the initial throttle command used when ramping the engine from the previous commanded engine speed to the new automatic commanded engine speed whenever the SMOOTH flag is set. ENTSPD is updated in the throttle control logic whenever the SMOOTH flag is cleared. ENTSPD is also used by the variable gain throttle routine as an indication of engine speed.

ERRMSG—Error message. This word contains the error message code to be sent to a diagnostic display.

ESMDST—Engine speed mode downshift torque array. This array contains the torque level (in RACKL units) that will cause the transmission to be downshifted if exceeded for a specific period of time.

ESMUST—Engine speed mode upshift torque array. This array is used as the argument for the LINE subroutine in computing the engine speed mode upshift torque. The first 8 elements of the array contain the slope (in 0.5*RACKL*RPML units) of the upshift line for each vehicle model. The remaining 7 groups of 16 elements contain the torque intercept (in 0.5* RACKL units) of the upshift line for each transmission gear for each vehicle model.

ESPDST—Engine speed proportional downshift timer.

F

FILTER—Data filter subroutine. This subroutine implements a first order low pass filter in the form of:

old data=((k * old data)+new data)/(k+1)), where k is the filter time constant.

FLAG—System status flag word containing DWNFLG, UPFLG, HITQR, FSTFLG, PRUFLG, PANFLG, RPDFLG and RPUFLG.

FLAG2—System status flag word containing AFLAG, VGTFLG, SMOOTH, MOTINT, PFLG, MFSLIN, ENGSIN and DIAGNO.

FLAG3—System status flag word containing MTHRFL, DISPFL, GLIFLG, IDFLAG, and CLUTCH.

FSTFLG—First rapid upshift shift started flag. Cleared when TQRTIM times out, when the clutch pedal is pressed, or when in manual mode. Set when both RPUFLG and UPFLG are set in the throttle output calculation routine. This flag is used to delay the holding of the engine speed command during a rapid upshift sequence until after the first upshift in the sequence has started.

FUELRH—Mass fuel flow/speed lever raw counts high order byte.

FUELRL—Mass fuel flow/speed lever raw counts low order byte.

G

GEARNU—Gear number. Binary gear number determined from the gear encoder pot.

GEARPT—Gear encoder pot value. Raw number as read from the A/D converter.

GLICNT—Data glitch counter. Decremented each time GLIFLG is reset. Reloaded with 16 each time a pass is made through the control loop without a reset of GLIFLG. When a count of zero is reached, a problem mode corresponding to the last data glitch is set.

GLIFLG—Data glitch flag. Set at the start of every control loop pass. Reset when data out of range is encountered in the last control loop pass (See GLICNT).

GR160P—This variable contains the number GEARNU+(16* OPTION) and is used to point into data tables. This variable is updated at the end of the DATA COLLECTION AND CONDITIONING section.

GRCNT—Switch number match counter. Decremented when MAXGR matches GRTEMP. Set equal to 2 when MAXGR does not match GRTEMP. Used in debouncing the input switches.

GRTEMP—Temporary switch input memory. This is the value of MAXGR on the last pass through the control loop. Used in debouncing the input switches.

H

HITQR—High engine torque flag. This flag is used in the throttle control section to determine if the throttle command should be held during rapid upshift, cleared otherwise.

HRDNHI—Engine speed hold value for rapid downshift at high torque. This number is in (THROH,-THROL) format.

HRDNLO—Engine speed hold value for rapid downshift at low torque. This number is in (THROH,-THROL) format.

HRENHI—Engine speed hold value for rapid upshift in gears 12-15. This number is in (THROH,THROL) format.

HRUPLO—Engine speed hold value for rapid upshift in gears 1-11. This number is in (THROH,THROL) format.

I

IDFLAG—Tractor indentification flag. Set during system initialization and upon first entry into automatic from manual. Cleared when identification code transmitted to a diagnostic display. Used to control when the vehicle model identification number is sent to the diagnostic display.

INLKCT—Neutral interlock error counter. Initialized to 255 when the transmission is not in neutral and the neutral interlock switch is closed. Decremented on each control loop pass when (a) the transmission is in neutral and the interlock is closed or (b) the transmission is not in neutral and the interlock is open. This is used to debounce the neutral interlock switch.

INTCNT—Interrupt counter for internal timer 1. Incremented upon each exit from interrupt service routine.

L

LASTGR—Last gear number. Contains the value of GEARNU from the last pass of the control loop. Used to determine if operator has moved the shift lever. This variation is written in the control loop housekeeping routine.

LEVDLY—Delayed speed lever position. This is a low pass filtered version of LEVL.

LEVL—Speed lever position. This number is the relative position of the speed lever.

| Speed Lever Position | LEVL |
|---|---|
| Minimum | 16 |
| Maximum | 175 |

LINE—Torque-speed space line calculation subroutine. This subroutine returns an engine torque (in RACKL units) for a given slope, intercept, and engine speed period.

LOOPCT—Control loop counter. Incremented at the end of each pass through the control loop.

M

M1,M2,M3 These are constants used in the computation of RPMCOM and are a function of vehicle model.

| Vehicle | M1 | M2 | M3 |
|---|---|---|---|
| 4850 | 464 | 1856 | 3712 |

MAXDWN—Maximum engine speed period for downshift. This number is proportional to the reciprocal of the engine speed (i.e., RPML format) which the engine must be below for downshifting.

MAXGR—Maximum gear. Binary number representing the maximum allowable gear for automatic operation as read from the top gear limit control.

MAXRDN—Maximum engine speed period for rapid downshift. This number is proportional to the reciprocal of the engine speed (i.e., RPML format) which the engine must be below for rapid downshifting.

MFSLIN—Mass fuel flow/speed lever interrupt flag. Set upon each occurrence of the interrupt. Cleared at end of control loop. This flag is used to test if the mass fuel flow/speed lever was active in the last main control loop pass.

MFSLFF—Mass fuel flow/speed lever flip flop input. Active low. This flag is used to determine if a mass fuelflow/speed lever interrupt is pending.

MINRUP—Minimum engine speed period for rapid upshift. This number is proportional to the reciprocal of the engine speed (i.e., RPML format) which engine must be above for rapid upshifting.

MODESW—Mode switch. This flag represents the state of the mode switch 42.

MODn(x)—Modulo n operator.

MOTINT—Motor interrupt flag. Set upon every 4th entry to motor service interrupt (internal timer 1 interrupt) Cleared at end of countrol loop. This flag is used to test if the motor interrupt has been active in the last pass of the main control loop.

MTHRFL—Manual throttle flag. Set in the variable gain throttle logic when reverse or neutral is entered or a problem mode is set. Cleared in manual mode logic. When set, the flag causes the APT controller to echo the speed lever position (via the variable gain throttle routine) to the electronic governor in place of the engine speed command from automatic throttle logic.

N

N4—This is a constant used in the computation of (THROH,THROL). It is a function of the vehicle model and is set at 1038 for a 4850 tractor.

NEUTSW—Neutral interlock switch. Set when interlock closed. Cleared when interlock open.

NEXTGR—Next gear. This is set to the target gear number at the initiation of each shift (i.e., the gear being shifted to).

NLSPDL—Non-linear speed lever position. This is a non-linear version of LEVL. The lower section of speed lever is expanded by a factor of 2 for improved resolution, the upper section is contracted by a factor of 2. NLSPDL is used for the computation for engine throttle output, but LEVL is used for speed lever movement sensing in conjunction with the triggering of rapid up/down shifting.

NLSPDL=(LEVL/2)+8 for LEVL≦122

NLSPDL=2*(LEVL−87)

for LEVL>122

O

OPTION—Option switch word. This word is set to the state of the option switches and may be used to identify vehicle model type. OPTION is used in data table indexing. This word cotains the individual bits OPT0, OPT1, and OPT2. For tractor model 4850, OPT-0-OPT2 are all equal to zero.

OPT0—The first bit of the option switch word. See OPTION.

OPT1—The second bit of the option switch word. See OPTION.

OPT2—The third bit of the option switch word. When cleared, can indicate a row-crop tractor is selected. When set, can indicated a 4-wheel drive tractor is selected. See OPTION.

P

PANFLG—Panic downshift flag. Set by automatic mode logic when the engine is about to stall. Reset upon completion of shift, first entry to automatic mode logic, and entry to manual mode logic. When set, this flag enables very quick downshifting by by-passing the downshift timer.

PDSTQR—Panic downshift torque. This is the engine torque (in RACKL units) that must be exceeded for the panic downshift mode.

PFLG—Problem mode flag. Set when problem mode is present in automatic mode. Reset in manual mode and at entry to automatic. When set, this flag disables shifting of the transmission, and causes an error message sent to a diagnostic display.

PNSPD—Panic downshift speed period. This is proportional to the reciprocal of the engine speed (i.e., RPML format) that the engine must fall below for panic downshift.

PRPUFLG—Pseudo rapid upshift flag. Cleared upon entry to rapid upshift torque timer. When a rapid upshift is in progress and the rapid upshift torque timer is timing an excursion above the rapid upshift torque, PRPUFLG is reset and the shift logic is re-entered. This allows the normal shift tests (i.e., engine speed is used rather than the engine speed command) to be made while the rapid upshift torque timer is timing.

R0, R1, R3, R4, R5, R6, R7—General Purpose registers.

RACKL—This is a number proportional to mass fuel flow and is used as a measure of engine torque. RACKL is not an absolute measurement, but rather it is a percentage of rated fuel delivery and is a relative indication of engine torque.

| Mass Fuel Flow | RACKL |
| --- | --- |
| 0 | 0 |
| Rated | 160 |
| 159% of Rated | 255 |

RATIO—Gear ratio. This number is N times the gear number. For a 4850 tractor, N is given as 0.399853 for gear numbers 1–4, 1.59943 for gear numbers 5–9, and 3.198866 for gear numbers 10–15.

RCKFLT—This is a number in a low pass filtered version of RACKL.

RDSHSP—Rapid downshift hold speed period test value. This number is proportional to the reciprocal of the engine speed (i.e., RPML format) the engine must be above for the engine speed to be held at either HRDNLO or HRDNHI during rapid downshifting.

RDSTT—Rapid downshift test torque for engine speed hold. This is the engine torque level (in RACKL units) that determines if HRDNLD or HRDNHI will be used for the engine speed command during rapid downshifting.

REVSW—Reverse switch flag. Set when transmission is in reverse. Cleared otherwise.

RPMCOM—Engine speed command. This is a number proportional to the reciprocal of the engine speed (i.e., RPML format) that is required to maintain the commanded ground speed for the given gear. It is the scaled reciprocal of the product of the gear ratio and the non-linear speed lever position.

RPMDLY—Delayed engine speed period. This is a low pass filtered version of RPMDLY.

RPMFF—Engine speed flip flop input (Active low). This flag is used to determine if an engine speed interrupt is pending.

RPML—Engine speed period. This is a number proportional to the reciprocal of the current engine speed.

RPML=163060/(engine rpm)

RPDFLG—Rapid downshift flag. Set when speed lever has been reduced. Cleared when engine torque is less than DWNTQR, 1st gear is reached, the downshift requirements are no longer met, or manual mode is entered. When set, this flag enables rapid downshifting by reducing the time out value for the downshift timer.

RPUFLG—Rapid upshift flag. Set when speed lever has been advanced. Cleared when torque is greater than the upshift torque, 15th gear is reached, the upshift requirements are no longer met, or manual mode is entered. When set, this flag enables rapid upshifting by reducing the time out value for the upshift timer.

RUSTQR—Rapid upshift torque. This is the level (in RACKL units) that the engine torque must be below for rapid upshifting from all gears except first. There is no torque limit for first.

S

SMOOTH—Ramp engine speed during shift flag. Set in throttle control logic whenever an upshift is in progress and the torque is high. Cleared in throttle control logic when automatic engine speed is reached. Cleared in gear shift control logic when speed lever moved, shift initiated, or automatic engine speed reached. When set, the engine speed command is slowly ramped from the current engine speed to the engine speed commanded by the automatic mode.

SPDLRH—Speed lever raw data high order byte.

SPDLRL—Speed lever raw data low order byte.

STACK—Beginning address of the system stack

STPCNT—Step counter for step motor. Initialized to 41 in automatic mode logic. Decremented on occurrence of each motor step. This is the count for the remaining steps to complete the gear shift.

SWCH1—Switch bank 1 address. Switch bank 1 contains the top gear limit switches, the reverse switch, the neutral interlock switch, the mode switch, and the auto/manual switch.

SWCH2—Switch bank 2 address. Switch bank 2 contains the option switches and the clutch switch.

SYNCCT—Sync counter for mass fuel flow/speed lever pulse train. Initialized to zero on each occurrence of a data pulse. This is used by the microprocessor to determine whether mass fuel flow or speed lever position data is being sent by the electronic governor.

T

TEST—This word is initialized with OD3H in the initialization routine and is tested at the end of every pass through the main control loop. If TEST fails to contain OD3, then program execution is halted for the watchdog timer to reset the controller.

THGAIN—Throttle gain for the variable throttle routine.

THROH—Throttle command to governor high order byte.

THROL—Throttle command to governor low order byte. This is the counter value for the output pulse width.

| THROL | Engine rpm |
|---|---|
| 2168 | break away at rated load |
| 128 | low idle at zero load |

TQRTIM—Rapid upshift torque timer. Zeroed in manual mode, when upshift is initiated, when none of the shift conditions are met, and when timer limit has been exceeded on each control loop pass that upshift torque is exceeded.

U

UPFLG—Upshift flag. Set by automatic mode logic when the upshift conditions are met. Cleared by completion of shift, problem mode entry, or manual mode entry. When set, the step motor control logic is enabled to upshift the transmission.

UPSPD—Upshift speed period. This number is proportional to the reciprocal of the engine speed (i.e., RPML format) that the engine must exceed for upshifting.

UPTIM—Upshift timer. Cleared in manual mode, at initiation of a shift, and when shift conditions are not met. Incremented on every 2nd pass of control loop when upshift conditions are met.

UPTQR—Upshift torque array. This array is used as the argument for the LINE subroutine computing the upshift torque. The first 8 elements of the array contain the slope (in 0.5 *RACKL *RPML units) of the upshift line for each vehicle model. The remaining 7 groups of 16 elements contain the torque intercept (in 0.5 *RACKL units) of the upshift line for each transmission gear for each vehicle model.

V

VGTFLG—Variable gain throttle flag. This flag is used to keep track of whether the variable gain is greater than or less than the nominal throttle gain. Set if variable gain is less than the nominal gain; otherwise, cleared.

W

WDOG—Watchdog timer reset.

Definitions

Breakaway Speed—The engine speed at which the full load curve and the full throttle droop line intersect.

Droop—The engine speed droop is the change in engine speed which occurs as the load is increased or decreased with a constant throttle position. Percent droop is defined as:

$$\% \text{ droop } = 100 * \frac{\text{fast idle zero fuel } - \text{ breakaway speed}}{\text{rated speed}}$$

External counter—External counter refers to one of the 3 hardware counters in the 8253 programmable interval timer.

Fast Idle—The maximum engine speed under no load conditions. Also called high idle.

Fast Idle Zero Fuel—The speed at which the full throttle governor droop line intersects the zero fuel axis in a plot of fuel delivery versus engine speed.

Glitch—A data glitch is data that is out of the range of acceptable values.

High Idle—See fast idle.

Low Idle—The minimum engine speed allowed during normal operation under no load conditions. Also called slow idle.

Low idle zero fuel—The engine speed at which the minimum throttle governor droop line intersects the zero fuel axis.

Mass fuel flow—Mass fuel flow is the mass of the fuel per stroke that the governor delivers to the engine cylinder. The governor sends a pulse width modulated signal to the controller that represents the percentage of the rated mass fuel flow that it is commanding the pump to inject. This pulse width is converted to the number RACKL by the controller. RACKL is used as an indication of engine torque by controller.

Rack number—Rack number (also rack#) is an artificial term used to denote mass fuel flow. (Not a rack position)

Rack # = 2.1702* mass fuel flow in mg/stroke

Rated speed—The maximum full load engine speed.

To summarize, control unit 30, which executes a program including portions represented by flow chart element 400 of FIG. 8 and FIGS. 11a–11j, may be described as including means for generating engine speed control signals.

The program portions executed by control unit 30 and represented by flow chart elements 500 of FIG. 8 and FIGS. 12a–12q, may be described as means for generating shift control signals.

Figure 10A:
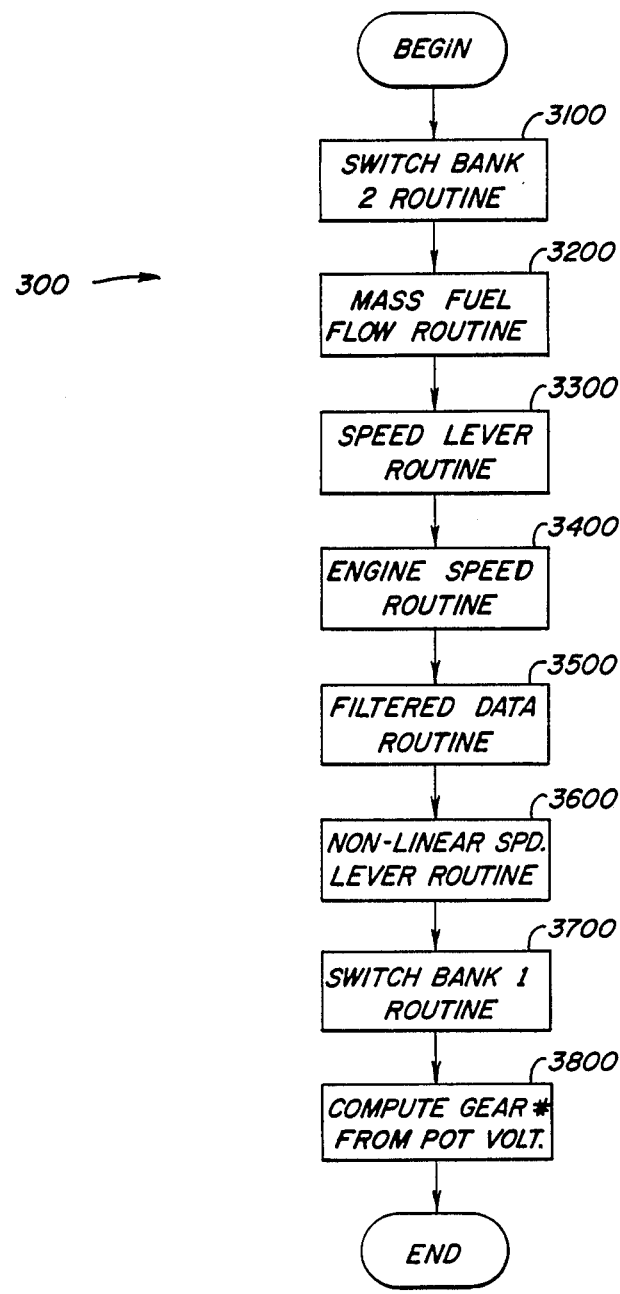
FIG. 10a is a simplified flow chart of the data collection and conditioning section of the main loop.
Figure 10B:
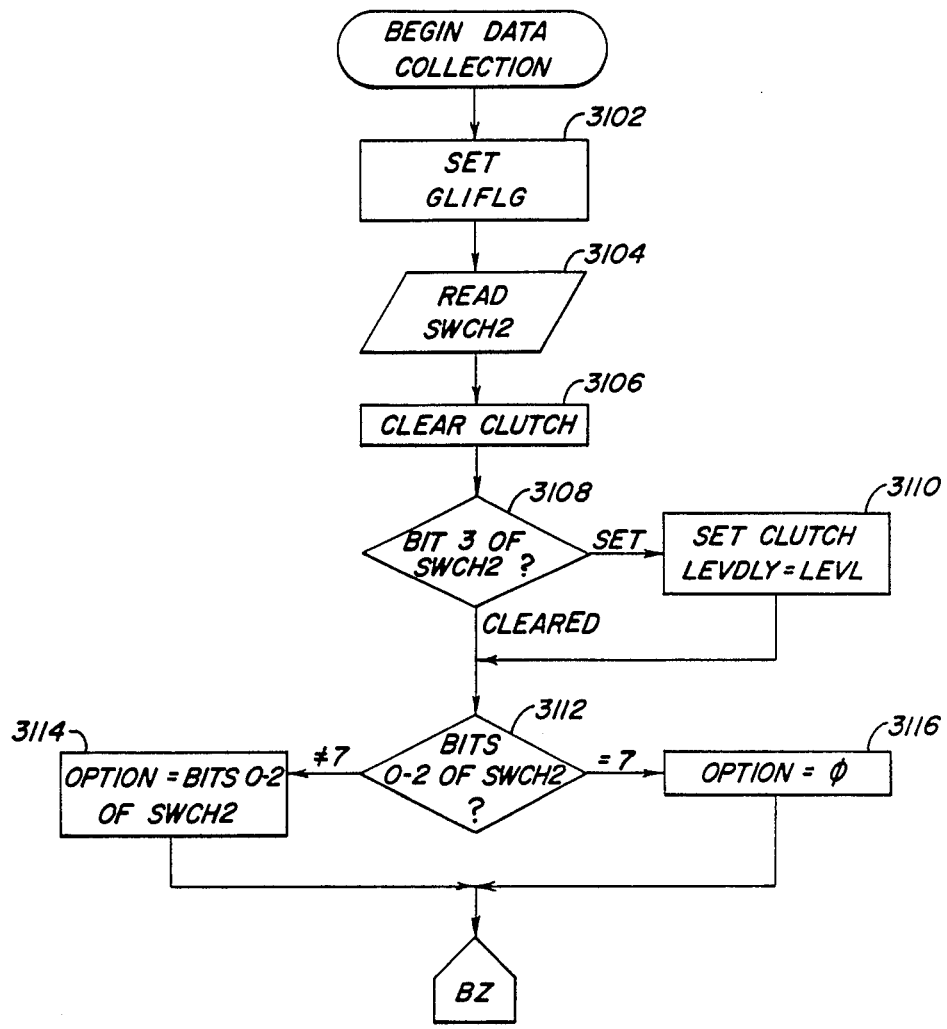
FIGS. 10b, 10c, 10d(1), 10d(2), 10e-10h form a detailed flow chart of the data collection and conditioning portion.
Figure 10C:
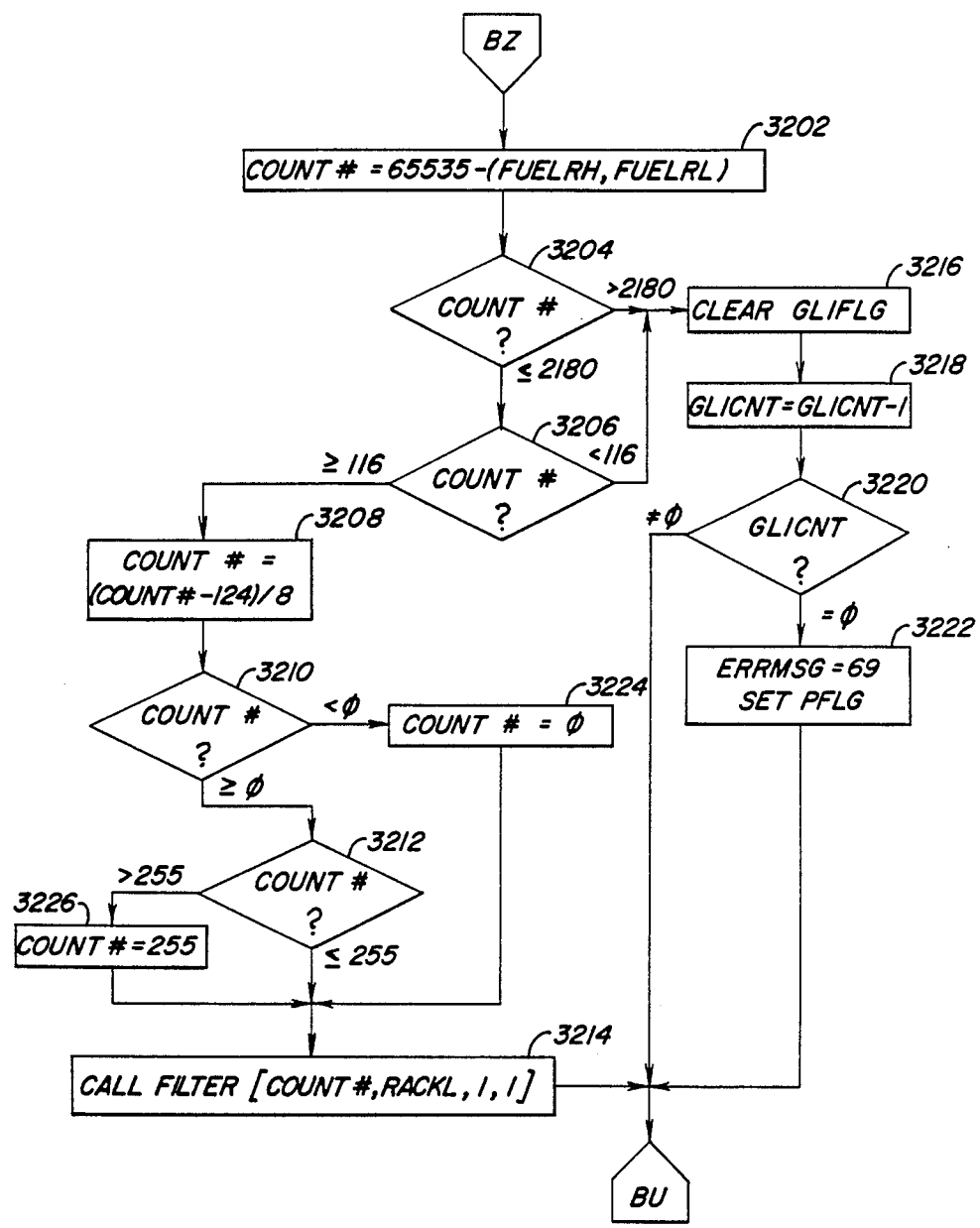
Figure 10E:
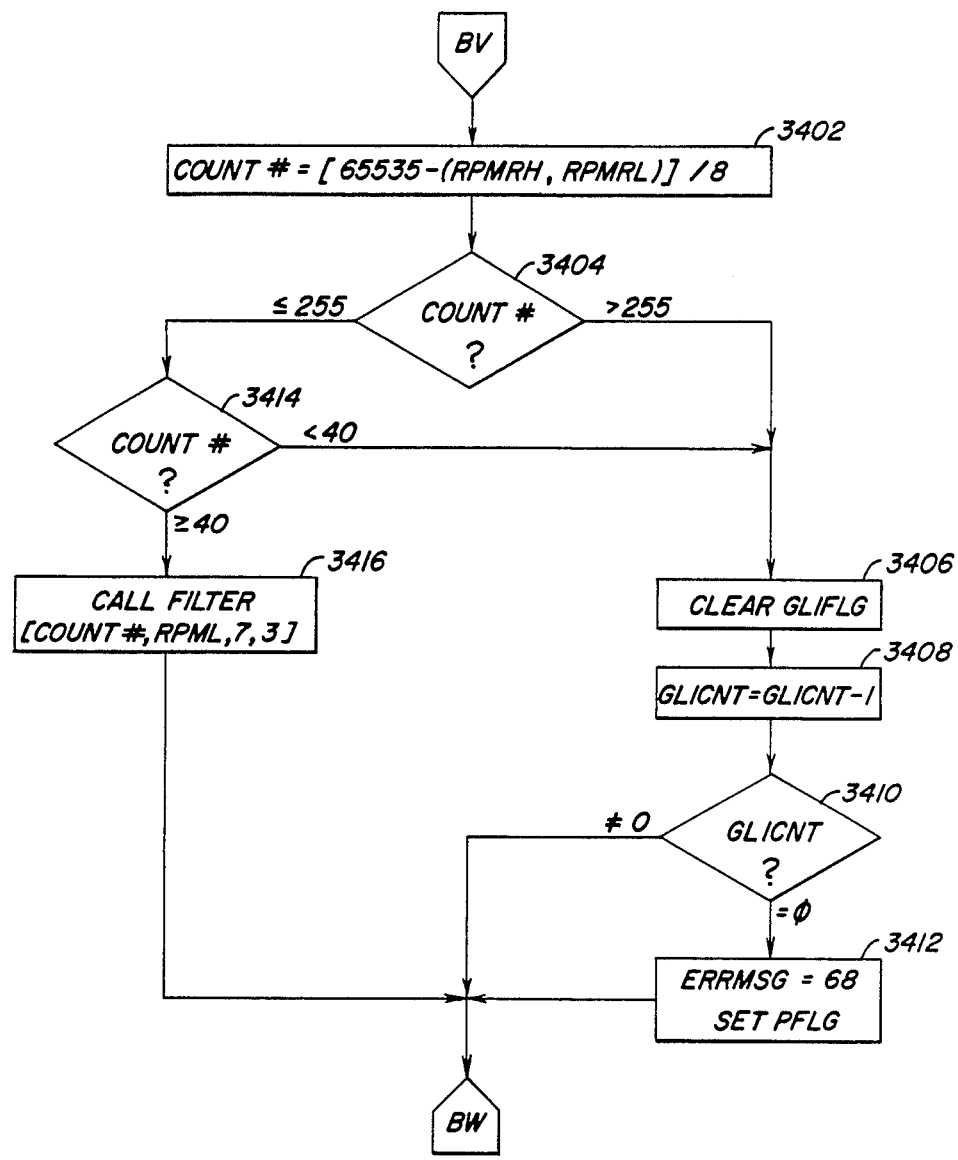
Figure 10F:
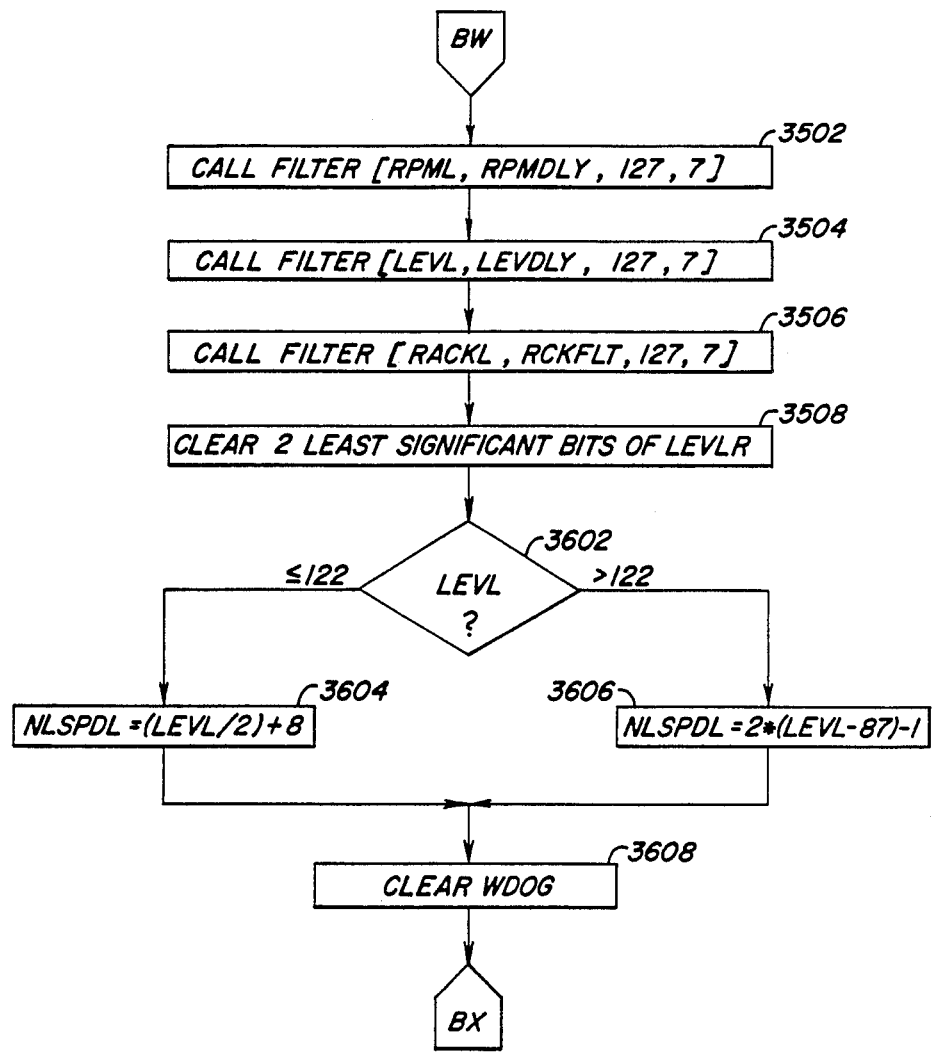
Figure 10G:
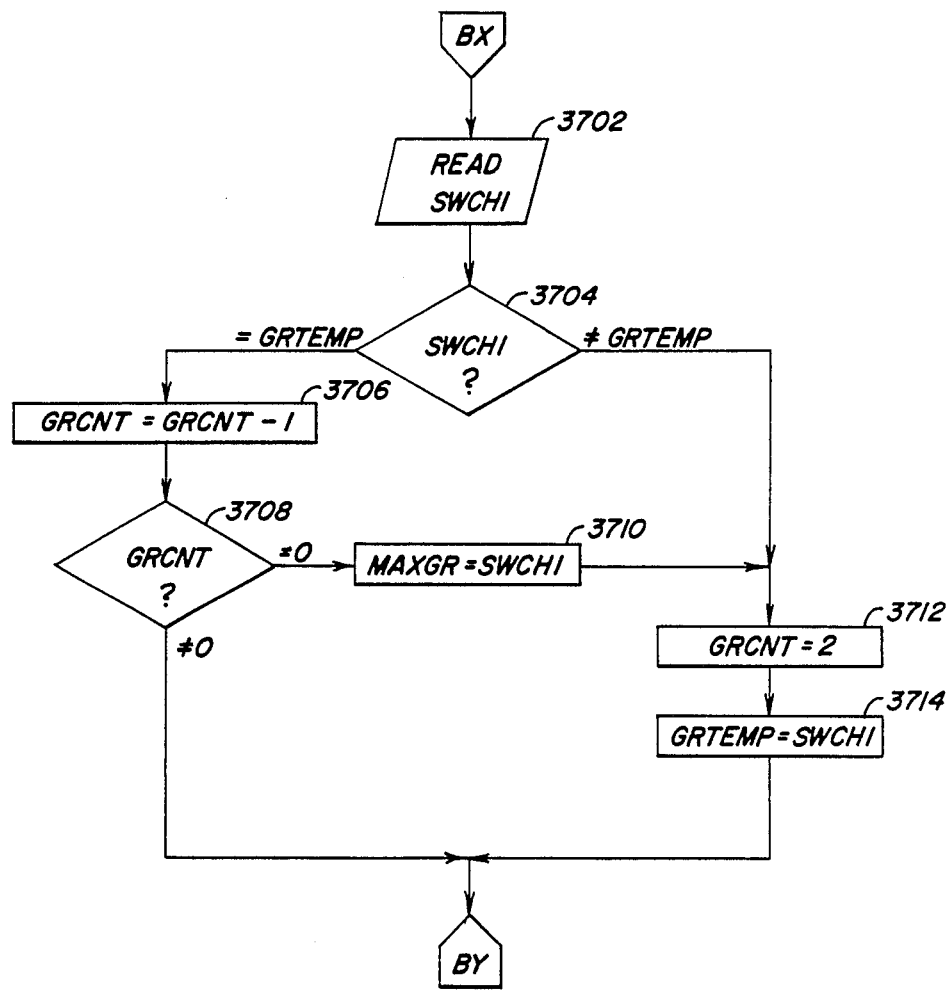
Figure 10H:
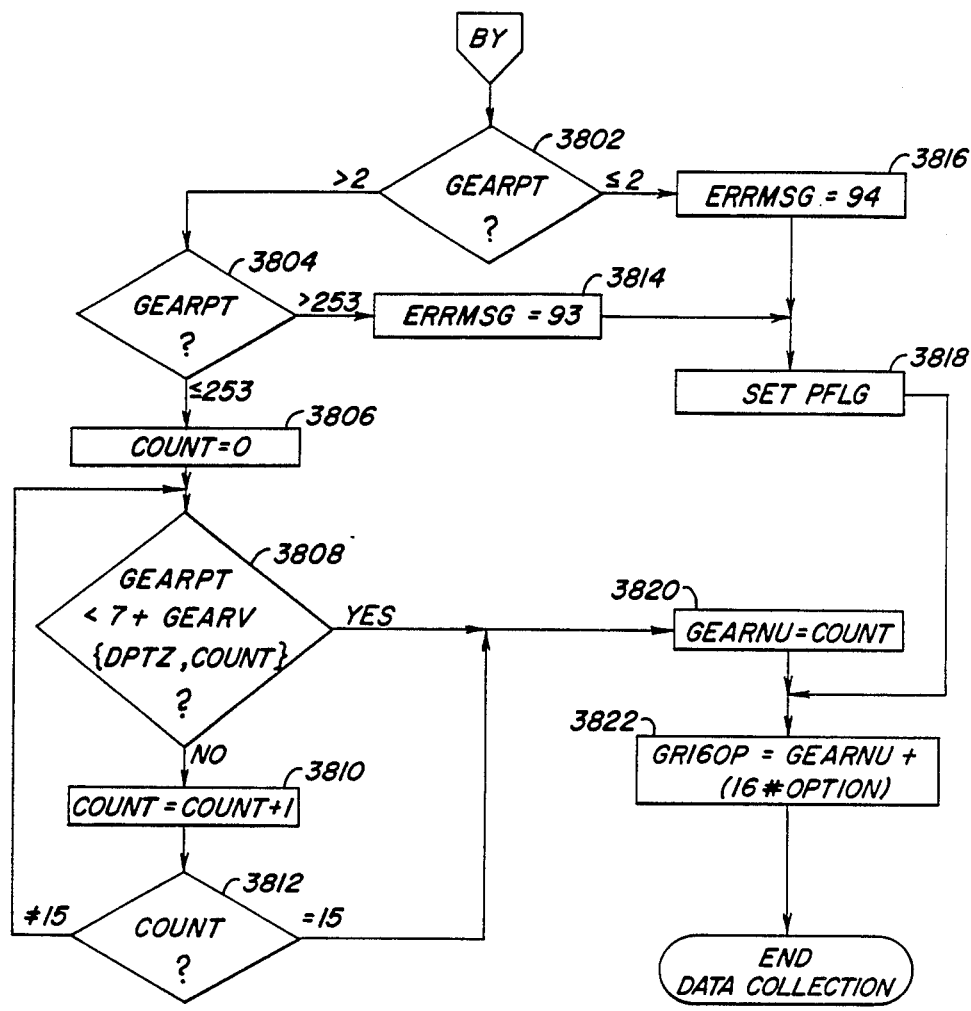

The program portions represented by flow chart element 3600 of FIG. 10a and steps 3602–3606 of FIG. 10f, may be described as means for deriving a ground speed value (NLSPDL) representing a desired vehicle ground speed as a function of the command signal (LEVL) and a gain factor.

The program portions represented by flow chart elements 400, 4112, 460, 4602–4608 and 500, may be described as means for generating the electrical engine speed and shift control signals as a function of the ground speed value so that vehicle ground speed is maintained substantially equal to the vehicle ground speed represented by the ground speed value.

The program portions represented by flow chart elements 3300, 430 and 4808, may be described as means for generating an electrical engine speed control signal as a function of a command signal and a second gain factor.

Flow chart element 420 may be referred to as mode select means.

Elements 40 or 42 may be referred to as a manually operable mode select device coupled to the control unit 30 for controlling operation of a mode select means.

The program portions represented by a flow chart element 4306, may be described as means for comparing sensed engine speed to a predetermined range of engine speeds.

The program portions represented by flow chart elements 4322, 4328, 4330 and 4332, may be described as including means for setting the second gain factor equal to the first gain factor if the sensed engine speed is within a predetermined range.

Flow chart elements 4308–4316 may be described as means for setting the second gain factor to a value different from that of the first gain factor if the sensed engine speed is outside of said predetermined range.

Flow chart elements 4302 and 4326 may be described as means for setting the second gain to a predetermined minimum value if the setting device is moved to a limit of its range of positions.

Flow chart elements 4306, 4308–4316 may be described as means for varying the second gain factor in response to changes in position of the setting device if the sensed engine speed is at a limit of said predetermined range of engine speeds.

Flow chart elements 460, 482–486 and FIGS. 12a–q may be described to as means for automatically generating engine speed and shift control signals which cause the vehicle to maintain a substantially constant desired ground speed.

Flow chart elements 430, 482–486 and FIGS. 12a–q may be described to as engine speed control means for automatically generating engine speed and shift control signals which maintain a substantially constant desired engine speed.

Flow chart elements 420, 5074, 5122, 5200 and 5212 may be described to as means responsive to the mode selector for making a selected one of the control means operative.

Flow chart elements 3600 and 460 may be described to as first means for deriving from the command signal a first value representing the desired ground speed when the ground speed control means is operative.

Flow chart elements 3300 and 430 may be described to as second means for deriving from the command signal a second signal representing the desired engine speed when the engine speed control means is operative.

Flow chart elements 3600, 3602–3608 and 460 may be described as deriving the first value as a non-linear function of the command signal.

Flow chart elements 502–510 may be described to as manual means for preventing automatic generation of shift control signals in response to a predetermined condition of the auto/manual selector.

Flow chart elements 5258 and 5262, 5260 and 5264, or 5144 and 5148, or 5144 and 5146, or 5164 and 5168 may be described as means for delaying transmission shifts by time periods which are a function of maximum obtainable vehicle ground speed in the gear ratio being shifted to.

Flow chart elements 5250 and 5144 may be described as means for automatically generating electrical shift signals which cause the shifter to shift the transmission at a normal rate in response to changes in the fuel flow signal and in the sensed engine speed.

Flow chart elements 5064–5070, 5248, 5258–5264, 5142 and 5164–5168 may be described as means responsive to changes in the command signal for generating electrical shift signals which cause the shifter to shift the transmission at a special rate which differs from the normal rate.

Flow chart elements 522, 524 and 526 in FIGS. 12a, 12h, 12j, and 12p may be described as means for generating electrical shift control signals which cause the shifter to downshift the transmission at a special rate when the sensed engine speed indicates that the engine is in danger of stalling.

Flow chart elements 5144–5148, 6046–6048, 5118 and 5124 may be described as means for generating shift control signals which cause the shifter (22, 28) to downshift the transmission 14 at a normal rate as a function of the fuel flow signal and as a function of comparisons between the sensed engine speed and a first set of downshift test speeds.

Flow chart elements 5164–5168, 5186, 5188, 5192, 6046–6048, 5120 and 5124 may be described as means for generating shift control signals which cause the shifter (22, 28) to downshift the transmission at a rate faster than normal as a function of the fuel flow signal and as a function of comparisons between the sensed engine speed and a second set of downshift test speeds.

Flow chart elements 5142–5148 and 5164–5172 may be described as first means for setting a first timer value as a function of sensed conditions or as a function of movement of the command signal generator.

Flow chart element 5162 may be described as second means for setting a second timer value as a function of the first timer value and the sensed engine speed.

Flow chart element 5174 may be described as third means for setting a third timer value as a function of the first timer value and the sensed parameter.

Flow chart elements 5176–5182 may be described as fourth means for selecting the smallest of the first, second and third timer values.

Flow chart elements 5184 and 6046–6048 may be described as fifth means for generating shift control signals which cause the shifter to downshift the trasmission at a rate determined by the selected timer value.

Flow chart elements 5248, 5250–5256, 6046–6048 may be described as means for generating shift control signals which cause the shifter to upshift the transmission at a normal rate under one set of conditions.

Flow chart elements 5064, 5066, 5248, 5258–5264, 5266, 5252–5256, 6046–6048 may be described as means for generating shift control signals which cause the shifter to rapidly upshift the transmission at a rate faster than the normal rate under another set of conditions.

Flow chart elements 5266, 6018 and 6072 may be described as means for comparing sensed engine speed to a limit and for preventing operation of the second means if the sensed engine speed is less than the limit.

Flow chart element 5216 may be described as means for comparing the torque signal to a certain torque.

Flow chart elements 5228–5240 and 5270 may be described as means, operative only if the torque signal exceeds a certain torque, for preventing operation of the second means if the torque signal remains continuously above a certain torque for at least a certain time period.

Flow chart element 5232 may be described as means for periodically incrementing a counter value while the torque signal is greater than a certain torque.

Flow chart element 5240 may be described as means for periodically comparing the counter value to a limit value (5236 or 5238).

Flow chart elements 5222, 5224 and 5242 may be described as means for resetting the counter value if the torque signal falls below a certain torque.

Flow chart element 5270 may be described as means for preventing operation of the second means and for resetting the counter value if the counter value attains the limit value.

Algorithm portion 400 may be described as means for periodically deriving engine speed control values as functions of sensed parameters.

Algorithm portion 500 may be described as means for periodically deriving shift control values in response to sensed parameters.

Algorithm portions represented by FIGS. 18a–d may be described as means for periodically converting the values to corresponding electrical engine speed and shift control signals and for periodically transmitting the electrical control signals to the governor and to the shifter.

The algorithm portions respresented by FIGS. 18a–18d may also be described as means for periodically interrupting execution of a main loop algorithm and executing an interrupt algorithm.

Flow chart element 6012 may be described as converting the engine speed control value to the electrical engine speed control signal.

Flow chart elements 6046–6050 (FIG. 18c) may be described as converting the shift control values to the electrical shift control signal.

While the invention has been described in conjunction with a specific embodiment, it is to be understood that many alternatives, modifications and variations will be apparent to those skilled in the art in light of the aforeging description. For example, the features just summarized could be adapted for use in a transmission control system which utilizes solenoid-operated transmission shift valves, instead of a stepper motor rotary valve and hydraulically-operated shift valves. Accordingly, this invention is intended to embrace all such alternatives, modifications and variations which fall within the spirit and scope of the appended claims.

A portion of the disclosure of this patent document contains material to which a claim of copyright protection is made. The copyright owner has no objection to the facsimile reproduction by anyone of the patent document of the patent disclosure, as it appears in the Patent & Trademark Office patent file or records, but reserves all other rights whatsoever.

What is claimed is:

1. In an engine-driven vehicle having a transmission shiftable to a plurality of gears, a control system comprising:

a governor for automatically controlling the engine in response to electrical engine speed control signals;

a shifter for shifting the transmission in response to electrical shift control signals;

an operator-controlled mode selector, the mode selector being controllable independent of other vehicle functions; and a control unit for generating the electrical engine speed and shift control signals in response to sensed parameters, the control unit having ground speed control means for automatically generating engine speed and shift control signals which cause the vehicle to maintain a substantially constant desired ground speed, engine speed control means for automatically generating engine speed and shift control signals which maintain a substantially constant desired engine speed, and means responsive to the mode selector for making a selected one of the control means operative.

2. The control system of claim 1, further comprising:

an operator-positionable setting device movable within a predetermined range of positions; and a transducer for generating a command signal representing the position of the setting device, the control unit including first means for deriving from the command signal a first value representing the desired ground speed when the ground speed control means is operative, the ground speed control means generating the engine speed and shift control signals as a function of at least the first value, the control unit also including second means for deriving from the command signal a second signal representing the desired engine speed when the engine speed control means is operative, the engine speed control means generating the engine speed and shift control signals as a function of at least the second value.

3. The control system of claim 2, wherein:

the first means derives the first value as a non-linear function of the command signal.

4. The control system of claim 2, further comprising:

a manually-operable shift device, the shifter including means for shifting the transmission in response to manual operation of the shift device.

5. The control system of claim 4, further comprising:
an operator-controlled, auto/manual selector, the control unit further comprising manual means for preventing automatic generation of shift control signals in response to a predetermined condition of the auto/manual selector.

6. In an engine-driven vehicle having a transmission shiftable to a plurality of gears, a control system comprising:
an engine speed sensor generating an engine speed signal indicative of the speed of the engine;
a governor for automatically maintaining engine speed substantially equal to an engine speed represented by an electrical engine speed control signal;
a shifter for shifting the transmission in response to electrical shift control signals;
an operator-positionable setting device movable within a predetermined range of positions;
a transducer coupled to the setting device for generating command signals representing setting device positions;
a control unit for generating the electrical engine speed and shift control signals in response to sensed parameters, the control unit comprising:
first means for deriving a ground speed value representing a desired vehicle ground speed as a function of the command signal and first gain factor;
second means for generating the electrical engine speed and shift control signals as a function of said ground speed value so that vehicle ground speed is maintained substantially equal to the vehicle ground speed represented by the ground speed value; and
third means for generating the electrical engine speed control signal as a function of the command signal and a second gain factor; and
mode select means for making the first and second means operable and the third means inoperable, or for making the third means operable and the first and second means inoperable.

7. The control system of claim 6, further comprising:
a manually operable mode-selecting device coupled to the control unit for controlling operation of the mode select means.

8. The control system of claim 7, wherein the control unit further comprises:
means for comparing sensed engine speed to a predetermined range of engine speeds;
means for setting the second gain factor equal to the first gain factor if the sensed engine speed is within said predetermined range; and
means for setting the second gain factor to a value different from that of the first gain factor if the sensed engine speed is outside of said predetermined range.

9. The control system of claim 8, wherein the control unit further comprises:
means for setting the second gain to a predetermined minimum value if the setting device is moved to a limit of its range of positions.

10. The control system of claim 8, wherein the control unit further comprises:
means for varying the second gain factor in response to changes in position of the setting device if the sensed engine speed is at a limit of said predetermined range of engine speeds.

11. In a vehicle having a transmission with a plurality of gear ratios and a control system for shifting the transmission from a present gear ratio to an adjacent gear ratio in response to changes in sensed paramaters, the improvement wherein the control system comprises:
means for delaying transmission shifts by time periods which are a function of the gear ratios being shifted from.

12. In an engine-driven vehicle having a transmission shiftable among a plurality of gear ratios, a control system comprising:
an engine speed sensor for sensing speed of the engine;
an operator-movable command signal generator,
a governor for automatically adjusting fuel delivery to the engine in response to changes in loading of the vehicle, and for generating a fuel flow signal MFF representing mass fuel flow to the engine;
a shifter for shifting the transmission in response to electrical shift signals; and
a control unit including means for automatically generating electrical shift signals which cause the shifter to shift the transmission at a normal rate in response to changes in the fuel flow signal and in the sensed engine speed, the control unit also including means responsive to changes in the command signal for generating elecrical shift signals which cause the shifter to shift the transmission at a special rate which differs from the normal rate.

13. The control system of claim 12, wherein:
the special rate is faster than the normal rate.

14. The control unit of claim 12, wherein:
the means responsive to changes in the command signal is operative only in response to the command signal changing faster than a predetermined rate.

15. In an engine-driven vehicle having a transmission shiftable among a plurality of gear ratios, a control system comprising:
an engine speed sensor for sensing speed of the engine;
an operator-movable command signal generator;
a governor for automatically adjusting fuel delivery to the engine in response to changes in loading of the vehicle, and for generating a fuel flow signal representing mass fuel flow to the engine;
a shifter for shifting the transmission in response to electrical shift signals; and
a control unit including means for automatically generating electrical shift signals which cause the shifter to shift the transmission at a normal rate in response to changes in the fuel flow signal and in the sensed engine speed, the control unit also including means for generating electrical shift control signals which cause the shifter to downshift the transmission at a special rate when the sensed engine speed and the fuel flow signal indicate that the engine is in danger of stalling.

16. In an engine-driven vehicle having a transmission shiftable to a plurality of gears, a control system comprising:
an engine speed sensor for generating an engine speed signal indicative of the speed of the engine;
means for generating a fuel flow signal representing mass fuel flow to the engine;
a shifter for shifting the transmission in response to shift control signals;

a control unit for automatically generating shift control signals as a function of sensed and operator-generated signals, the control unit comprising:

first means for generating shift control signals which cause the shifter to downshift the transmission at a normal rate as a function of the fuel flow signal and as a function of comparisons between the sensed engine speed and a first set of downshift test speeds; and second means for generating shift control signals which cause the shifter to downshift the transmission at a rate faster than normal as a function of the fuel flow signal and as a function of comparisons between the sensed engine speed and a second set of downshift test speeds.

17. In an engine-driven vehicle having a transmission shiftable to a plurality of gears, a control system comprising:

an engine speed sensor for sensing speed of the engine;

a sensor for sensing a parameter which is indicative of engine torque;

a shifter for shifting the transmission in response to shift control signals; and a control unit for automatically generating shift control signals as a function of sensed and operator-generated signals, the control unit comprising:

first means for setting a first timer value as a function of sensed conditions;

second means for determining a second timer value as a function of the first timer value and the sensed engine speed;

third means for determining a third timer value as a function of the first timer value and the sensed parameter;

fourth means for selecting the smallest of the first, second and third timer values; and fifth means for generating shift control signals which cause the shifter to downshift the transmission at a rate determined by the selected timer value.

18. The invention of claim 17, further comprising:

an operator-movable command signal generator for generating command signals representing a desired vehicle speed, the first means comprising means for setting the first timer value as a function of movement of the command signal generator.

19. The invention of claim 17, wherein:

the first means sets the first timer value as a function of a present gear of the transmission.

20. The invention of claim 17, wherein:

the second timer value is proportional to a difference between the sensed engine speed and a reference engine speed.

21. The invention of claim 18, wherein:

the third timer value is proportional to a difference between the sensed parameter and a reference parameter value.

22. In an engine-driven vehicle having a transmission shiftable to a plurality of gears, a control system comprising:

an engine speed sensor for generating an engine speed signal indicative of the speed of the engine;

means for generating a torque signal related to the torque load on the engine;

a shifter for shifting the transmission in response to shift control signals; and a control unit for automatically generating shift control signals as a function of sensed and operator-generated signals, the control unit comprising:

first means for generating shift control signals which cause the shifter to upshift the transmission at a normal rate under one set of conditions;

second means for generating shift control signals which cause the shifter to rapidly upshift the transmission at a rate faster than the normal rate under another set of conditions;

third means for comparing sensed engine speed to a limit and for preventing operation of the second means if the sensed engine speed is less than said limit;

fourth means for comparing the torque signal to a certain torque; and fifth means, operative only if the torque signal exceeds the certain torque, for preventing operation of the second means if the torque signal remains continuously above said certain torque for at least a certain time period.

23. The invention of claim 22, wherein the fifth means comprises:

means for periodically incrementing a counter value while the torque signal is greater than said certain torque;

means for resetting the counter value if the torque signal falls below said certain torque;

means for periodically comparing the counter value to a limit value; and means for preventing operation of the second means and for resetting the counter value if the counter value attains said limit value.

24. In an engine-driven vehicle having a transmission shiftable to a plurality of gears, a control system comprising:

a governor for controlling the engine in response to electrical engine speed control signals;

a shifter for shifting the transmission in response to electrical shift control signals; and a control unit for automatically generating the electrical engine speed and shift control signals in response to sensed parameters, the control unit comprising:

means for periodically deriving engine speed control values as a function of sensed parameters;

means for periodically deriving shift control values in response to sensed parameters; and means for periodically converting said values to the corresponding electrical engine speed and shift control signals and for periodically transmitting said electrical control signals to the governor and to the shifter.

25. In an engine-driven vehicle having a transmission shiftable to a plurality of gears, a control system comprising:

a governor for controlling the engine in response to electrical engine speed control signals;

a shifter for shifting the transmission in response to electrical shift control signals; and a control unit for automatically generating the electrical engine speed and shift control signals in response to sensed parameters, the control unit comprising:

means for periodically executing a main loop algorithm, including the following steps:

(a) deriving an engine speed control value as a function of sensed parameters, and (b) deriving shift control values as a function of said parameters;

the control unit also comprising means for periodically interrupting execution of the main loop algorithm and executing an interrupt algorithm, including the following steps;
(a) converting the engine speed control value to the electrical engine speed control signal; and
(b) converting the shift control value to the electrical shift control signal.

* * * * *